(12) United States Patent
Higaki et al.

(10) Patent No.: US 10,158,286 B2
(45) Date of Patent: Dec. 18, 2018

(54) DC/DC CONVERTER

(71) Applicant: Mitsubishi Electric Corporation, Chiyoda-ku (JP)

(72) Inventors: Yusuke Higaki, Chiyoda-ku (JP); Ryota Kondo, Chiyoda-ku (JP); Masaki Yamada, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/518,382

(22) PCT Filed: Nov. 30, 2015

(86) PCT No.: PCT/JP2015/083609
§ 371 (c)(1),
(2) Date: Apr. 11, 2017

(87) PCT Pub. No.: WO2016/125373
PCT Pub. Date: Aug. 11, 2016

(65) Prior Publication Data
US 2017/0310212 A1    Oct. 26, 2017

(30) Foreign Application Priority Data

Feb. 2, 2015 (JP) ................................. 2015-018091

(51) Int. Cl.
*H02M 3/07* (2006.01)
*G05F 1/38* (2006.01)
(Continued)

(52) U.S. Cl.
CPC ................ *H02M 3/07* (2013.01); *G05F 1/38* (2013.01); *H02M 1/38* (2013.01); *H02M 3/04* (2013.01);
(Continued)

(58) Field of Classification Search
CPC .. H02M 3/3372; H02M 3/3378; H02M 3/337; H02M 3/3376; H02M 3/33592;
(Continued)

(56) References Cited

U.S. PATENT DOCUMENTS

2011/0249472 A1* 10/2011 Jain .................. H02M 3/33584
363/15
2013/0100707 A1* 4/2013 Hatakeyama ....... H02M 3/3376
363/17
(Continued)

FOREIGN PATENT DOCUMENTS

| JP | 2013-247722 A | 12/2013 |
|----|---------------|---------|
| JP | 2014-239579 A | 12/2014 |
| WO | 2013/121665 A1 | 8/2013 |

OTHER PUBLICATIONS

International Search Report dated Feb. 16, 2016 in PCT/JP2015/083609 filed Nov. 30, 2015.

*Primary Examiner* — Jue Zhang
*Assistant Examiner* — Kevin H Sprenger
(74) *Attorney, Agent, or Firm* — Oblon, McClelland, Maier & Neustadt, L.L.P.

(57) ABSTRACT

In this DC/DC converter, a first switching circuit is connected between a first winding of a transformer and a DC power supply, and a second switching circuit is connected between a second winding and a battery. A control circuit includes a first circuit for performing feedback control so as to reduce a difference between a detected value and a command value of charge current, and a second circuit for correcting one of control input and output of the first circuit on the basis of the detected value and the command value. In charging the battery, the control circuit controls a phase shift amount of a first diagonal element in the first switching circuit and a phase shift amount of a second diagonal element in the second switching circuit relative to the drive
(Continued)

phase of a first reference element in the first switching circuit.

16 Claims, 38 Drawing Sheets

(51) Int. Cl.
```
H02M 3/04      (2006.01)
H02M 3/137     (2006.01)
H02M 3/18      (2006.01)
H02M 3/335     (2006.01)
H02M 1/38      (2007.01)
H02J 7/00      (2006.01)
H02M 1/00      (2006.01)
```
(52) U.S. Cl.
CPC .............. *H02M 3/137* (2013.01); *H02M 3/18* (2013.01); *H02M 3/33538* (2013.01); *H02M 3/33584* (2013.01); *H02J 7/00* (2013.01); *H02J 2007/0059* (2013.01); *H02M 2001/0058* (2013.01)

(58) Field of Classification Search
CPC ............... H02M 3/28; H02M 3/33569; H02M 3/33523; H02M 3/3384; H02M 3/07; H02M 7/53806; H02M 7/53871; H02M 7/48; H02M 7/5395; H02M 7/53873; H02M 7/53875; H02M 7/527; H02M 7/49; H02M 7/483; H02M 7/487; H02M 7/497; H02M 7/537; H02M 7/003; H02M 7/538; H02M 7/53835; H02M 7/5381; H02M 7/53846; Y02B 70/1433; Y02B 70/1441

USPC .......................... 363/24–26, 40–43, 131–134

See application file for complete search history.

(56) References Cited

U.S. PATENT DOCUMENTS

| | | | |
|---|---|---|---|
| 2014/0063874 A1* | 3/2014 | Liu .......................... | H02M 1/14 363/40 |
| 2014/0254203 A1* | 9/2014 | Dai ..................... | H02M 3/3353 363/17 |
| 2015/0015181 A1 | 1/2015 | Kondo et al. | |
| 2015/0043253 A1 | 2/2015 | Awane | |
| 2016/0094151 A1* | 3/2016 | Goh ..................... | H02M 7/4807 363/8 |

* cited by examiner

FIG. 8 — CURRENT ROUTE IN PERIOD F+

CURRENT ROUTE IN PERIOD J+

FIG. 17

CURRENT ROUTE IN PERIOD F-

FIG. 18

FIG. 19  CURRENT ROUTE IN PERIOD H−

CURRENT ROUTE IN PERIOD A−

FIG. 23  CURRENT ROUTE IN PERIOD B-

FIG. 24  CURRENT ROUTE IN PERIOD C−

DC/DC CONVERTER

TECHNICAL FIELD

The present invention relates to a DC/DC converter having a primary side and a secondary side isolated from each other via a transformer, and in particular, to a DC/DC converter that performs power transmission between two DC power supplies.

BACKGROUND ART

A conventional bidirectional DC/DC converter performs bidirectional power transmission between a first DC power supply and a second DC power supply, and includes: a transformer; a first converter unit which has a plurality of semiconductor switching elements, is connected between the first DC power supply and a first winding of the transformer, and performs power conversion between DC and AC; a second converter unit which has a plurality of semiconductor switching elements, is connected between the second DC power supply and a second winding of the transformer, and performs power conversion between DC and AC; and a control circuit which controls the semiconductor switching elements in the first and second converter units. The first and second converter units have capacitors connected in parallel to the respective semiconductor switching elements, and first and second reactors connected to AC input/output lines. In power transmission from the first DC power supply to the second DC power supply, the control circuit performs control so that the semiconductor switching elements in the first converter unit perform zero voltage switching, using the first reactor, and when voltage of the second DC power supply is higher than voltage generated at the second winding of the transformer, the control circuit performs control so that the second converter unit performs step-up operation, using the second reactor. In power transmission from the second DC power supply to the first DC power supply, the control circuit performs control so that the semiconductor switching elements in the second converter unit perform zero voltage switching, using the second reactor, and when voltage of the first DC power supply is higher than voltage generated at the first winding of the transformer, the control circuit performs control so that the first converter unit performs step-up operation, using the first reactor (see, for example, Patent Document 1).

CITATION LIST

Patent Document
 Patent Document 1: International Publication No. WO2013/121665

SUMMARY OF THE INVENTION

Problems to be Solved by the Invention

The bidirectional DC/DC converter as disclosed in Patent Document 1 has a simple circuit configuration that is symmetric with respect to the transformer, enables zero voltage switching irrespective of the power transmission direction, and achieves bidirectional power transmission through simple control. However, during power transmission, reverse current might occur by the polarity of the transformer current being reversed, and thus reactive power which does not contribute to the power transmission might increase. In addition, due to short-circuit prevention time and the like, response delay might occur and response of transmission power to a command value might be deteriorated extremely. Therefore, it is difficult to swiftly change the transmission power in response to change in the power transmission direction or steep load variation, to follow the command value.

The present invention has been made to solve the above problem, and an object of the present invention is to provide a DC/DC converter that enables, with a simple circuit configuration, power transmission in which reverse flow of transformer current is prevented over a wide voltage range, thereby achieving loss reduction. In addition, an object of the present invention is to achieve output control having high quick-response performance and high reliability so that transmission power can be swiftly changed in response to even steep load variation and even in the case where the power transmission direction is changed.

Solution to the Problems

A DC/DC converter according to the present invention performs power transmission between a first DC power supply and a second DC power supply, and includes: a transformer; a first converter unit formed by a full-bridge circuit including two bridge circuits each having a plurality of semiconductor switching elements to which antiparallel diodes are respectively connected, the first converter unit being connected between the first DC power supply and a first winding of the transformer; a second converter unit formed by a full-bridge circuit including two bridge circuits each having a plurality of semiconductor switching elements to which antiparallel diodes are respectively connected, the second converter unit being connected between the second DC power supply and a second winding of the transformer; a second reactor connected on an AC input/output line of the second converter unit; and a control circuit which calculates an output duty cycle on the basis of a difference current value between a current detection value and a current command value of current inputted to or outputted from the second DC power supply, and performs drive control of the semiconductor switching elements in the first converter unit and the second converter unit.

The control circuit includes a first circuit for performing feedback control so as to reduce the difference current value, and a second circuit for correcting one of control input and output of the first circuit on the basis of the current detection value and the current command value.

In first power transmission from the first DC power supply to the second DC power supply,
 using, as a first reference element, one of the semiconductor switching elements on a positive side and a negative side of a first bridge circuit which is one of the bridge circuits in the first converter unit, and using, as a second reference element, one of the semiconductor switching elements on a positive side and a negative side of a second bridge circuit which is one of the bridge circuits in the second converter unit, the control circuit turns off all the semiconductor switching elements of the second bridge circuit among the four bridge circuits in the first and second converter units, and controls, at the same ON time ratio, the semiconductor switching elements on a positive side and the semiconductor switching elements on a negative side in the other three bridge circuits, and
 the control circuit controls a first phase shift amount which is a phase shift amount between a drive signal for the first reference element and a drive signal for the semiconductor switching element as a first diagonal element which is diagonal to the first reference element, and a second phase shift amount which is a phase shift amount between a drive signal for the first reference element and a drive signal for the semiconductor switching element as a second diagonal element which is diagonal to the second reference element.

The second circuit adjusts the first and second phase shift amounts by the correction, to cause the current detection value to follow the current command value.

Effect of the Invention

The DC/DC converter according to the present invention enables, with a simple circuit configuration, power transmission in which reverse flow of transformer current is prevented over a wide voltage range, thereby achieving loss reduction. In addition, the DC/DC converter according to the present invention achieves output control having high quick-response performance and high reliability so that transmission power can be swiftly changed in response to even steep load variation and even in the case where the power transmission direction is changed.

BRIEF DESCRIPTION OF THE DRAWINGS

FIG. 17 is a current route diagram illustrating charging operation of the battery charge/discharge device according to embodiment 1 of the present invention.

FIG. 18 is a current route diagram illustrating charging operation of the battery charge/discharge device according to embodiment 1 of the present invention.

DESCRIPTION OF EMBODIMENTS

Embodiment 1

Hereinafter, embodiment 1 of the present invention will be described.

Figure 1:
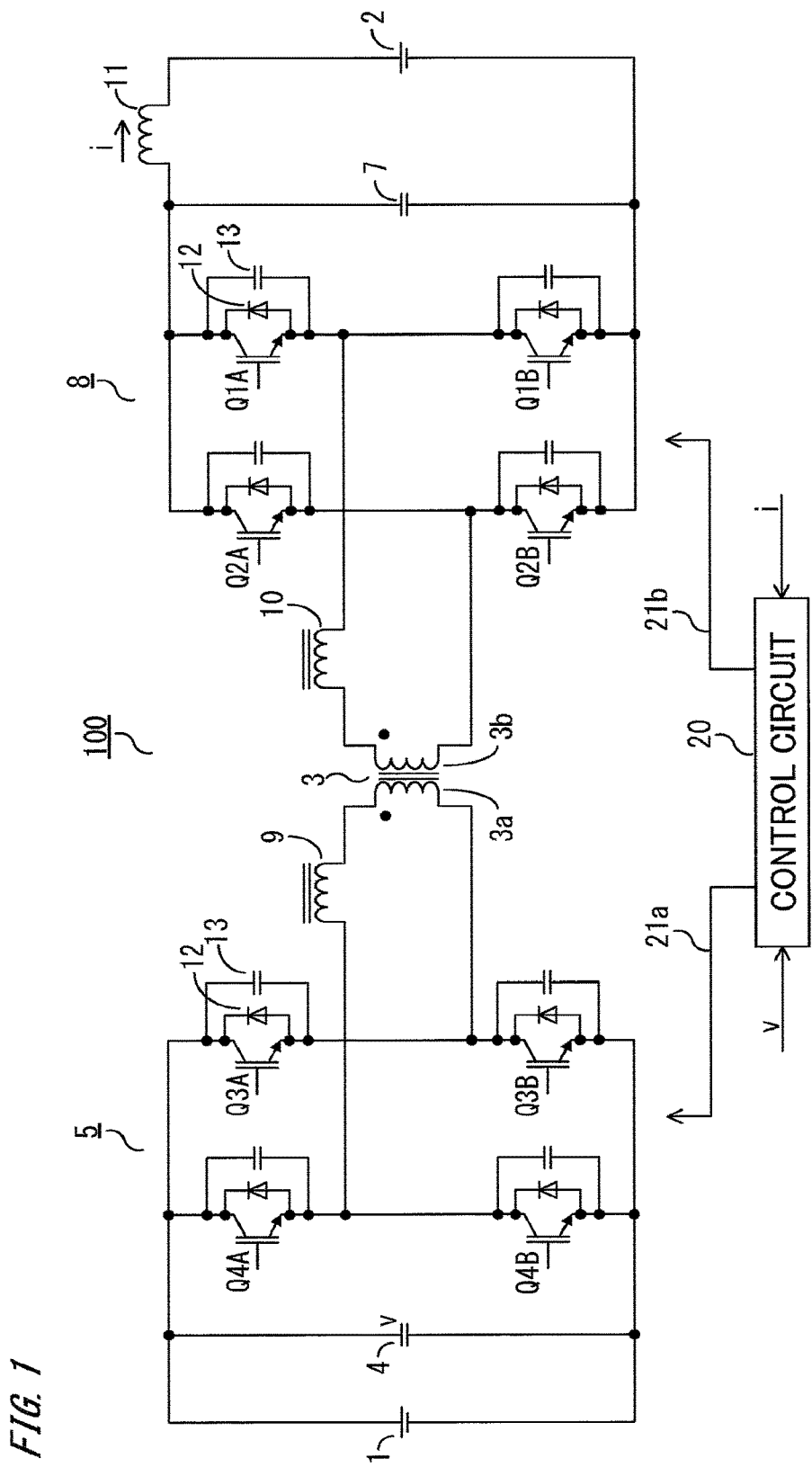
FIG. 1 is a circuit configuration diagram of a battery charge/discharge device according to embodiment 1 of the present invention.

FIG. 1 is a diagram showing the circuit configuration of a battery charge/discharge device 100 as a DC/DC converter according to embodiment 1 of the present invention. As shown in FIG. 1, the battery charge/discharge device 100 performs bidirectional power conversion between a DC power supply 1 as a first DC power supply and a battery 2 as a second DC power supply, to charge or discharge the battery 2.

The battery charge/discharge device 100 includes: a high-frequency transformer 3 (hereinafter, simply referred to as a transformer 3) as an isolation transformer; a first smoothing capacitor 4 connected in parallel to the DC power supply 1; a first switching circuit 5 as a first converter unit; a second smoothing capacitor 7 connected in parallel to the battery 2; a second switching circuit 8 as a second converter unit; and a first reactor 9 and a second reactor 10 connected on respective AC input/output lines of the first switching circuit 5 and the second switching circuit 8. The battery charge/discharge device 100 further includes a control circuit 20 for controlling the first switching circuit 5 and the second switching circuit 8.

The first switching circuit 5 is a full-bridge circuit having a plurality of semiconductor switching elements Q4A, Q4B, Q3A, Q3B (hereinafter, simply referred to as Q4A, Q4B, Q3A, Q3B or semiconductor switching elements Q) such as IGBT or MOSFET, to which diodes 12 are respectively connected in antiparallel, and has a DC side connected to the first smoothing capacitor 4 and an AC side connected to a first winding 3a of the transformer 3, to perform bidirectional power conversion between DC and AC. In addition, the first switching circuit 5 is a zero voltage switching circuit which allows voltage between both ends of each semiconductor switching element Q to be almost zero at the time of switching thereof, and a capacitor 13 is connected in parallel to each semiconductor switching element Q. The first reactor 9 is connected on the AC input/output line between the semiconductor switching elements Q and the transformer 3, and the first reactor 9 and the first winding 3a are connected in series.

The second switching circuit 8 is a full-bridge circuit having a plurality of semiconductor switching elements Q2A, Q2B, Q1A, Q1B (hereinafter, simply referred to as Q2A, Q2B, Q1A, Q1B or semiconductor switching elements Q) such as IGBT or MOSFET, to which diodes 12 are respectively connected in antiparallel, and has a DC side connected to the second smoothing capacitor 7 and an AC side connected to a second winding 3b of the transformer 3, to perform bidirectional power conversion between DC and AC. In addition, the second switching circuit 8 is a zero voltage switching circuit which allows voltage between both ends of each semiconductor switching element Q to be almost zero at the time of switching thereof, and a capacitor 13 is connected in parallel to each semiconductor switching element Q. The second reactor 10 is connected on the AC input/output line between the semiconductor switching elements Q and the transformer 3, and the second reactor 10 and the second winding 3b are connected in series. Further, a reactor 11 is connected to the DC side of the second switching circuit 8.

A current sensor (not shown) for detecting current flowing through the reactor 11 as charge current i (the arrow indicates the positive direction) of the battery 2 is provided between the second smoothing capacitor 7 and the battery 2, and the sensing output is inputted to the control circuit 20. A voltage sensor (not shown) for detecting voltage v of the first smoothing capacitor 4 is provided, and the sensing output is inputted to the control circuit 20. The control circuit 20 generates drive signals 21a, 21b for performing switching control of the semiconductor switching elements Q of the first switching circuit 5 and the second switching circuit 8, on the basis of the values of current i and voltage v that are inputted, thereby performing drive control of the first switching circuit 5 and the second switching circuit 8.

The current sensor for detecting charge current i of the battery 2 may be provided on the second switching circuit 8 side with respect to the second smoothing capacitor 7.

Next, operation of the battery charge/discharge device 100 will be described below.

Power transmission by charge control is referred to as first power transmission, and power transmission by discharge control is referred to as second power transmission.

Figure 2:
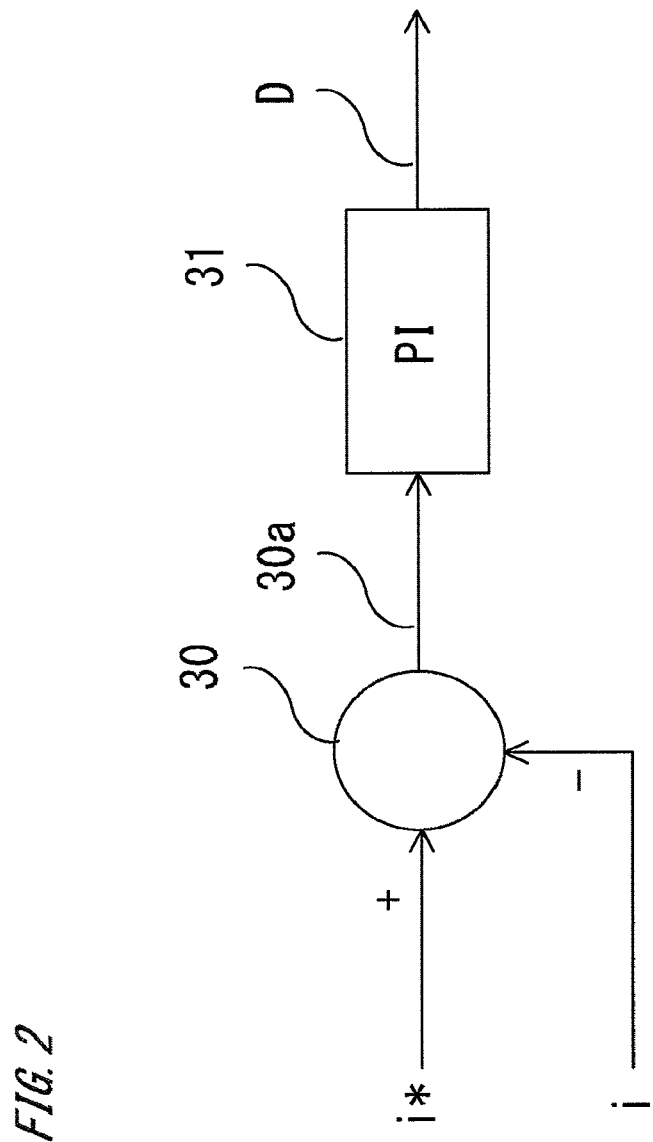
FIG. 2 is a control block diagram in the case where the battery charge/discharge device performs charging, according to embodiment 1 of the present invention.

FIG. 2 is a control block diagram in the case of transmitting power from the DC power supply 1 to the battery 2, i.e., charging the battery 2. The charge current i which is output current of the battery charge/discharge device 100 is detected and inputted to the control circuit 20. For convenience sake, the current detection value of charge current i is simply referred to as charge current i. As shown in FIG. 2, in the control circuit 20, a subtractor 30 subtracts the inputted charge current i from a charge current command value i* to calculate a difference current value 30a, and a PI controller 31 as a first circuit performs feedback control so that the difference current value 30a approaches zero, thereby determining an output duty cycle D (hereinafter, simply referred to as duty cycle D) for the first switching circuit 5 and the second switching circuit 8 and generating the drive signals 21a, 21b for the semiconductor switching elements Q.

Voltage of the first smoothing capacitor 4 connected in parallel to the DC power supply 1 is the same DC voltage as voltage of the DC power supply 1.

Figure 3:
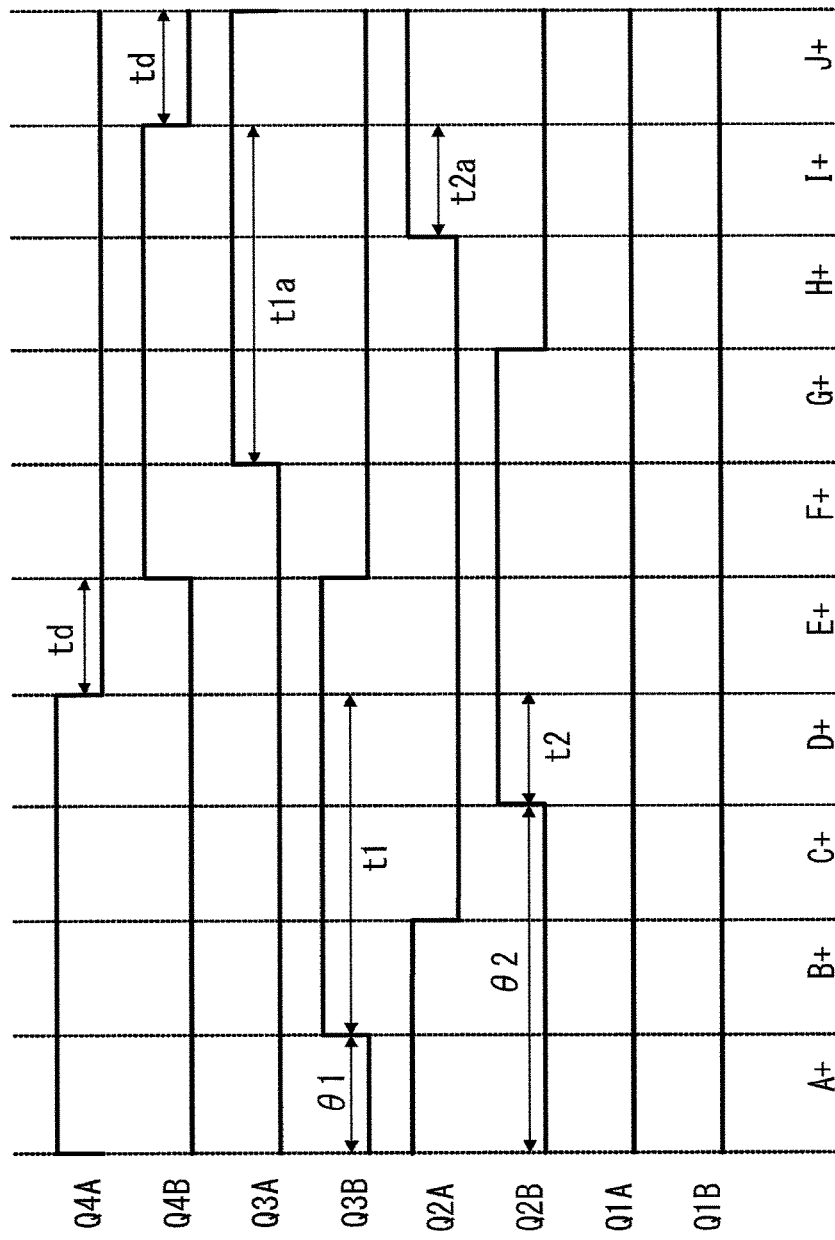
FIG. 3 is a drive signal waveform diagram of the battery charge/discharge device according to embodiment 1 of the present invention.

FIG. 3 is a diagram showing waveforms of the drive signals 21a, 21b for the semiconductor switching elements Q of the first switching circuit 5 and the second switching circuit 8 in step-up charging of the battery charge/discharge device 100. In this case, they are shown with periods A+ to J+ allocated for respective plurality of gate patterns which are combination patterns of the drive signals. In FIG. 3, for convenience sake, the drive signals for Q4A, Q4B, Q3A, Q3B, Q2A, Q2B, Q1A, Q1B are denoted by the reference characters of these elements.

In this case, the entire drive signals are generated using, as a reference, a first bridge circuit (Q4A, Q4B) which is one of the bridge circuits in the first switching circuit 5. Q1A and Q1B of a second bridge circuit (Q1A, Q1B) which is one of the bridge circuits in the second switching circuit 8 are kept in an OFF state.

In the three bridge circuits other than the second bridge circuit (Q1A, Q1B), the positive-side (high-voltage-side) Q4A, Q3A, Q2A and the negative-side (low-voltage-side) Q4B, Q3B, Q2B composing the bridge circuits are each controlled at an ON time ratio of 50% excluding a short-circuit prevention time td. The short-circuit prevention time td is set for preventing the positive-side semiconductor switching element and the negative-side semiconductor switching element from being turned on at the same time, and when the set short-circuit prevention time td has elapsed since one of the semiconductor switching elements was turned off, the other one is turned on. In this case, the setting is made such that, in order that the semiconductor switching elements Q of the first switching circuit 5 on the power transmitting side perform zero voltage switching, voltage of the capacitor 13 connected in parallel to each semiconductor switching element Q increases to be voltage of the first smoothing capacitor 4 or decreases to be close to zero voltage, during the short-circuit prevention time td.

Q4A in the first bridge circuit (Q4A, Q4B) is set as a first reference element, Q1A in the second bridge circuit (Q1A, Q1B) is set as a second reference element, Q3B diagonal to the first reference element Q4A is set as a first diagonal element, and Q2B diagonal to the second reference element Q1A is set as a second diagonal element.

A phase shift amount θ1 (first phase shift amount) of the drive signal for the first diagonal element Q3B relative to the phase of the drive signal for the first reference element Q4A, and a phase shift amount θ2 (second phase shift amount) of the drive signal for the second diagonal element Q2B relative to the phase of the drive signal for the first reference element Q4A are determined in accordance with the duty cycle D which is a control command. That is, the phase shift amounts θ1, θ2 are controlled in accordance with the duty cycle D. Although the details of the control for the phase shift amounts θ1, θ2 will be described later, in this case, the phase shift amount θ1 is kept minimum, and the phase shift amount θ2 is changed in accordance with the duty cycle D.

As shown in FIG. 3, the period during which the first reference element Q4A and the first diagonal element Q3B are both ON is defined as a diagonal ON time t1, and the diagonal ON time t1 is determined by the phase shift amount θ1. A diagonal ON time t1a during which Q4B and Q3A are both ON is also equal to the diagonal ON time t1.

For the second bridge circuit (Q1A, Q1B), drive signals equal to those for the first bridge circuit (Q4A, Q4B) are assumed as virtual drive signals, and the period during which the virtual ON period of Q1A based on the virtual drive signal for the second reference element Q1A overlaps the ON period of the second diagonal element Q2B, is defined as a virtual diagonal ON time t2. The virtual diagonal ON time t2 is determined by the phase shift amount θ2 of the drive signal for the second diagonal element Q2B relative to the phase of the drive signal for the first reference element Q4A. A virtual diagonal ON time t2a during which the virtual ON period of Q1B based on the virtual drive signal for Q1B overlaps the ON period of Q2A is also equal to the virtual diagonal ON time t2.

FIG. 4 to FIG. 13 show current routes according to the respective gate patterns in FIG. 3. FIG. 4 to FIG. 13 respectively correspond to the periods B+ to J+ and then the period A+ in FIG. 3, in this order.

Hereinafter, operation of the battery charge/discharge device 100 in one cycle will be described with reference to FIG. 3 and FIG. 4 to FIG. 13. Here, voltage of the battery 2 is higher than voltage generated at the second winding 3b, and power is transmitted from the DC power supply 1 to the battery 2.

For convenience sake, the description will be started from the period B+.

Figure 4:
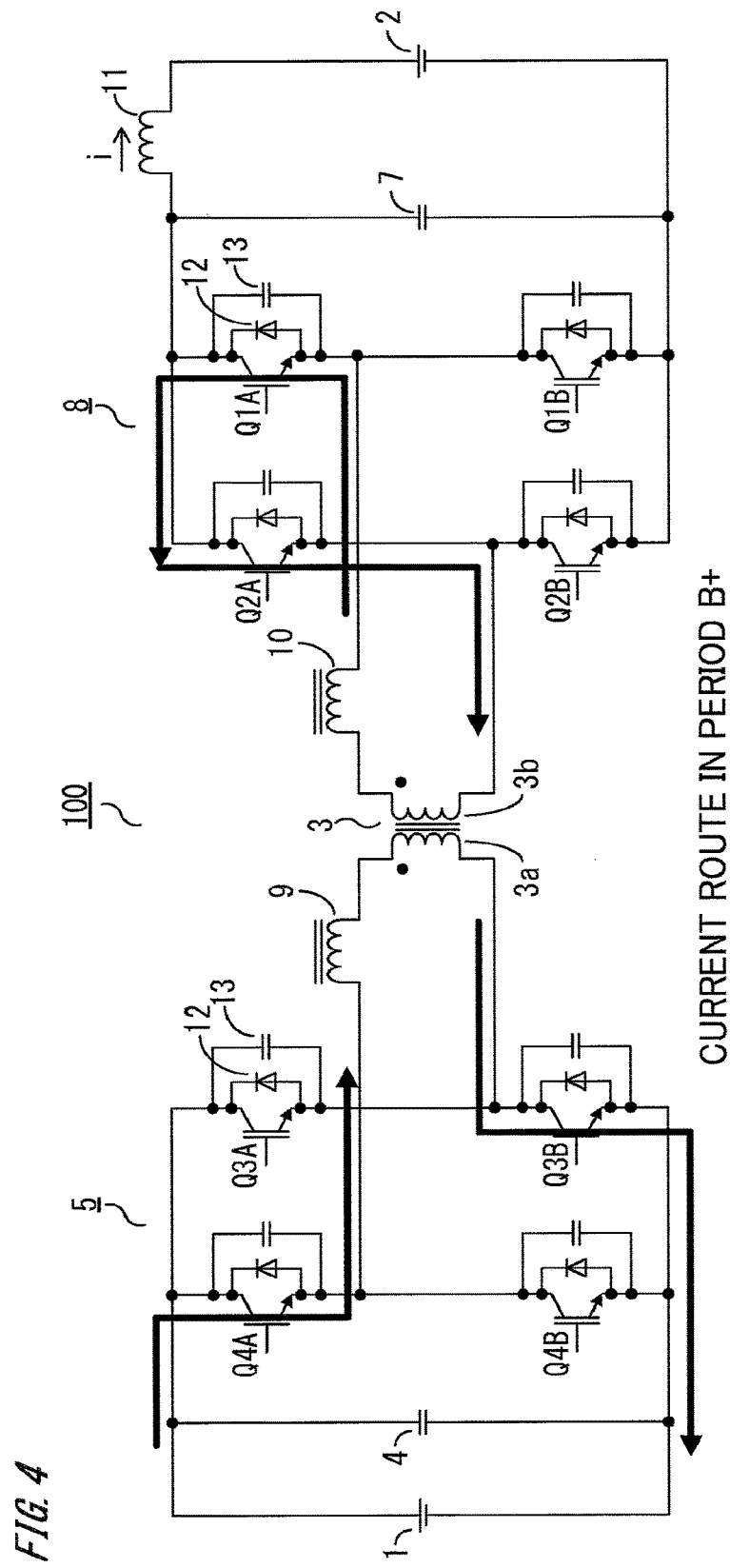
FIG. 4 is a current route diagram illustrating charging operation of the battery charge/discharge device according to embodiment 1 of the present invention.

During the period B+, in the first switching circuit 5, Q4A and Q3B are ON and thus the diagonal two elements are conductive. Therefore, energy is transmitted via Q4A and Q3B from the DC power supply 1 side. The polarity of current is opposite to those in the period J+ and the period A+ described later. In the second switching circuit 8, Q2A is turned on, and therefore current circulates via the diode of Q1A, and Q2A. Thus, the period B+ is a period during which the first reactor 9 and the second reactor 10 are excited (FIG. 4).

Figure 5:
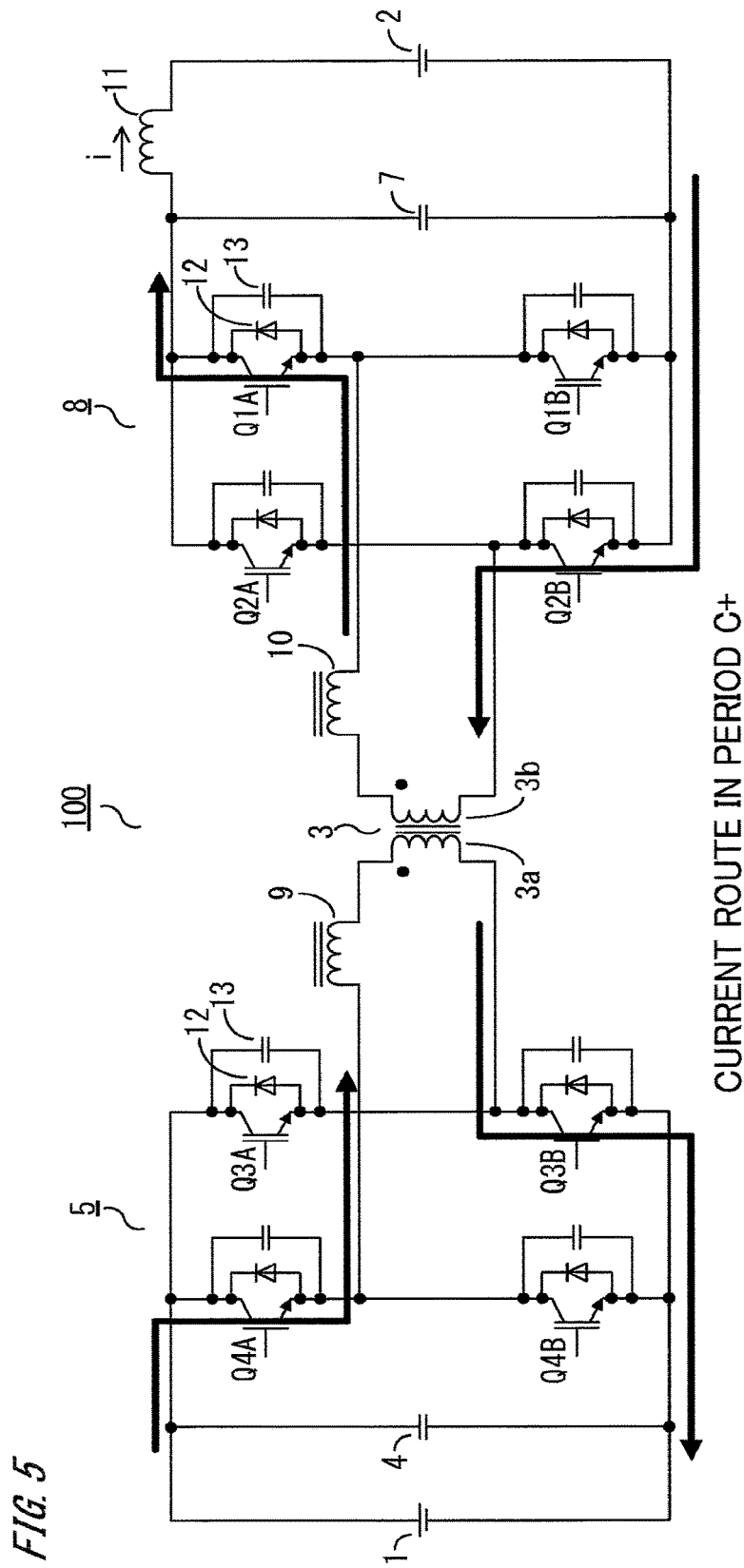
FIG. 5 is a current route diagram illustrating charging operation of the battery charge/discharge device according to embodiment 1 of the present invention.

During the period C+, in the first switching circuit 5, Q4A and Q3B are ON and thus the diagonal two elements are conductive. Therefore, energy is transmitted from the DC power supply 1 side. In the second switching circuit 8, Q2A is turned off, current flows via the diode of Q2B from the diode of Q1A, and power is transmitted to the battery 2 side. Thus, the period C+ is a period during which the excitation energy of the first reactor 9 and the second reactor 10 is transmitted to the battery 2 side (FIG. 5).

Figure 6:
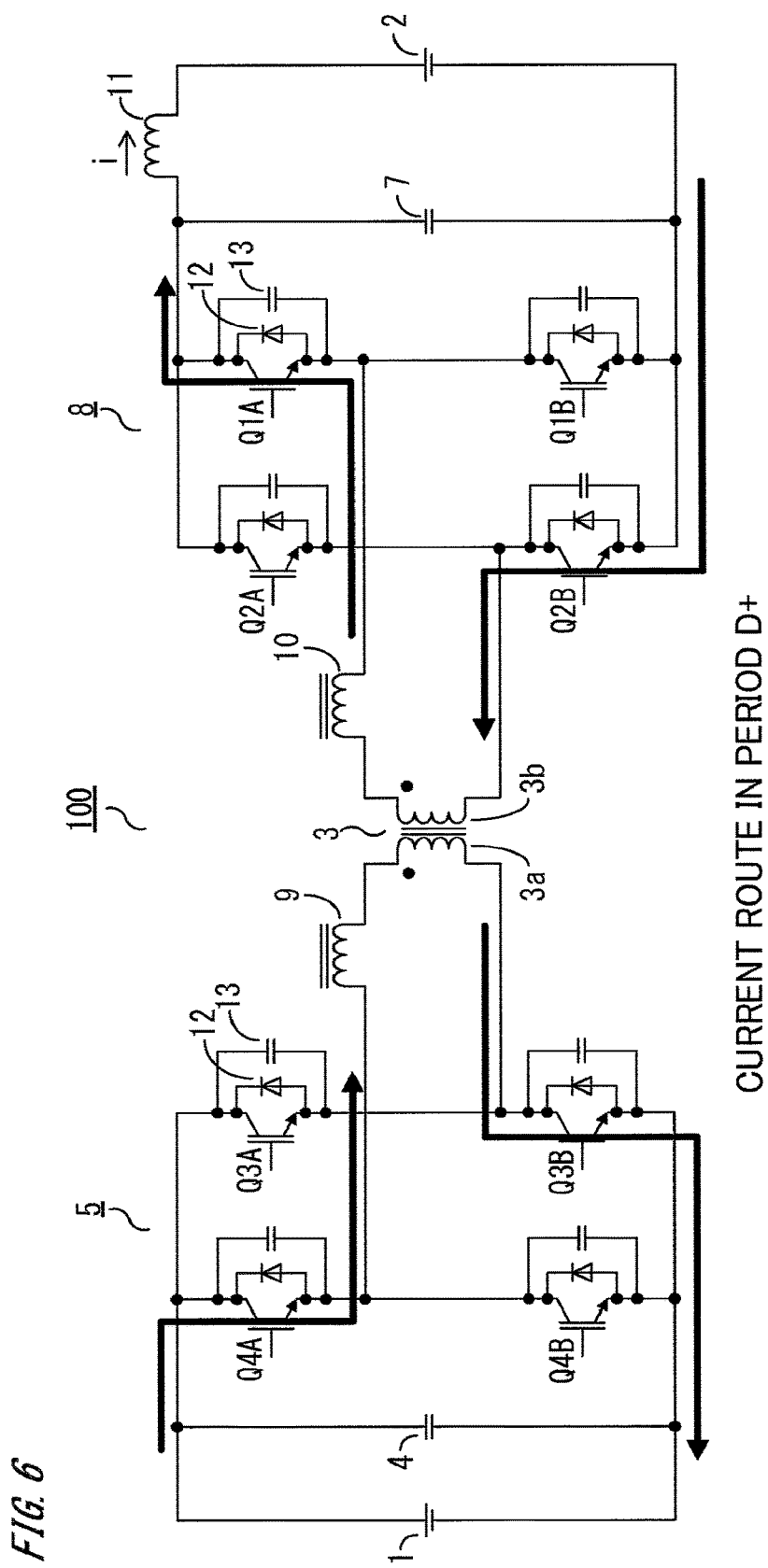
FIG. 6 is a current route diagram illustrating charging operation of the battery charge/discharge device according to embodiment 1 of the present invention.

During the period D+, in the first switching circuit 5, Q4A and Q3B are ON and thus the diagonal two elements are conductive. Therefore, energy is transmitted from the DC power supply 1 side. In the second switching circuit 8, Q2B is turned on, current flows via Q2B or the diode of Q2B from the diode of Q1A, and power is transmitted to the battery 2 side. Thus, the period D+ is a period during which the excitation energy of the first reactor 9 and the second reactor 10 is transmitted to the battery 2 side (FIG. 6).

Figure 7:
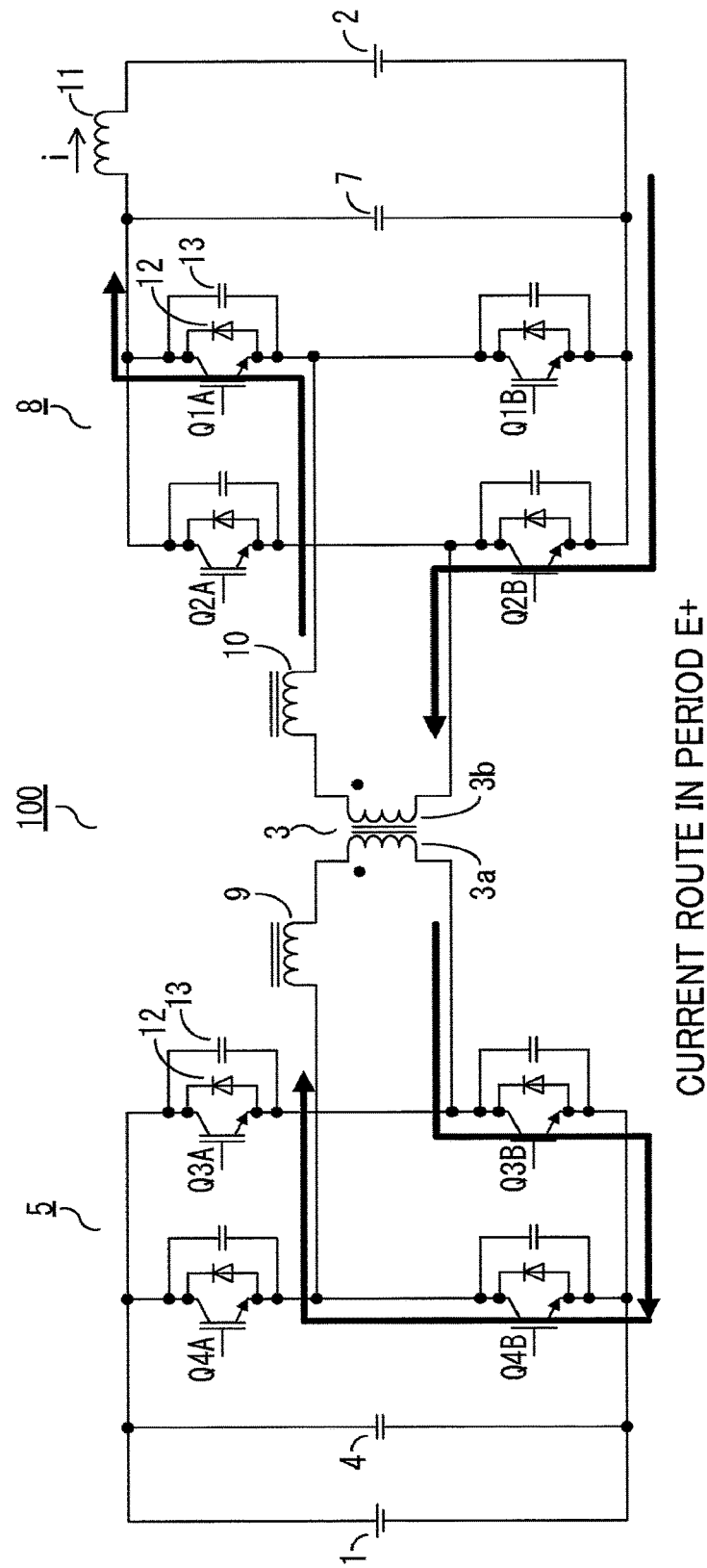
FIG. 7 is a current route diagram illustrating charging operation of the battery charge/discharge device according to embodiment 1 of the present invention.

During the period E+, in the first switching circuit 5, Q4A is turned off and current circulates via the diode of Q4B, and Q3B. In the second switching circuit 8, the diode of Q1A, and Q2B or the diode of Q2B are ON, and therefore the circulation current gradually decreases due to voltage of the battery 2. When the circulation current becomes 0 [A], the diode of Q1A is turned off and the current keeps 0 [A]. Thus, the period E+ is a period during which the circulation current decreases (FIG. 7).

Figure 8:
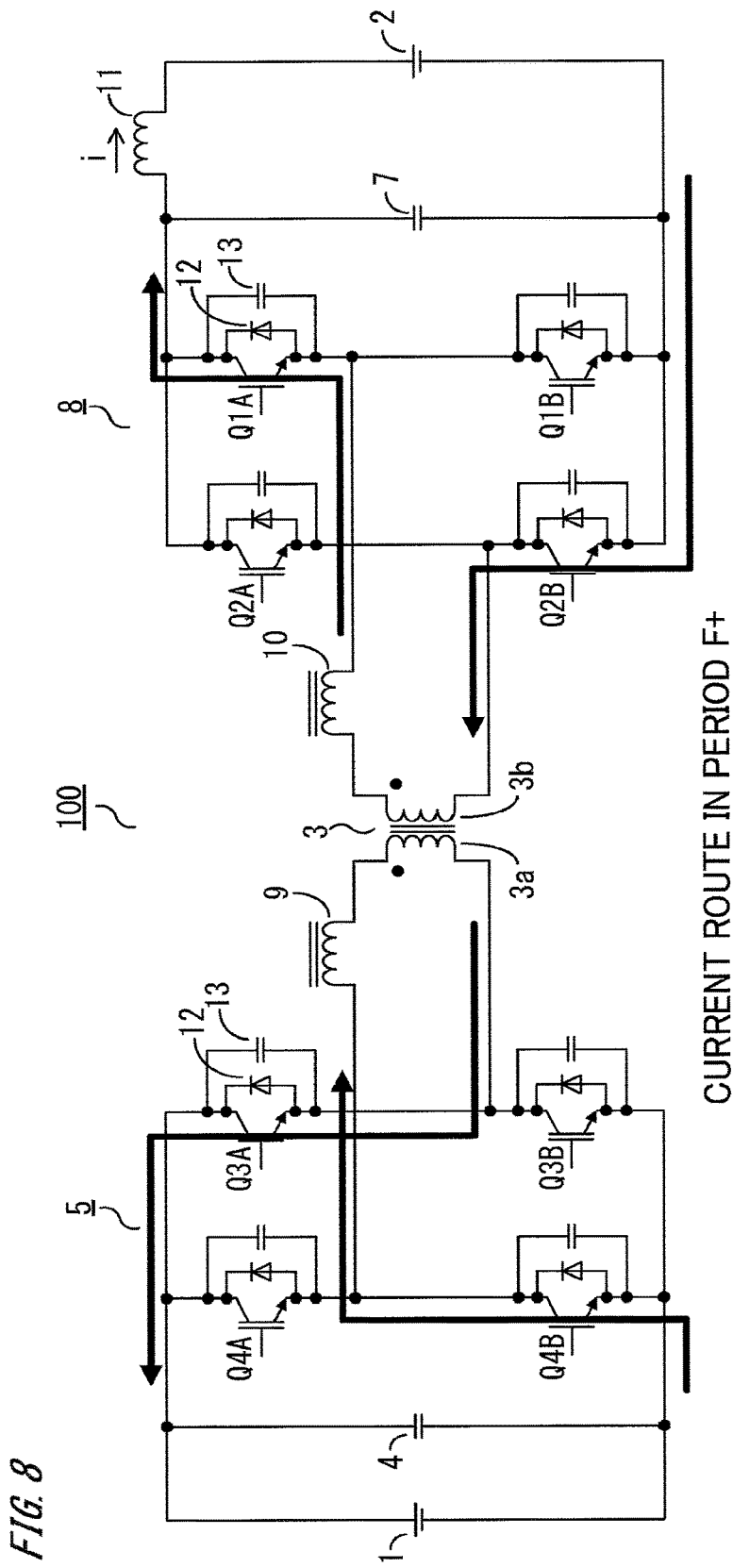
FIG. 8 is a current route diagram illustrating charging operation of the battery charge/discharge device according to embodiment 1 of the present invention.

During the period F+, in the first switching circuit 5, Q3B is turned off and Q4B is turned on. Since Q4B is turned on from a diode conductive state, ZVS (zero voltage switching) is achieved. If, in the period E+, the circulation current is greater than 0 [A], that is, some current remains, current is regenerated via Q4B or the diode of Q4B, and the diode of Q3A, to the DC power supply 1 side. In the second switching circuit 8, the diode of Q1A, and Q2B or the diode of Q2B are ON, and therefore the circulation current gradually decreases due to (voltage of DC power supply 1−voltage of battery 2). When the circulation current becomes 0 [A], the diode of Q1A is turned off and the current keeps 0 [A]. Thus, the period F is a period during which the circulation current decreases (FIG. 8).

Figure 9:
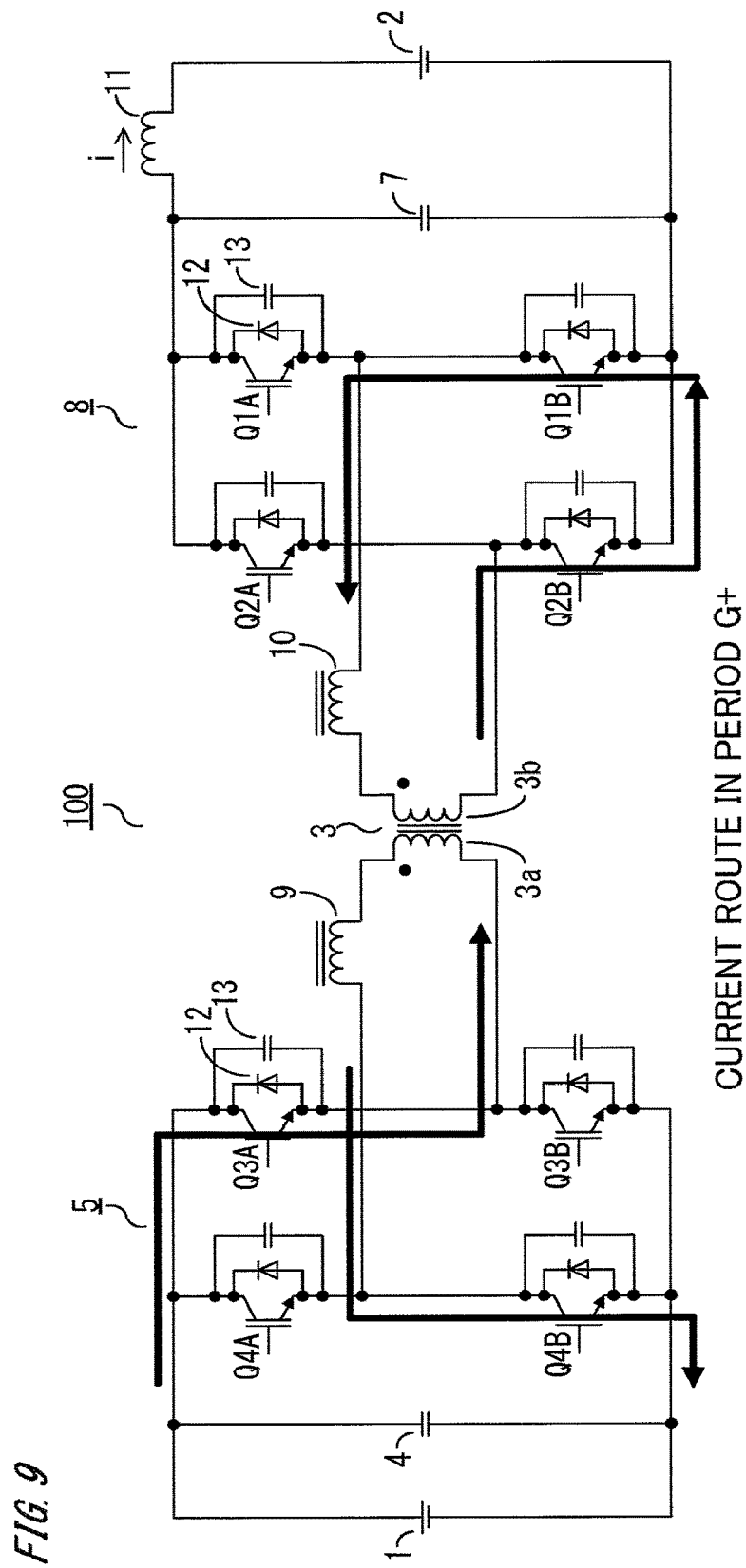
FIG. 9 is a current route diagram illustrating charging operation of the battery charge/discharge device according to embodiment 1 of the present invention.

During the period G+, in the first switching circuit 5, Q3A is turned on, so that Q3A and Q4B are ON and thus the diagonal two elements are conductive. Therefore, energy is transmitted via Q3A and Q4B from the DC power supply 1 side. At this time, the polarity of current is opposite to that in the period F+. In the second switching circuit 8, Q2B is ON and therefore current circulates via the diode of Q1B, and Q2B. Thus, the period G+ is a period during which the first reactor 9 and the second reactor 10 are excited (FIG. 9).

Figure 10:
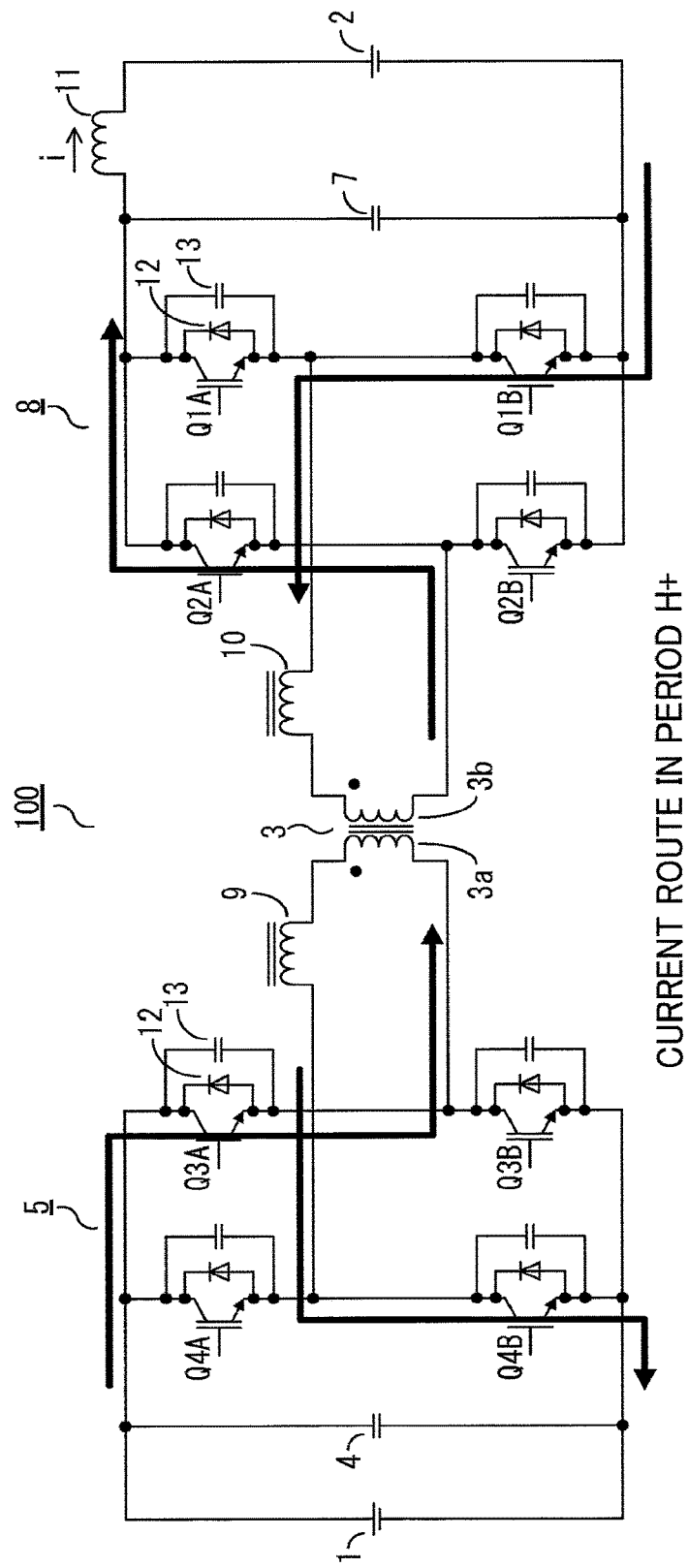
FIG. 10 is a current route diagram illustrating charging operation of the battery charge/discharge device according to embodiment 1 of the present invention.

During the period H+, in the first switching circuit 5, Q3A and Q4B are ON and thus the diagonal two elements are conductive. Therefore, energy is transmitted via Q3A and Q4B from the DC power supply 1 side. In the second switching circuit 8, Q2B is turned off, current flows via the diode of Q2A and the diode of Q1B, and power is transmitted to the battery 2 side. Thus, the period H+ is a period during which the excitation energy of the first reactor 9 and the second reactor 10 is transmitted to the battery 2 side (FIG. 10).

Figure 11:
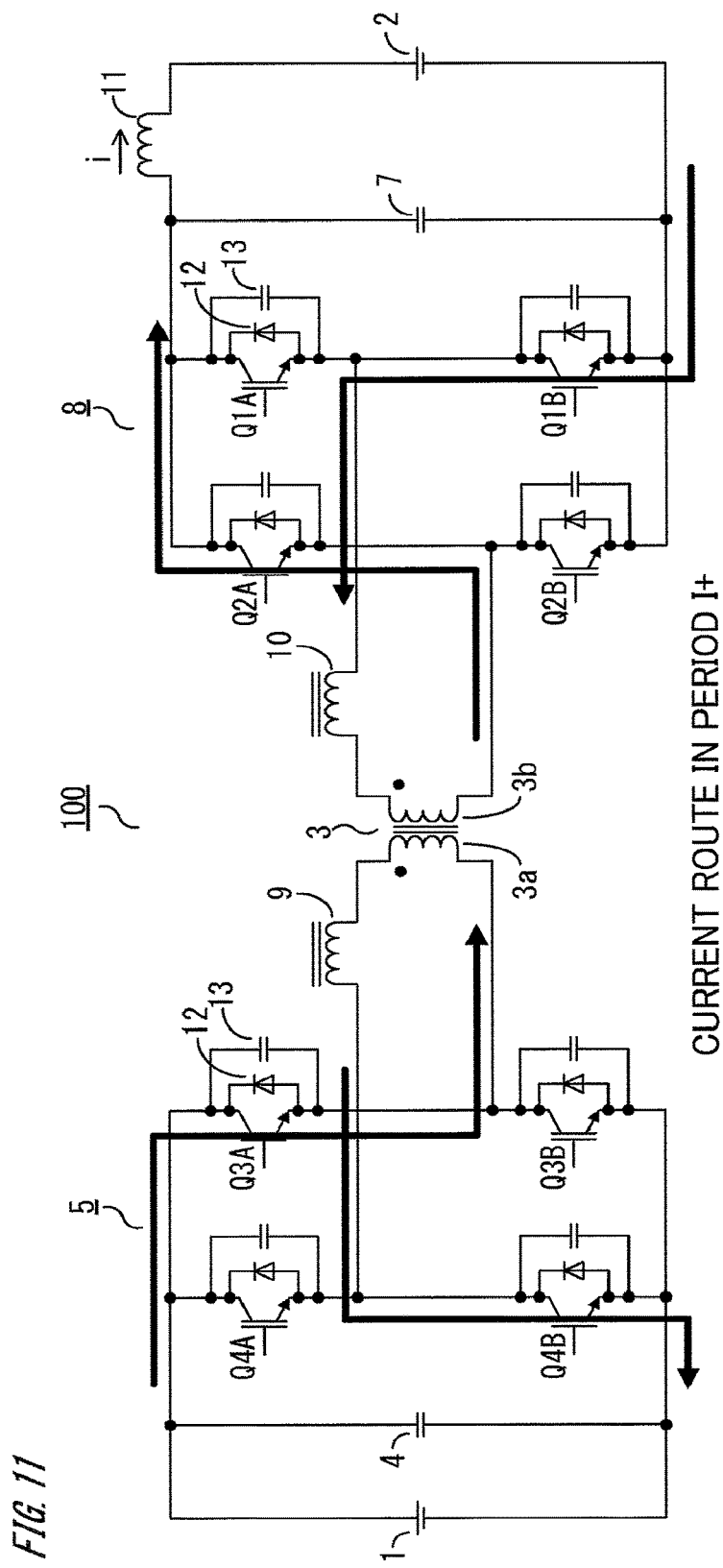
FIG. 11 is a current route diagram illustrating charging operation of the battery charge/discharge device according to embodiment 1 of the present invention.

During the period I+, in the first switching circuit 5, Q3A and Q4B are ON and thus the diagonal two elements are conductive. Therefore, energy is transmitted from the DC power supply 1 side. In the second switching circuit 8, Q2A is turned on, current flows via Q2A or the diode of Q2A, and the diode of Q1B, and power is transmitted to the battery 2 side. Thus, the period I+ is a period during which the excitation energy of the first reactor 9 and the second reactor 10 is transmitted to the battery 2 side (FIG. 11).

Figure 12:
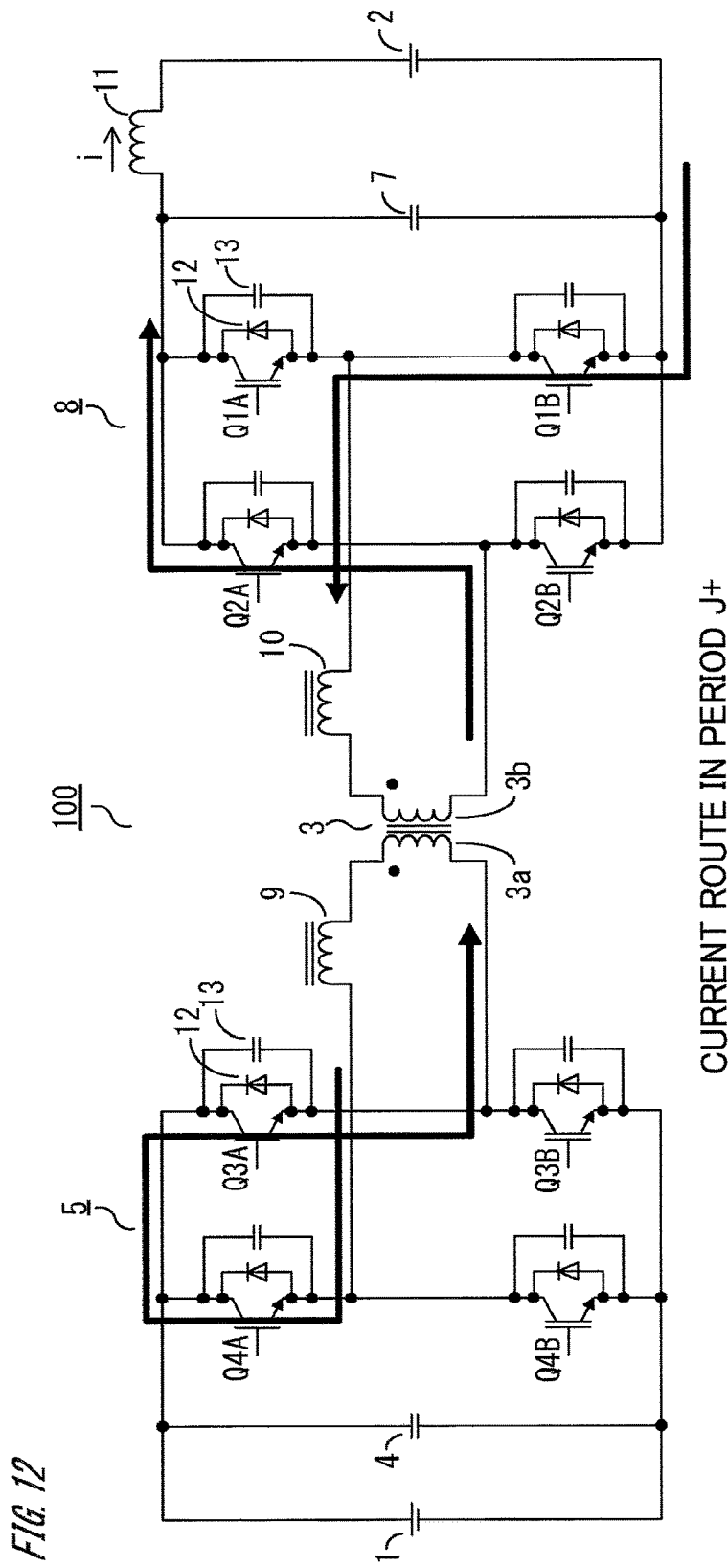
FIG. 12 is a current route diagram illustrating charging operation of the battery charge/discharge device according to embodiment 1 of the present invention.

During the period J+, in the first switching circuit 5, Q4B is turned off and current circulates via the diode of Q4A, and Q3A. In the second switching circuit 8, Q2A or the diode of Q2A, and the diode of Q1B are ON, and therefore the circulation current gradually decreases due to voltage of the battery 2. When the circulation current becomes 0 [A], the diode of Q1B is turned off and the current keeps 0 [A]. Thus, the period J+ is a period during which the circulation current decreases (FIG. 12).

Figure 13:
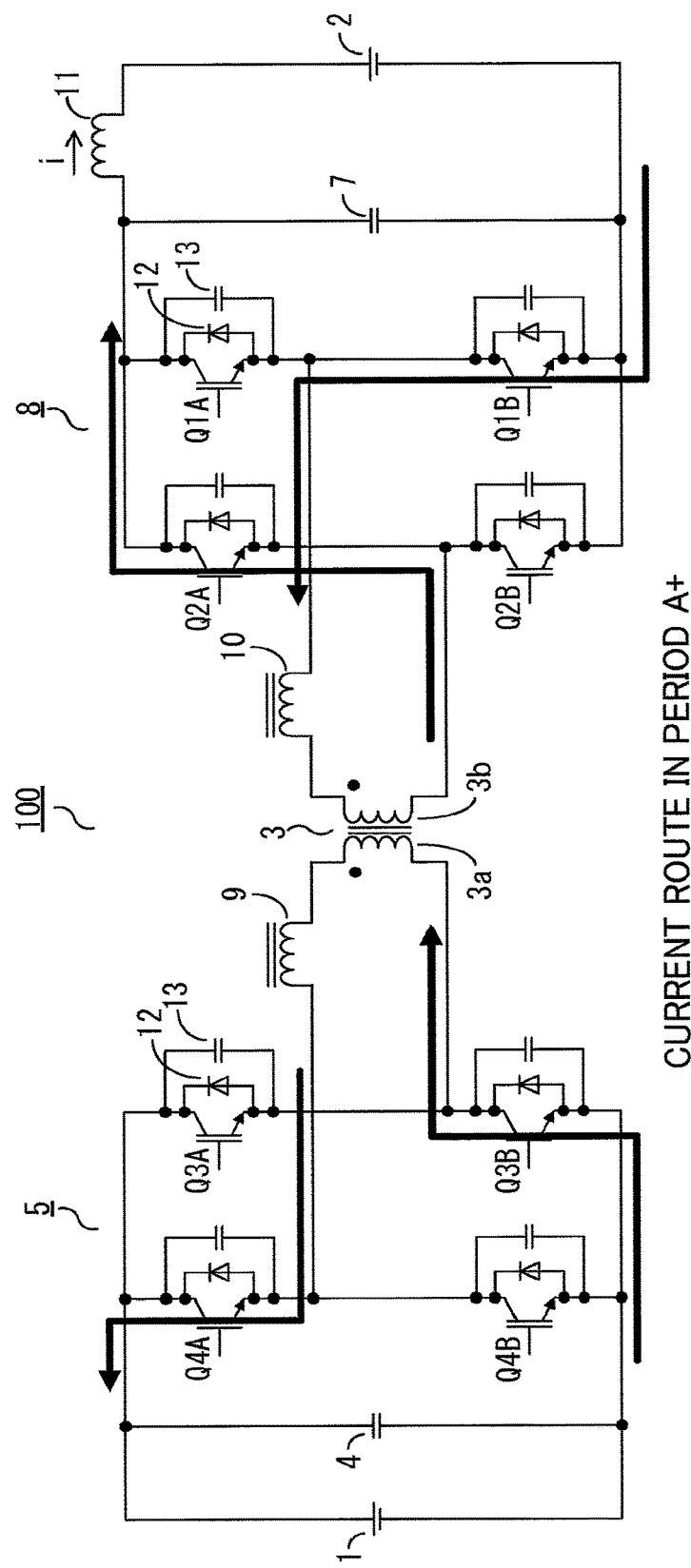
FIG. 13 is a current route diagram illustrating charging operation of the battery charge/discharge device according to embodiment 1 of the present invention.

Next, during the period A+, in the first switching circuit 5, Q3A is turned off and Q4A is turned on. Since Q4A is turned on from a diode conductive state, ZVS (zero voltage switching) is achieved. If, in the period J+, the circulation current is greater than 0 [A], that is, some current remains, current is regenerated via Q4A or the diode of Q4A, and the diode of Q3B, to the DC power supply 1 side. In the second switching circuit 8, Q2A or the diode of Q2A, and the diode of Q1B are ON, and therefore the circulation current gradually decreases due to (voltage of DC power supply 1−voltage of battery 2). When the circulation current becomes 0 [A], the diode of Q1B is turned off and the current keeps 0 [A]. Thus, the period A+ is a period during which the circulation current decreases (FIG. 13).

Through repetition of such a series of controls (periods A+ to J+), the battery charge/discharge device 100 steps up voltage generated at the second winding 3b of the transformer 3 and supplies the resultant power to the battery 2.

If voltage of the DC power supply 1 is denoted by VL, the first switching circuit 5 outputs a positive pulse of voltage VL during the diagonal ON time t1 in which Q4A and Q3B are both ON, and outputs a negative pulse of voltage (−VL) during the diagonal ON time t1a in which Q4B and Q3A are both ON, to apply these pulses to the first winding 3a of the transformer 3. If the turns ratio between the first winding 3a and the second winding 3b of the transformer 3 is NL:NB, at this time, voltage of (±VL)×NB/NL is applied to the second winding 3b of the transformer 3.

In the second switching circuit 8, in the diagonal ON time (t1, t1a) during which voltage is applied to the transformer 3, a period (B+, G+) during which the second reactor 10 is excited is provided, that is, step-up operation is performed using the second reactor 10 as a step-up reactor.

All the switching operations of the semiconductor switching elements Q in the first switching circuit 5 on the primary side of the transformer 3 are zero voltage switching, owing to the effect of the capacitor 13 and the first reactor 9. As for the switching operations in the second switching circuit 8 on the secondary side, some of them are zero voltage switching.

Q1A and Q1B in the second bridge circuit (Q1A, Q1B) are kept in an OFF state. Therefore, in the periods E+ and F+, when the circulation current decreases to be 0 [A], the diode of Q1A is turned off and the current keeps 0 [A], so that reverse current does not flow. Also in the periods J+ and A+, when the circulation current decreases to be 0 [A], the diode of Q1B is turned off and the current keeps 0 [A], so that reverse current does not flow. Therefore, in the battery charge/discharge device 100, reactive power which does not contribute to power transmission is suppressed.

Figure 14:
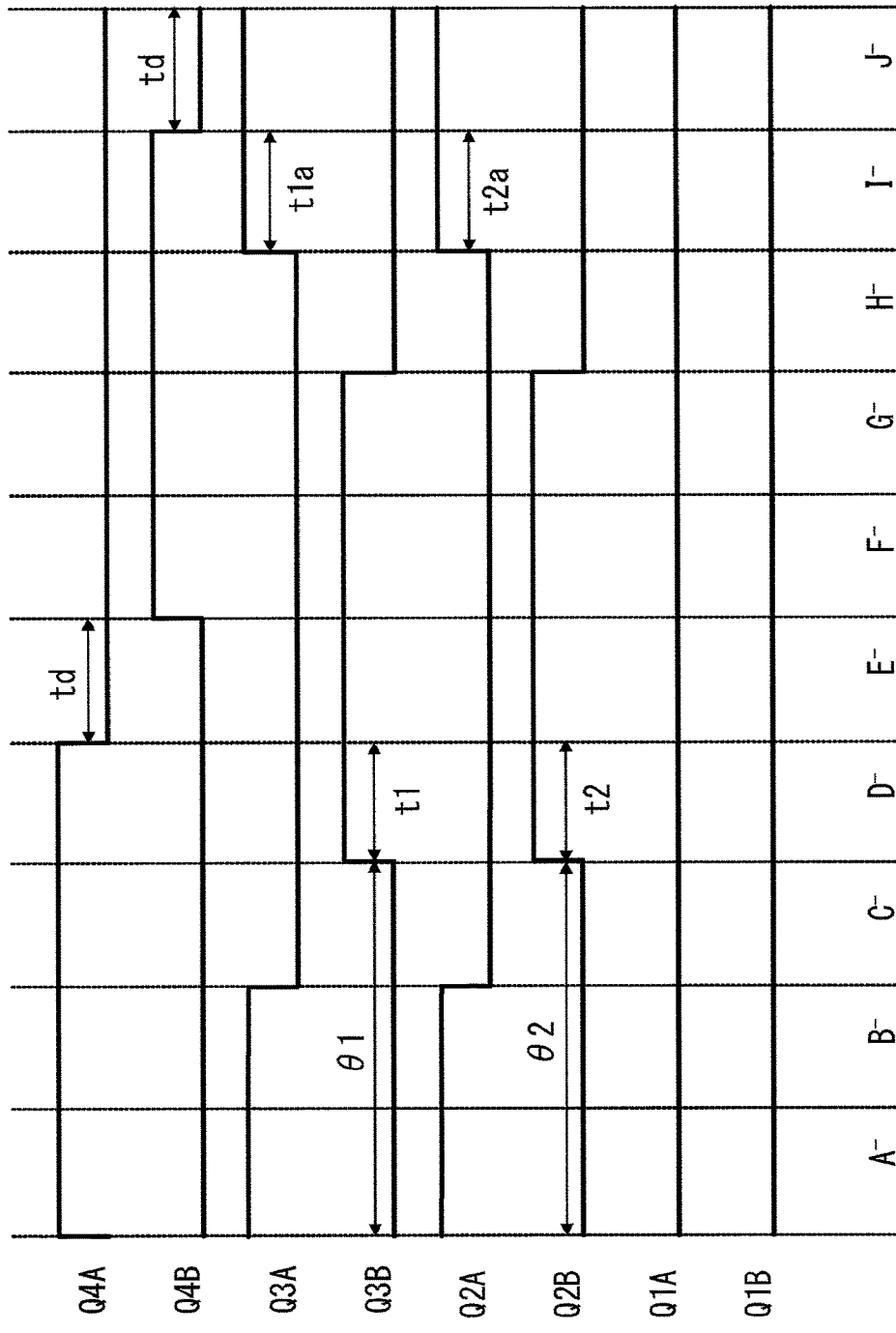
FIG. 14 is a drive signal waveform diagram of the battery charge/discharge device according to embodiment 1 of the present invention.

Next, FIG. 14 is a diagram showing waveforms of the drive signals 21a, 21b for the semiconductor switching elements Q of the first switching circuit 5 and the second switching circuit 8 in step-down charging of the battery charge/discharge device 100. Also in this case, they are shown with periods A− to J− allocated for respective plurality of gate patterns which are combination patterns of the drive signals, and for convenience sake, the drive signals for Q4A, Q4B, Q3A, Q3B, Q2A, Q2B, Q1A, Q1B are denoted by the reference characters of these elements.

As in the case of step-up charging shown in FIG. 3, the entire drive signals are generated using, as a reference, a first bridge circuit (Q4A, Q4B) in the first switching circuit 5, and Q1A and Q1B of a second bridge circuit (Q1A, Q1B) in the second switching circuit 8 are kept in an OFF state. In the three bridge circuits other than the second bridge circuit (Q1A, Q1B), the positive-side (high-voltage-side) Q4A, Q3A, Q2A and the negative-side (low-voltage-side) Q4B, Q3B, Q2B composing the bridge circuits are each controlled at an ON time ratio of 50% excluding the short-circuit prevention time td.

A phase shift amount θ1 (first phase shift amount) of the drive signal for the first diagonal element Q3B relative to the phase of the drive signal for the first reference element Q4A, and a phase shift amount θ2 (second phase shift amount) of the drive signal for the second diagonal element Q2B relative to the phase of the drive signal for the first reference element Q4A are determined in accordance with the duty cycle D which is a control command. In this case, the phase shift amount θ1 is equal to the phase shift amount θ2, and both phase shift amounts θ1, θ2 are changed in accordance with the duty cycle D.

Also in this case, the diagonal ON times t1, t1a are determined by the phase shift amount θ1. In addition, if drive signals equal to those for the first bridge circuit (Q4A, Q4B) are assumed as virtual drive signals for the second bridge circuit (Q1A, Q1B), virtual diagonal ON times t2, t2a as described above are determined by the phase shift amount θ2. In this case, the diagonal ON times t1, t1a are equal to the virtual diagonal ON times t2, t2a.

FIG. 15 to FIG. 24 show current routes according to the respective gate patterns in FIG. 14. FIG. 15 to FIG. 24 respectively correspond to the periods D− to J− and then the periods A− to C− in FIG. 14, in this order.

Hereinafter, operation of the battery charge/discharge device 100 in one cycle will be described with reference to FIG. 14 and FIG. 15 to FIG. 24. Here, voltage of the battery 2 is lower than voltage generated at the second winding 3b, and power is transmitted from the DC power supply 1 to the battery 2.

For convenience sake, the description will be started from the period D−.

Figure 15:
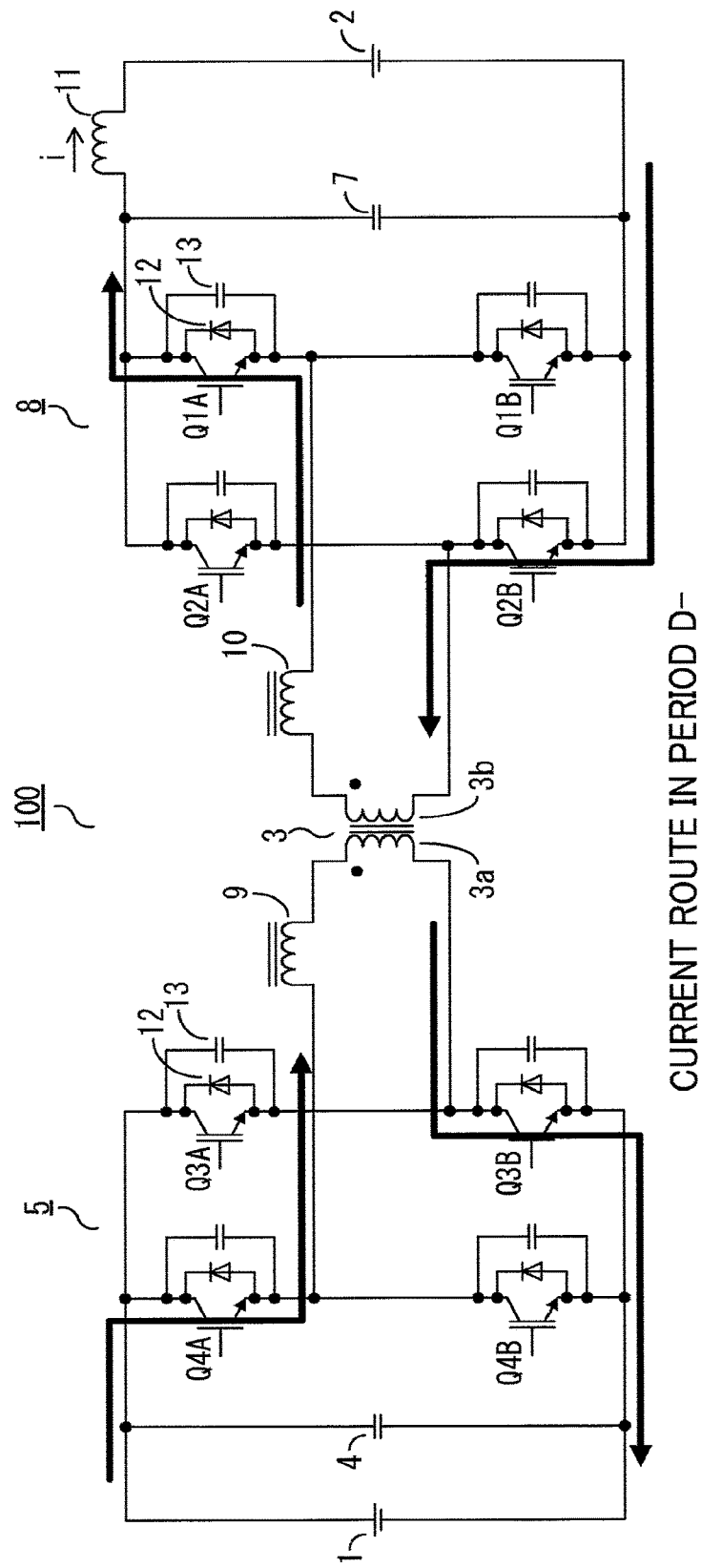
FIG. 15 is a current route diagram illustrating charging operation of the battery charge/discharge device according to embodiment 1 of the present invention.

During the period D−, in the first switching circuit 5, Q3B is turned on, so that Q4A and Q3B are ON and thus the diagonal two elements are conductive. Therefore, energy is transmitted from the DC power supply 1 side. In the second switching circuit 8, Q2B is turned on, current flows via Q2B or the diode of Q2B from the diode of Q1A, and power is transmitted to the battery 2 side. Thus, the period D− is a period during which power is transmitted to the battery 2 side (FIG. 15).

Figure 16:
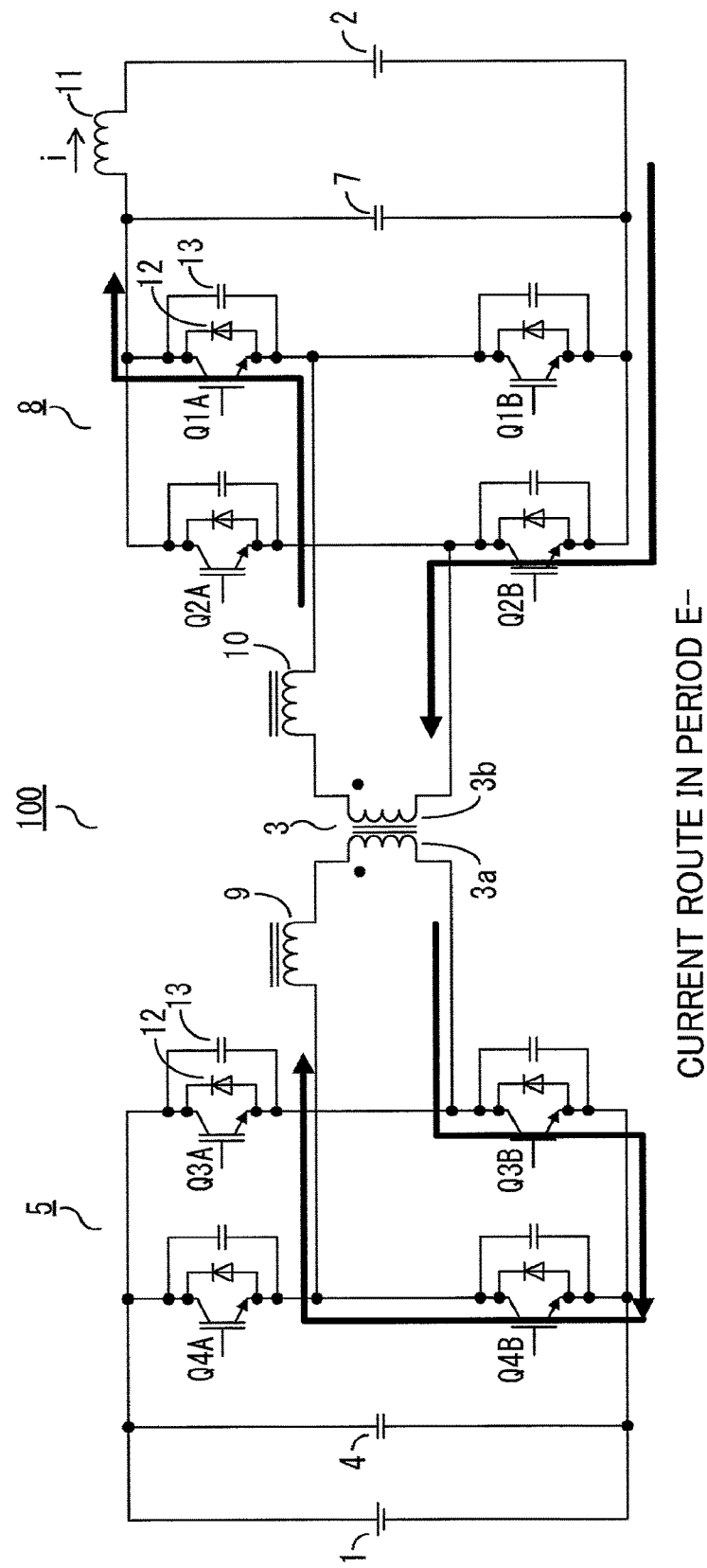
FIG. 16 is a current route diagram illustrating charging operation of the battery charge/discharge device according to embodiment 1 of the present invention.

During the period E−, in the first switching circuit 5, Q4A is turned off and current circulates via the diode of Q4B, and Q3B. In the second switching circuit 8, the diode of Q1A, and Q2B or the diode of Q2B are ON, and therefore the circulation current gradually decreases due to voltage of the battery 2. When the circulation current becomes 0 [A], the diode of Q1A is turned off and the current keeps 0 [A]. Thus, the period E– is a period during which the circulation current decreases (FIG. 16).

Figure 17:
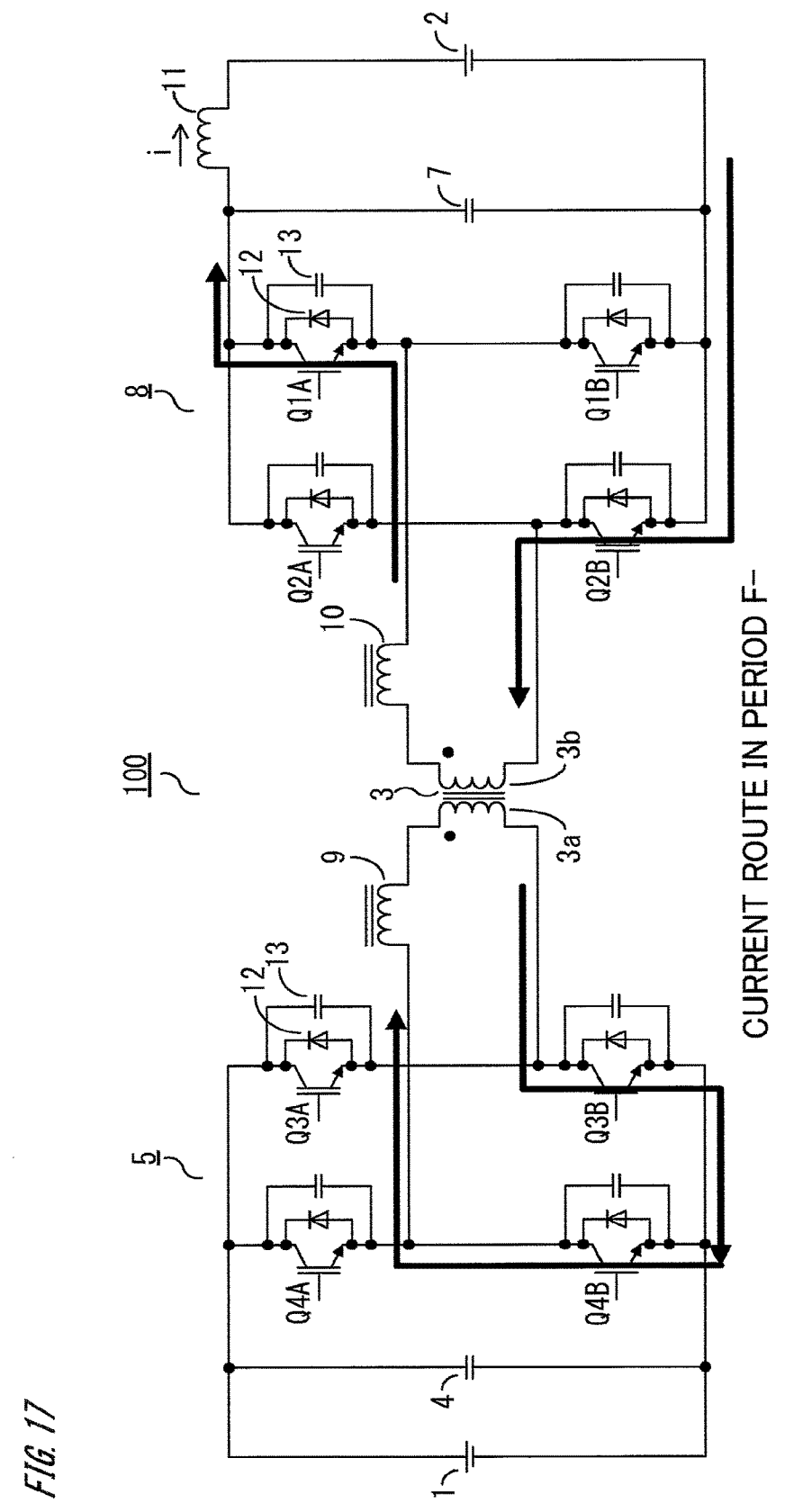
Figure 18:
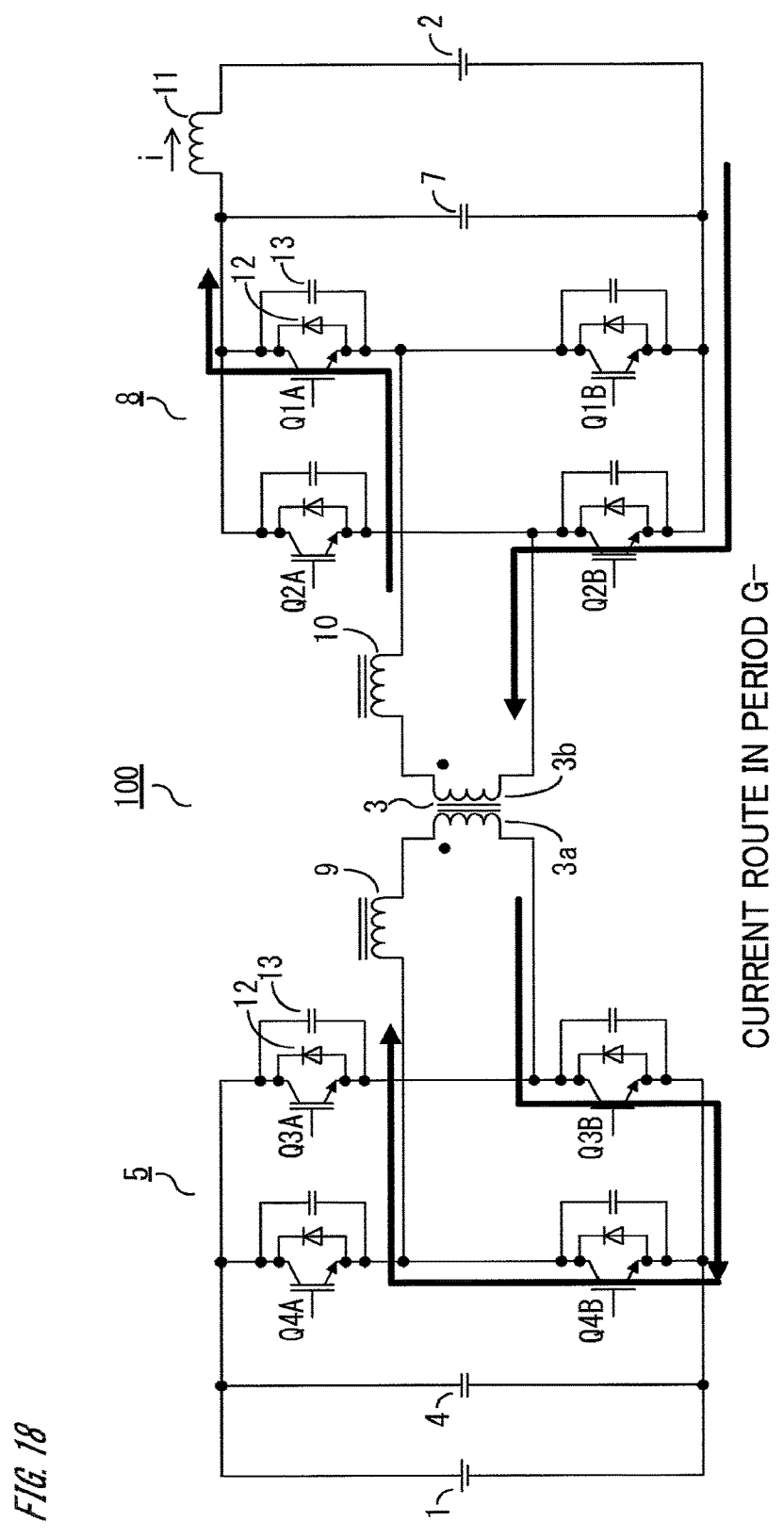

During the periods F–, G–, in the first switching circuit 5, Q4B is turned on and current circulates via Q4B or the diode of Q4B, and Q3B. Since Q4B is turned on from a diode conductive state, ZVS (zero voltage switching) is achieved. In the second switching circuit 8, the diode of Q1A, and Q2B or the diode of Q2B are ON, and therefore the circulation current gradually decreases due to voltage of the battery 2. When the circulation current becomes 0 [A], the diode of Q1A is turned off and the current keeps 0 [A]. Thus, the periods F–, G– are periods during which the circulation current decreases (FIG. 17, FIG. 18).

Figure 19:
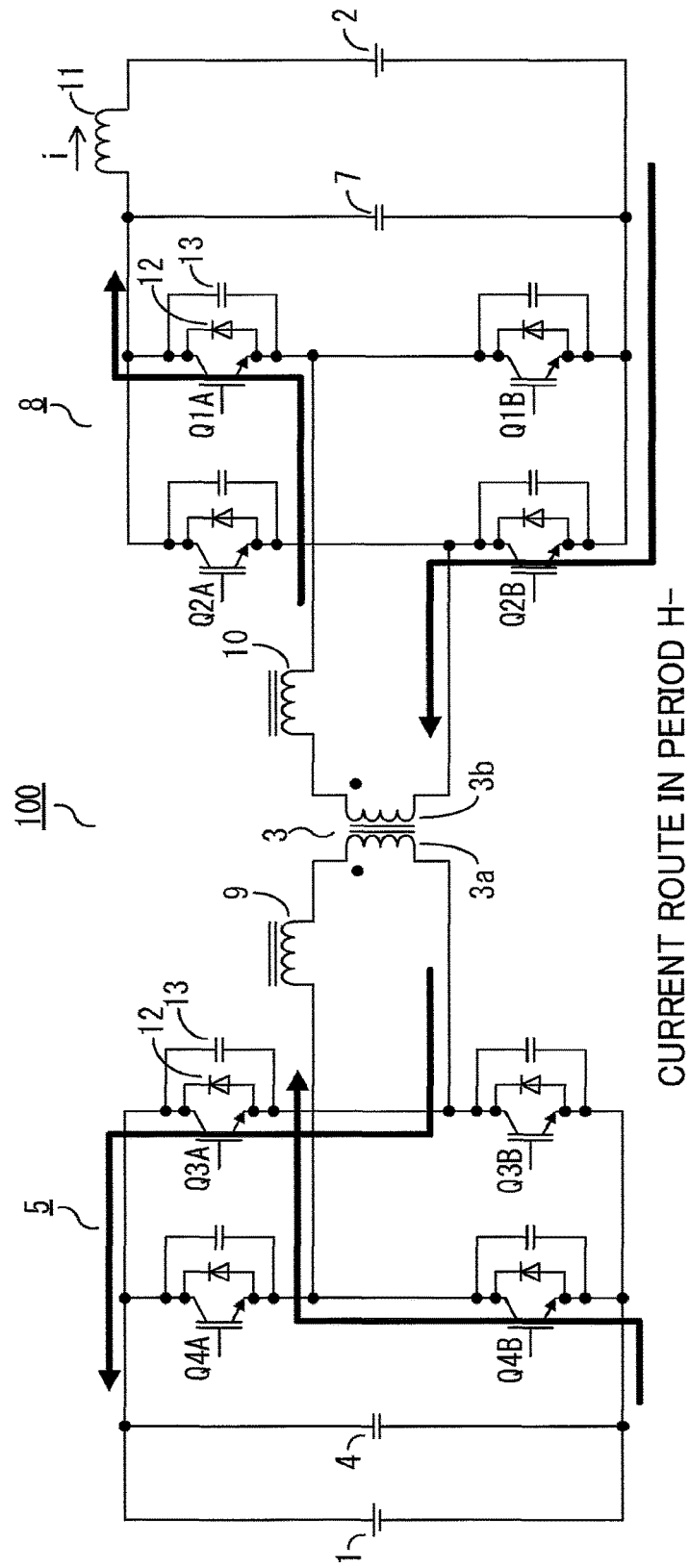
FIG. 19 is a current route diagram illustrating charging operation of the battery charge/discharge device according to embodiment 1 of the present invention.

During the period H–, in the first switching circuit 5, Q3B is turned off, and if the circulation current is greater than 0 [A], that is, some current remains, current is regenerated via Q4B or the diode of Q4B, and the diode of Q3A, to the DC power supply 1 side. In the second switching circuit 8, Q2B is turned off, but since the diode of Q1A and the diode of Q2B are ON, the circulation current gradually decreases due to (voltage of DC power supply 1–voltage of battery 2). When the circulation current becomes 0 [A], the diode of Q1A is turned off and the current keeps 0 [A]. Thus, the period H– is a period during which the circulation current decreases (FIG. 19).

Figure 20:
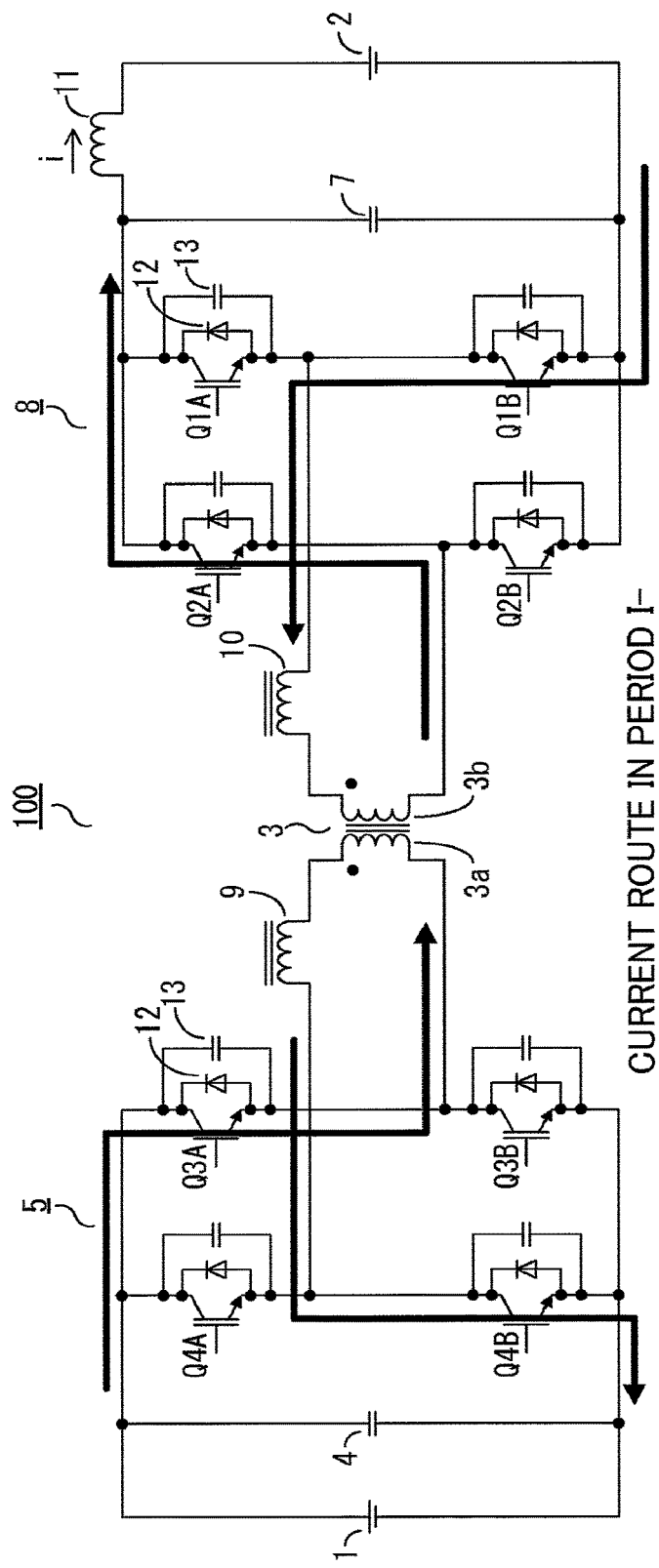
FIG. 20 is a current route diagram illustrating charging operation of the battery charge/discharge device according to embodiment 1 of the present invention.

During the period I–, in the first switching circuit 5, Q3A is turned on, so that Q3A and Q4B are ON and thus the diagonal two elements are conductive. Therefore, energy is transmitted via Q3A and Q4B from the DC power supply 1 side. At this time, the polarity of current is opposite to that in the period H–. In the second switching circuit 8, Q2A is turned on, current flows via Q2A or the diode of Q2A, and the diode of Q1B, and power is transmitted to the battery 2 side. Thus, the period I– is a period during which power is transmitted to the battery 2 side (FIG. 20).

Figure 21:
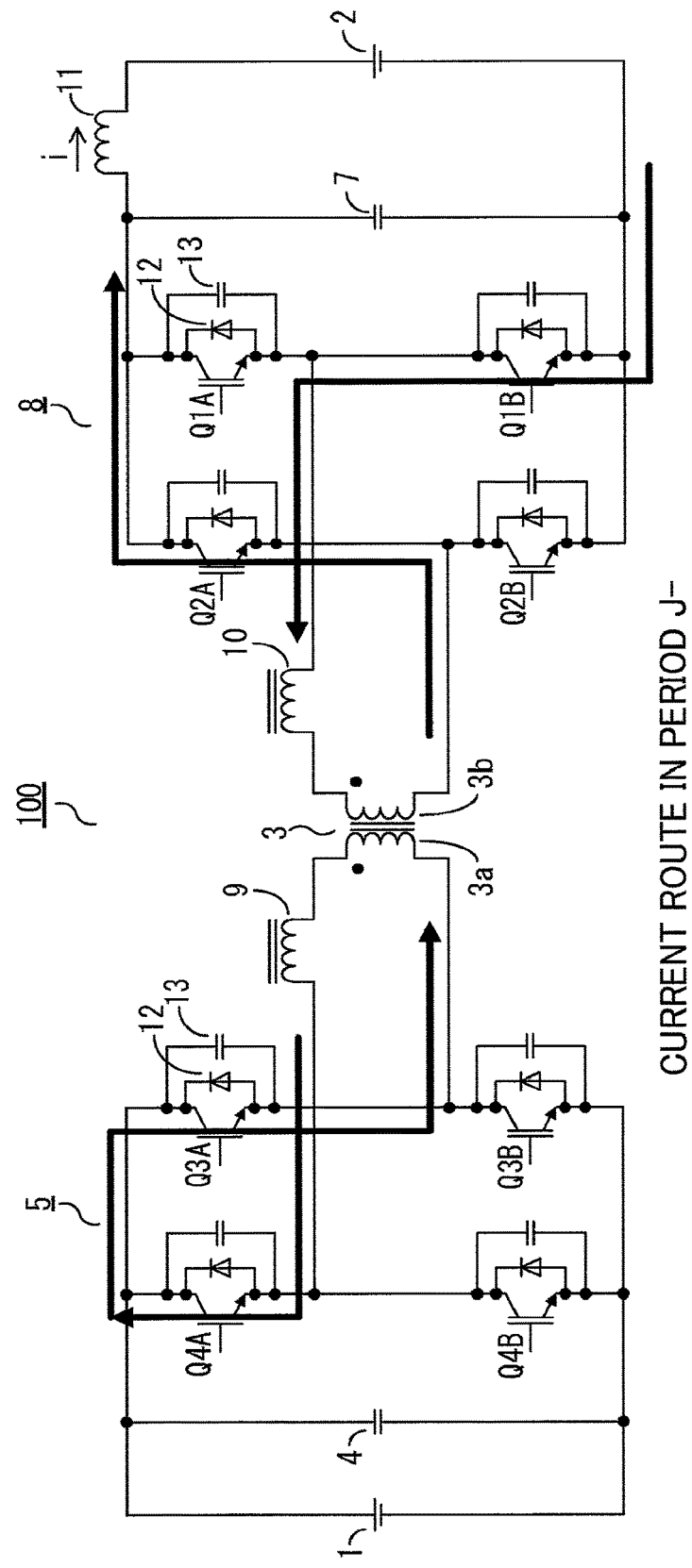
FIG. 21 is a current route diagram illustrating charging operation of the battery charge/discharge device according to embodiment 1 of the present invention.

During the period J–, in the first switching circuit 5, Q4B is turned off and current circulates via the diode of Q4A, and Q3A. In the second switching circuit 8, the diode of Q1B, and Q2A or the diode of Q2A are ON, and therefore the circulation current gradually decreases due to voltage of the battery 2. When the circulation current becomes 0 [A], the diode of Q1B is turned off and the current keeps 0 [A]. Thus, the period J– is a period during which the circulation current decreases (FIG. 21).

Figure 22:
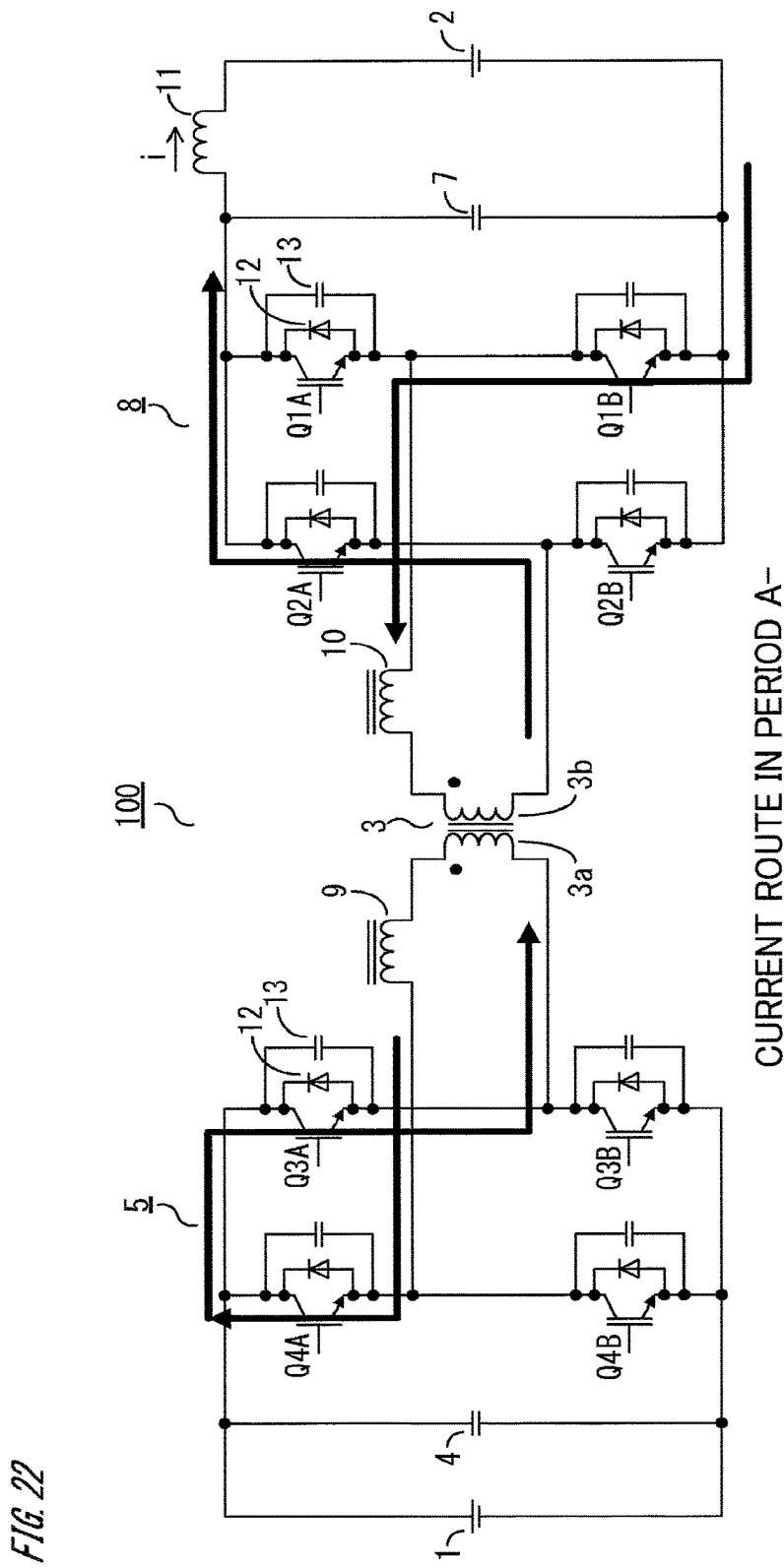
FIG. 22 is a current route diagram illustrating charging operation of the battery charge/discharge device according to embodiment 1 of the present invention.
Figure 23:
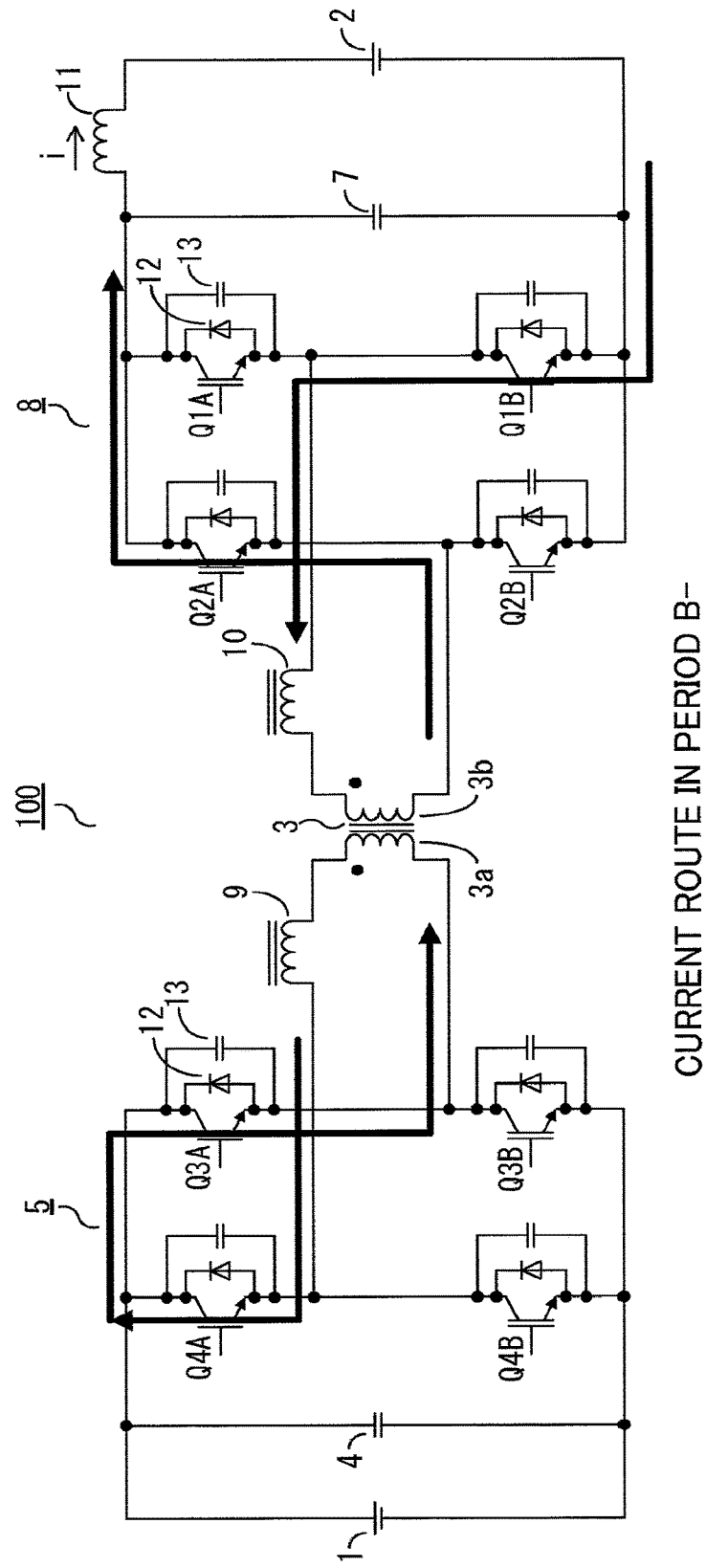
FIG. 23 is a current route diagram illustrating charging operation of the battery charge/discharge device according to embodiment 1 of the present invention.

Next, during the periods A–, B–, in the first switching circuit 5, Q4A is turned on and current circulates via Q4A or the diode of Q4A, and Q3A. Since Q4A is turned on from a diode conductive state, ZVS (zero voltage switching) is achieved. In the second switching circuit 8, the diode of Q1B, and Q2A or the diode of Q2A are ON, and therefore the circulation current gradually decreases due to voltage of the battery 2. When the circulation current becomes 0 [A], the diode of Q1B is turned off and the current keeps 0 [A]. Thus, the period J– is a period during which the circulation current decreases (FIG. 22, FIG. 23).

Figure 24:
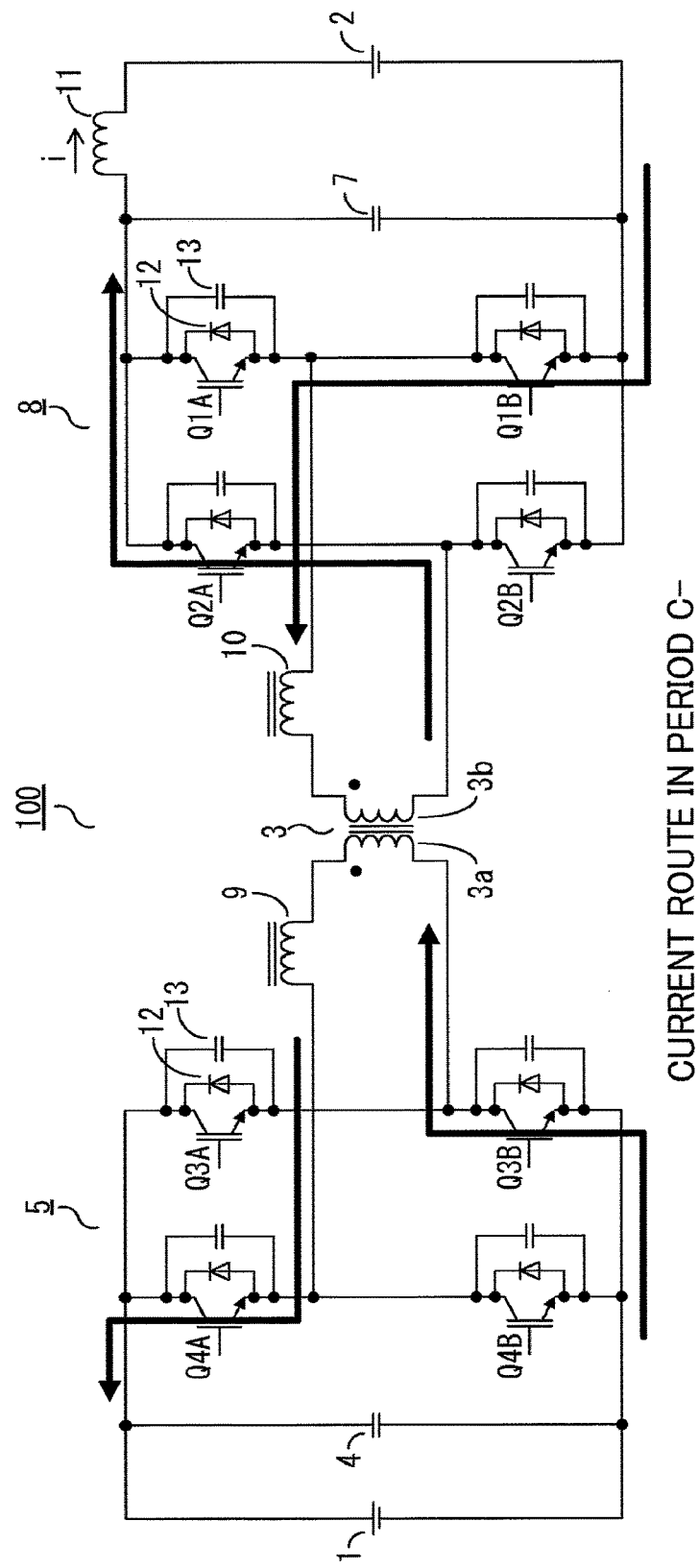
FIG. 24 is a current route diagram illustrating charging operation of the battery charge/discharge device according to embodiment 1 of the present invention.

During the period C–, in the first switching circuit 5, Q3A is turned off, and if the circulation current is greater than 0 [A], that is, some current remains, the current is regenerated via Q4A or the diode of Q4A, and the diode of Q3B, to the DC power supply 1 side. In the second switching circuit 8, Q2A is turned off, but since the diode of Q2A and the diode of Q1B are ON, the circulation current gradually decreases due to (voltage of DC power supply 1–voltage of battery 2). When the circulation current becomes 0 [A], the diode of Q1B is turned off and the current keeps 0 [A]. Thus, the period C– is a period during which the circulation current decreases (FIG. 24).

Through repetition of such a series of controls (periods A– to J–), the battery charge/discharge device 100 steps down voltage generated at the second winding 3b of the transformer 3 and supplies the resultant power to the battery 2.

All the switching operations of the semiconductor switching elements Q in the first switching circuit 5 on the primary side of the transformer 3 are zero voltage switching, owing to the effect of the capacitor 13 and the first reactor 9. As for the switching operations in the second switching circuit 8 on the secondary side, some of them are zero voltage switching.

Q1A and Q1B in the second bridge circuit (Q1A, Q1B) are kept in an OFF state. Therefore, in the periods E– to H–, when the circulation current decreases to be 0 [A], the diode of Q1A is turned off and the current keeps 0 [A], so that reverse current does not flow. Also in the periods J– and A– to C–, when the circulation current decreases to be 0 [A], the diode of Q1B is turned off and the current keeps 0 [A], so that reverse current does not flow.

Next, the case where the battery charge/discharge device 100 transmits power from the battery 2 to the DC power supply 1 will be described.

Figure 25:
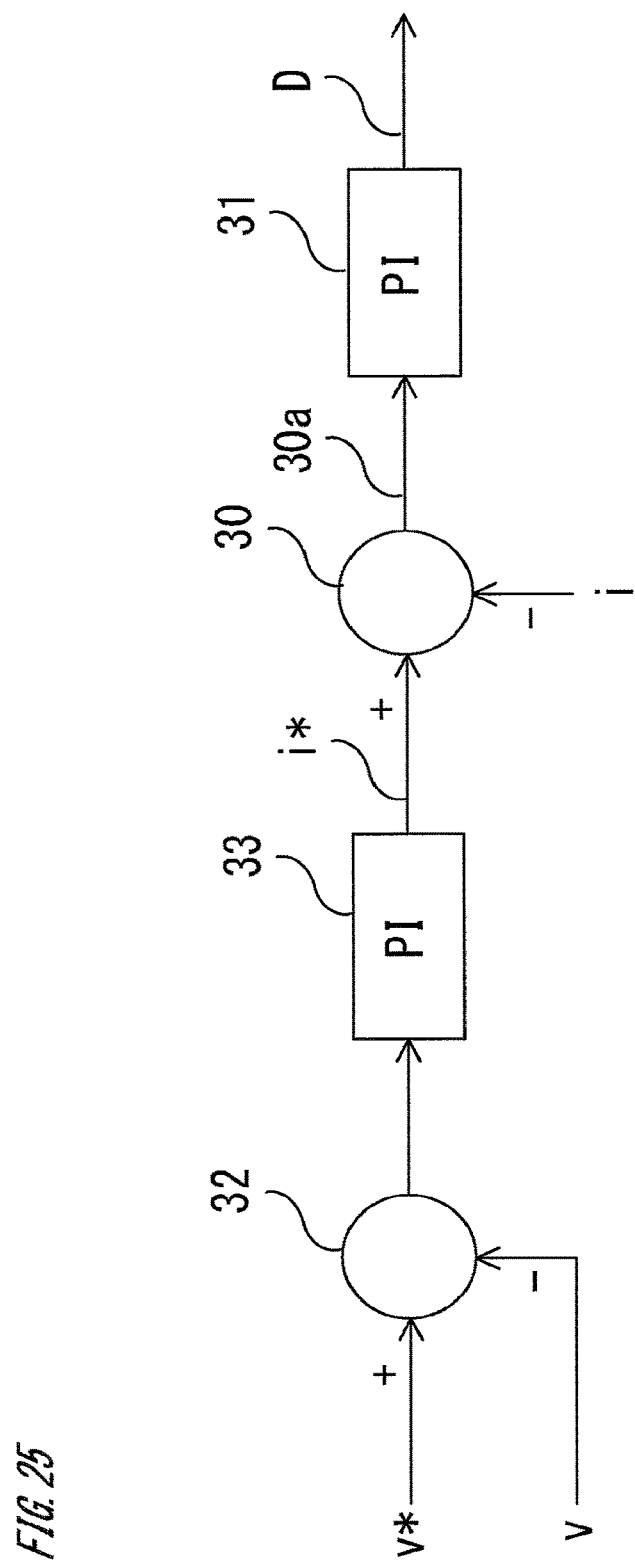
FIG. 25 is a control block diagram in the case where the battery charge/discharge device performs discharging, according to embodiment 1 of the present invention.

FIG. 25 is a control block diagram in the case where the battery charge/discharge device 100 transmits power from the battery 2 to the DC power supply 1, i.e., discharges the battery 2. In this case, the battery charge/discharge device 100 performs output to the DC power supply 1, and voltage v of the first smoothing capacitor 4 is detected as output voltage and then is inputted to the control circuit 20. As shown in FIG. 25, in the control circuit 20, a subtractor 32 subtracts the inputted output voltage v from an output voltage command value v* to calculate the difference voltage, and a PI controller 33 calculates a charge current command value i* so that the calculated difference voltage approaches zero.

Then, the subtractor 30 subtracts the inputted charge current i from the charge current command value i* to calculate a difference current value 30a, and the PI controller 31 performs feedback control so that the difference current value 30a approaches zero, thereby determining a duty cycle D for the first switching circuit 5 and the second switching circuit 8 and generating the drive signals 21a, 21b for the semiconductor switching elements Q.

The operation in the case where power is supplied from the battery 2 is reverse to that in the case where power is supplied from the DC power supply 1. Therefore, the polarities of the charge current i and the charge current command value i* are negative. The second smoothing capacitor 7 connected in parallel to the battery 2 has the same DC voltage as voltage of the battery 2.

Figure 26:
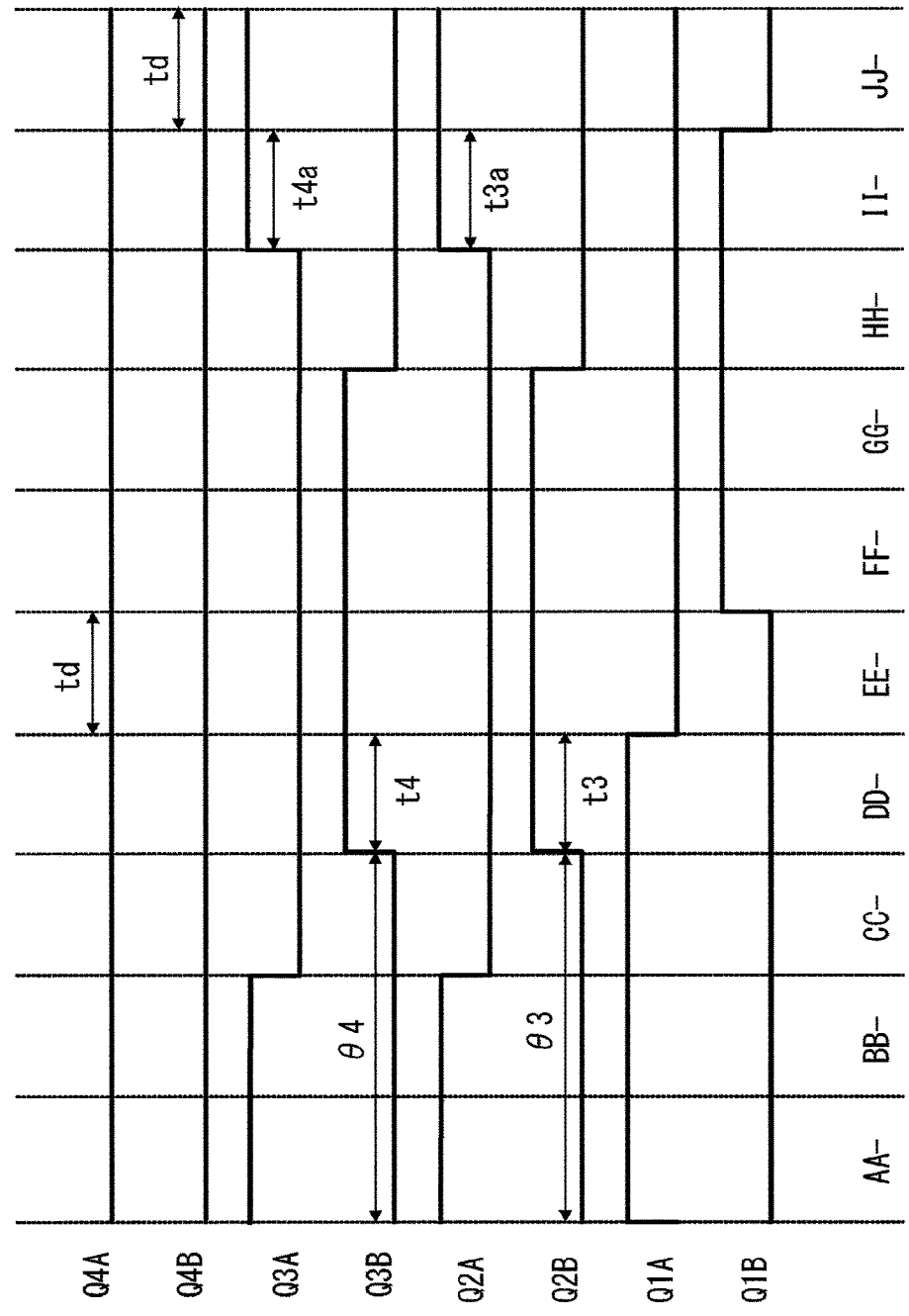
FIG. 26 is a drive signal waveform diagram of the battery charge/discharge device according to embodiment 1 of the present invention.
Figure 27:
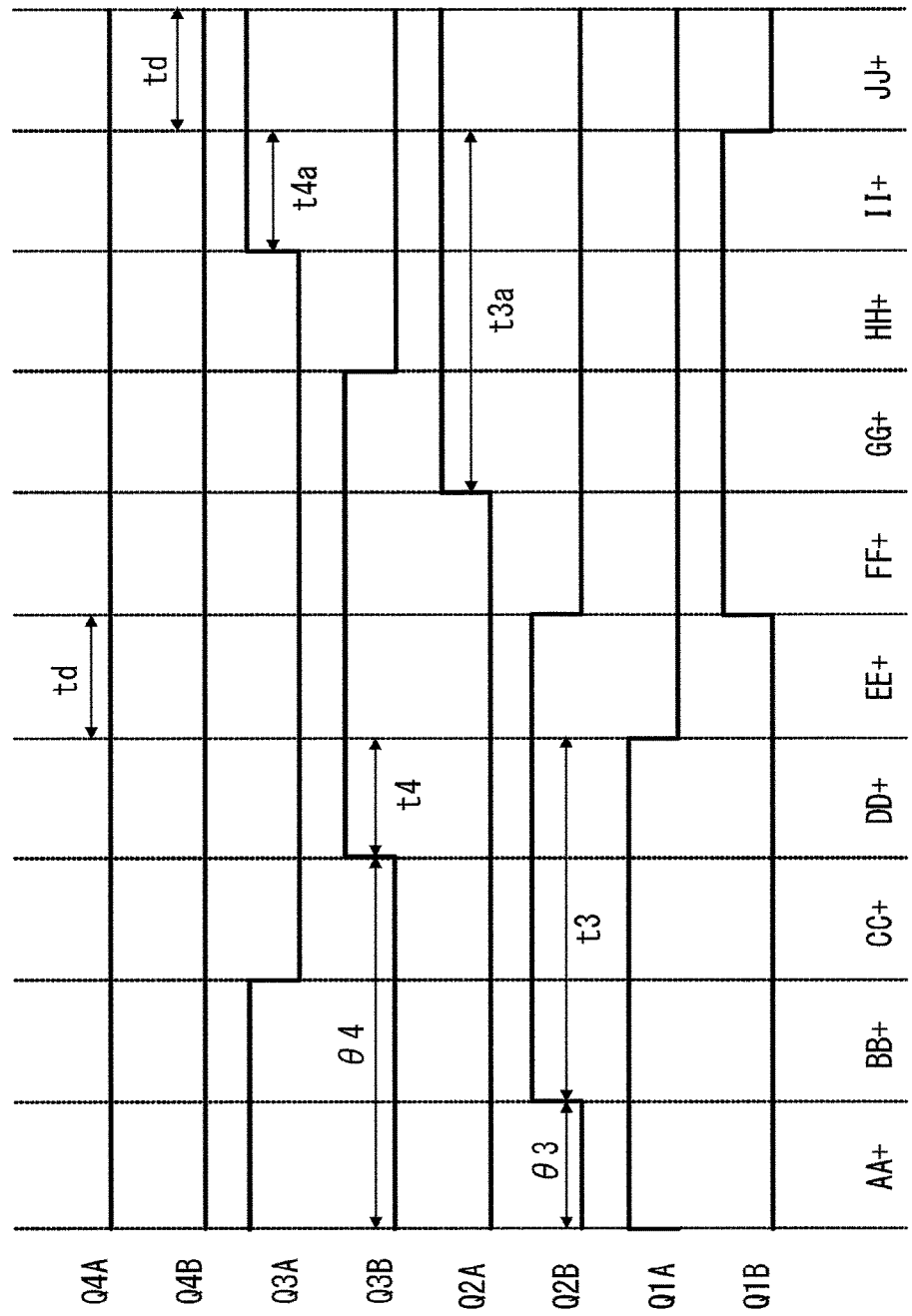
FIG. 27 is a drive signal waveform diagram of the battery charge/discharge device according to embodiment 1 of the present invention.

FIG. 26 is a diagram showing waveforms of the drive signals 21a, 21b for the semiconductor switching elements Q of the first switching circuit 5 and the second switching circuit 8 in step-down discharging of the battery charge/discharge device 100. FIG. 27 is a diagram showing waveforms of the drive signals 21a, 21b for the semiconductor switching elements Q of the first switching circuit 5 and the second switching circuit 8 in step-up discharging of the battery charge/discharge device 100.

As shown in FIG. 26, the operation of step-down discharging of the battery charge/discharge device 100 is reverse to that of step-down charging, and corresponds to operation obtained by replacing the drive signals for the first switching circuit 5 and the drive signals for the second switching circuit 8 in step-down charging with each other. In addition, operation in each period AA− to JJ− also corresponds to operation obtained by reversing the first switching circuit 5 part and the second switching circuit 8 part in each period A− to J− during step-down charging.

As shown in FIG. 27, the operation of step-up discharging of the battery charge/discharge device 100 is reverse to that of step-up charging, and corresponds to operation obtained by replacing the drive signals for the first switching circuit 5 and the drive signals for the second switching circuit 8 in step-up charging with each other. In addition, operation in each period AA+ to JJ+ also corresponds to operation obtained by reversing the first switching circuit 5 part and the second switching circuit 8 part in each period A+ to J+ during step-up charging.

If voltage of the battery 2 is denoted by VB, the second switching circuit 8 outputs a positive pulse of voltage VB during a diagonal ON time t3 in which Q1A (second reference element) and Q2B (second diagonal element) are both ON, and outputs a negative pulse of voltage (−VB) during a diagonal ON time t3a in which Q1B and Q2A are both ON, to apply these pulses to the second winding 3b of the transformer 3. If the turns ratio between the first winding 3a and the second winding 3b of the transformer 3 is NL:NB, at this time, voltage of (±VB)×NL/NB is applied to the first winding 3a of the transformer 3.

In step-down discharging shown in FIG. 26, voltage of the DC power supply 1 is lower than voltage generated at the first winding 3a, and in step-up discharging shown in FIG. 27, voltage of the DC power supply 1 is higher than voltage generated at the first winding 3a. In both operations, power is transmitted from the battery 2 to the DC power supply 1.

In battery discharging in which the battery charge/discharge device 100 transmits power from the battery 2 to the DC power supply 1, the first switching circuit 5 and the second switching circuit 8 are controlled as follows.

The entire drive signals are generated using, as a reference, the second bridge circuit (Q1A, Q1B) in the second switching circuit 8. Q4A and Q4B in the first bridge circuit (Q4A, Q4B) in the first switching circuit 5 are kept in an OFF state.

In the three bridge circuits other than the first bridge circuit (Q4A, Q4B), the positive-side (high-voltage-side) Q1A, Q2A, Q3A and the negative-side (low-voltage-side) Q1B, Q2B, Q3B composing the bridge circuits are each controlled at an ON time ratio of 50% excluding the short-circuit prevention time td. In this case, in switching of the semiconductor switching elements Q of the second switching circuit 8 on the power transmitting side, the control circuit 20 performs control so that, during the short-circuit prevention time td, voltage of the capacitor 13 connected in parallel to each semiconductor switching element Q increases to be voltage of the second smoothing capacitor 7 or decreases to be close to zero voltage, thereby performing zero voltage switching.

A phase shift amount θ3 (third phase shift amount) of the drive signal for the second diagonal element Q2B relative to the phase of the drive signal for the second reference element Q1A, and a phase shift amount θ4 (fourth phase shift amount) of the drive signal for the first diagonal element Q3B relative to the phase of the drive signal for the second reference element Q1A are determined in accordance with the duty cycle D which is a control command. That is, the phase shift amounts θ3, θ4 are controlled in accordance with the duty cycle D.

In step-down discharging shown in FIG. 26, the phase shift amount θ3 is equal to the phase shift amount θ4, and both phase shift amounts θ3, θ4 are changed in accordance with the duty cycle D. In step-up discharging shown in FIG. 27, the phase shift amount θ3 is kept minimum, and the phase shift amount θ4 is changed in accordance with the duty cycle.

As shown in FIG. 26 and FIG. 27, the diagonal ON time t3 during which Q1A and Q2B are both ON is determined by the phase shift amount θ3, and the diagonal ON time t3a during which Q1B and Q2A are both ON is also equal to the diagonal ON time t3.

In the control circuit 20, for the first bridge circuit (Q4A, Q4B), drive signals equal to those for the second bridge circuit (Q1A, Q1B) are assumed as virtual drive signals, and the period during which the virtual ON period of Q4A based on the virtual drive signal for Q4A overlaps the ON period of Q3B, is defined as a virtual diagonal ON time t4. The virtual diagonal ON time t4 is determined by the phase shift amount θ4. A virtual diagonal ON time t4a during which the virtual ON period of Q4B based on the virtual drive signal for Q4B overlaps the ON period of Q3A is also equal to the virtual diagonal ON time t4.

Thus, the battery charge/discharge device 100 has four control modes of step-up charging, step-down charging, step-down discharging, and step-up discharging, to perform bidirectional power transmission. As described above, in charging in which power is transmitted from the DC power supply 1 to the battery 2, the phase shift amount θ1 of the drive signal for the first diagonal element Q3B and the phase shift amount θ2 of the drive signal for the second diagonal element Q2B relative to the phase of the drive signal for the first reference element Q4A are controlled in accordance with the duty cycle D. In discharging in which power is transmitted from the DC power supply 1 to the battery 2, the phase shift amount θ3 of the drive signal for the second diagonal element Q2B and the phase shift amount θ4 of the drive signal for the first diagonal element Q3B relative to the phase of the drive signal for the second reference element Q1A are controlled in accordance with the duty cycle D.

Figure 28:
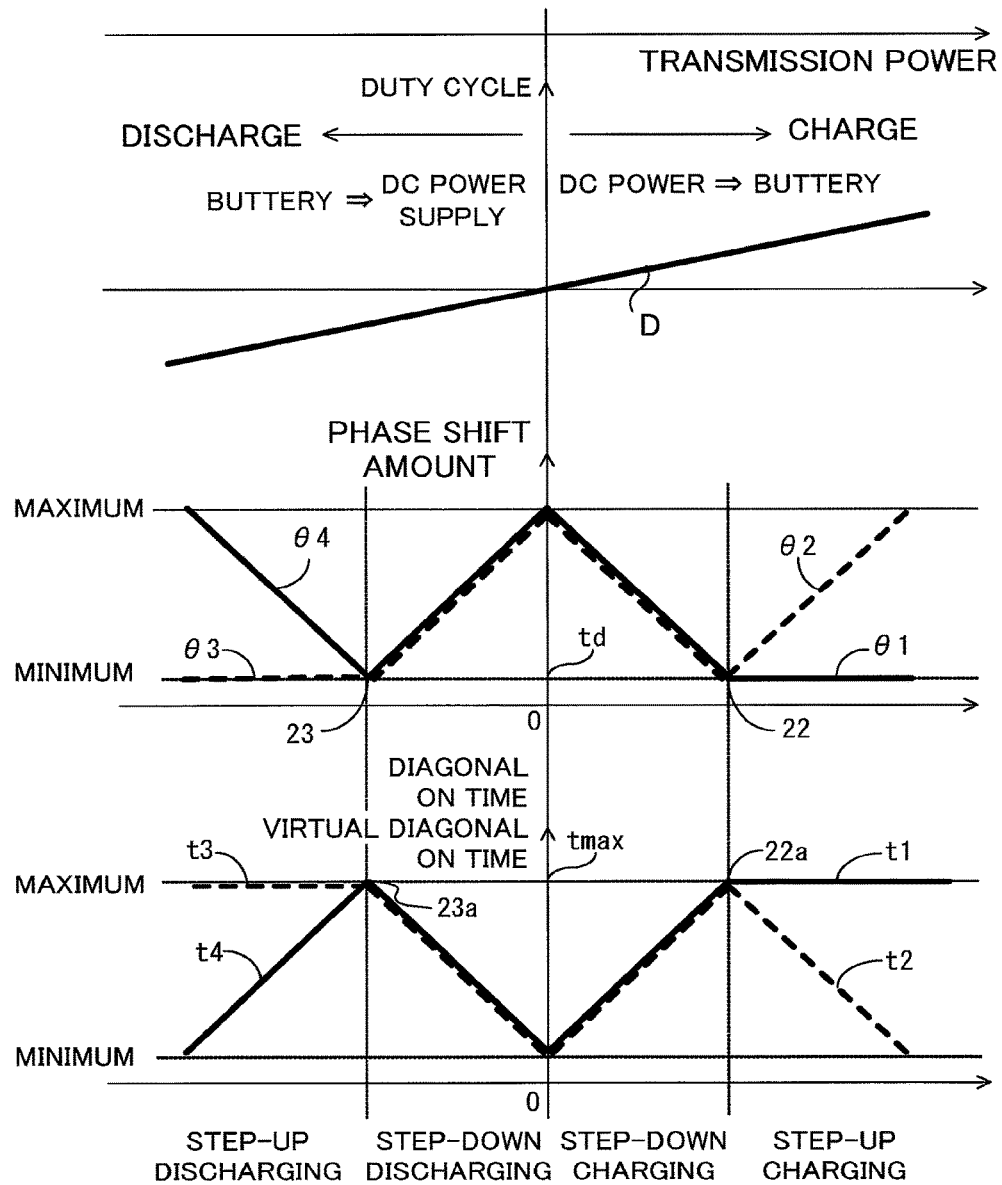
FIG. 28 is a waveform diagram illustrating control operation of the battery charge/discharge device according to embodiment 1 of the present invention.

FIG. 28 shows the phase shift amounts θ1 to θ4 according to the duty cycle D, and shows the diagonal ON times t1 and t3 and the virtual diagonal ON times t2 and t4. As shown in FIG. 28, the duty cycle D is determined in accordance with the transmission power. In this case, power in the charging direction is assumed to be positive.

Since both the phase shift amount θ1 in charging and the phase shift amount θ4 in discharging are a phase shift amount of the first diagonal element Q3B, they are continuously drawn by the same solid line. Since both the phase shift amount θ2 in charging and the phase shift amount θ3 in discharging are a phase shift amount of the second diagonal element Q2B, they are continuously drawn by the same dotted line. Similarly, the diagonal ON time t1 and the virtual diagonal ON time t4 are continuously drawn by the same solid line, and the virtual diagonal ON time t2 and the diagonal ON time t3 are continuously drawn by the same dotted line.

First, control in the case where the battery charge/discharge device 100 charges the battery 2 from the DC power supply 1 will be described.

A period during which power is transmitted from the first winding 3a to the second winding 3b of the transformer 3 and voltage is generated at the second winding 3b is the diagonal ON time t1 during which Q4A and Q3B are both ON and the diagonal ON time t1a during which Q4B and Q3A are both ON.

In step-up operation, by increasing the above period as much as possible, loss relevant to the current circulation periods of the first switching circuit 5 and the second switching circuit 8 can be reduced.

Therefore, in control for step-up charging, the control circuit 20 sets the diagonal ON time t1 (=t1a) to a maximum ON time tmax so that a period during which voltage is applied to the first winding 3a of the transformer 3 is maximized. The maximum ON time tmax is set on the basis of the short-circuit prevention time td needed for each semiconductor switching element Q of the first switching circuit 5 to perform zero voltage switching. In this case, the phase shift amount θ1 of the drive signal for Q3B relative to the phase of the drive signal for Q4A is minimum, and equal to the short-circuit prevention time td.

In the step-up charging, a period during which the second reactor 10 is excited by the second switching circuit 8 is present in the diagonal ON time (t1, t1a) during which voltage is applied to the transformer 3. That is, the phase shift amount θ2 of the drive signal for the second diagonal element Q2B relative to the phase of the drive signal for Q4A is equal to or greater than the phase shift amount θ1, and a first reference point 22 at which both phase shift amounts θ1 and θ2 are minimum (short-circuit prevention time td) is set as a base point. When the duty cycle D increases, the control circuit 20 increases the phase shift amount θ2 while keeping the phase shift amount θ1 minimum.

When the phase shift amounts θ1 and θ2 are at the first reference point 22 at which both of them are minimum (short-circuit prevention time td), the diagonal ON time t1 and the virtual diagonal ON time t2 are at a point 22a at which both of them are the maximum ON time tmax. From the point 22a as a base point, when the duty cycle D increases, the control circuit 20 decreases the virtual diagonal ON time t2 while keeping the diagonal ON time t1 at the maximum ON time tmax.

In the case of step-down charging, the phase shift amount θ1 and the phase shift amount θ2 are equal to each other, and both phase shift amounts θ1 and θ2 are changed in accordance with the duty cycle D.

When the phase shift amounts θ1 and θ2 are maximum, both the diagonal ON time t1 and the virtual diagonal ON time t2 are minimum (e.g., zero), and power transmission is not performed. In step-down charging, when the duty cycle D is zero, the phase shift amounts θ1 and θ2 are maximum, and when the duty cycle D increases, the control circuit 20 decreases both phase shift amounts θ1 and θ2. At this time, the diagonal ON time t1 and the virtual diagonal ON time t2 increase.

When both phase shift amounts θ1 and θ2 are maximum, the control circuit 20 switches from control in which the second bridge (Q1A, Q1B) in the second switching circuit 8 is kept in an OFF state, to control in which the first bridge (Q4A, Q4B) in the first switching circuit 5 is kept in an OFF state, thus switching the power transmission direction. In this switching, both the diagonal ON time t1 and the virtual diagonal ON time t2 are minimum, that is, power transmission is not performed. Therefore, the switching can be smoothly performed without causing influence by the switching.

In control for step-up discharging in which the battery 2 is discharged to transmit power to the DC power supply 1, the control circuit 20 sets the diagonal ON time t3 (=t3a) to the maximum ON time tmax so that a period during which voltage is applied to the second winding 3b of the transformer 3 is maximized. In this case, the phase shift amount θ3 of the drive signal for Q2B relative to the phase of the drive signal for Q1A becomes minimum (short-circuit prevention time td). The phase shift amount θ4 of the drive signal for Q3B relative to the phase of the drive signal for Q1A is equal to or greater than the phase shift amount θ3. From a second reference point 23 as a base point, at which both phase shift amounts θ3 and θ4 are minimum (short-circuit prevention time td), when discharge power increases and the duty cycle D increases in the negative direction, the control circuit 20 increases the phase shift amount θ4 while keeping the phase shift amount θ3 minimum.

When the phase shift amounts θ3 and θ4 are at the second reference point 23 at which both of them are minimum (short-circuit prevention time td), the diagonal ON time t3 and the virtual diagonal ON time t4 are at a point 23a at which both of them are the maximum ON time tmax. From the point 23a as a base point, when the duty cycle D increases in the negative direction, the control circuit 20 decreases the virtual diagonal ON time t4 while keeping the diagonal ON time t3 at the maximum ON time tmax.

In the case of step-down discharging, the phase shift amount θ3 and the phase shift amount θ4 are equal to each other, and both phase shift amounts θ3 and θ4 are changed in accordance with the duty cycle D.

When the phase shift amounts θ3 and θ4 are maximum, both the diagonal ON time t3 and the virtual diagonal ON time t4 are minimum, and power transmission is not performed. In step-down discharging, when the duty cycle is zero, the phase shift amounts θ3 and θ4 are maximum, and when the duty cycle D increases in the negative direction, the control circuit 20 decreases both phase shift amounts θ3 and θ4. At this time, the diagonal ON time t3 and the virtual diagonal ON time t4 increase.

When both phase shift amounts θ3 and θ4 are maximum, the control circuit 20 switches from control in which the first bridge (Q4A, Q4B) in the first switching circuit 5 is kept in an OFF state, to control in which the second bridge (Q1A, Q1B) in the second switching circuit 8 is kept in an OFF state, thus switching the power transmission direction. In this switching, power transmission is not performed, and therefore the switching can be smoothly performed without causing influence by the switching.

In FIG. 28, the minimum values of t1 to t4 are greater than zero, but may be zero.

As described above, the battery charge/discharge device 100 has a simple circuit configuration that is symmetric with respect to the transformer 3, and the control circuit 20 controls the phase shift amounts θ1 to θ4 in accordance with the duty cycle D, thereby enabling bidirectional power conversion to be performed irrespective of the power transmission direction and voltages of the DC power supply 1 and the battery 2. Thus, the battery charge/discharge device 100 can achieve bidirectional power conversion operation with simple control.

As described above, in charging of the battery 2, Q1A and Q1B of the second bridge circuit (Q1A, Q1B) are kept in an OFF state. Therefore, when the circulation current flowing through the transformer 3 decreases to be 0 [A], the diode of Q1A or Q1B is turned off and the current flowing through the transformer 3 is kept at 0 [A]. Also in power transmission from the battery 2 to the DC power supply 1, similarly, when the circulation current flowing through the transformer 3 decreases to be 0 [A], the diode of Q4A or Q4B is turned off and the current flowing through the transformer 3 is kept at 0 [A].

Thus, reverse current does not flow through the transformer 3, so that reactive power can be suppressed and loss can be reduced. Therefore, the battery charge/discharge device 100, with a simple circuit configuration, can perform bidirectional power transmission while preventing reverse flow of transformer current over a wide voltage range and thus can achieve loss reduction. In addition, the peak value and the effective value of the transformer current can be reduced, and size reduction of the transformer 3 can be promoted.

As described above, in the battery charge/discharge device 100, the control circuit 20 performs feedback control so that the difference current value 30a between the charge current i and the charge current command value i* approaches zero, thereby calculating the duty cycle D for the first switching circuit 5 and the second switching circuit 8 and determining the phase shift amounts θ1 to θ4. In FIG. 28, the transmission power and the duty cycle D are assumed to be in an ideal proportional relationship, change in the transmission power is in accordance with change in the diagonal ON times t1, t3 and the virtual diagonal ON times t2, t4. However, there is a region in which the charge current i indicating the transmission power does not change even though the phase shift amounts θ1 to θ4 are changed, that is, the diagonal ON times t1, t3 and the virtual diagonal ON times t2, t4 are changed.

Figure 29:
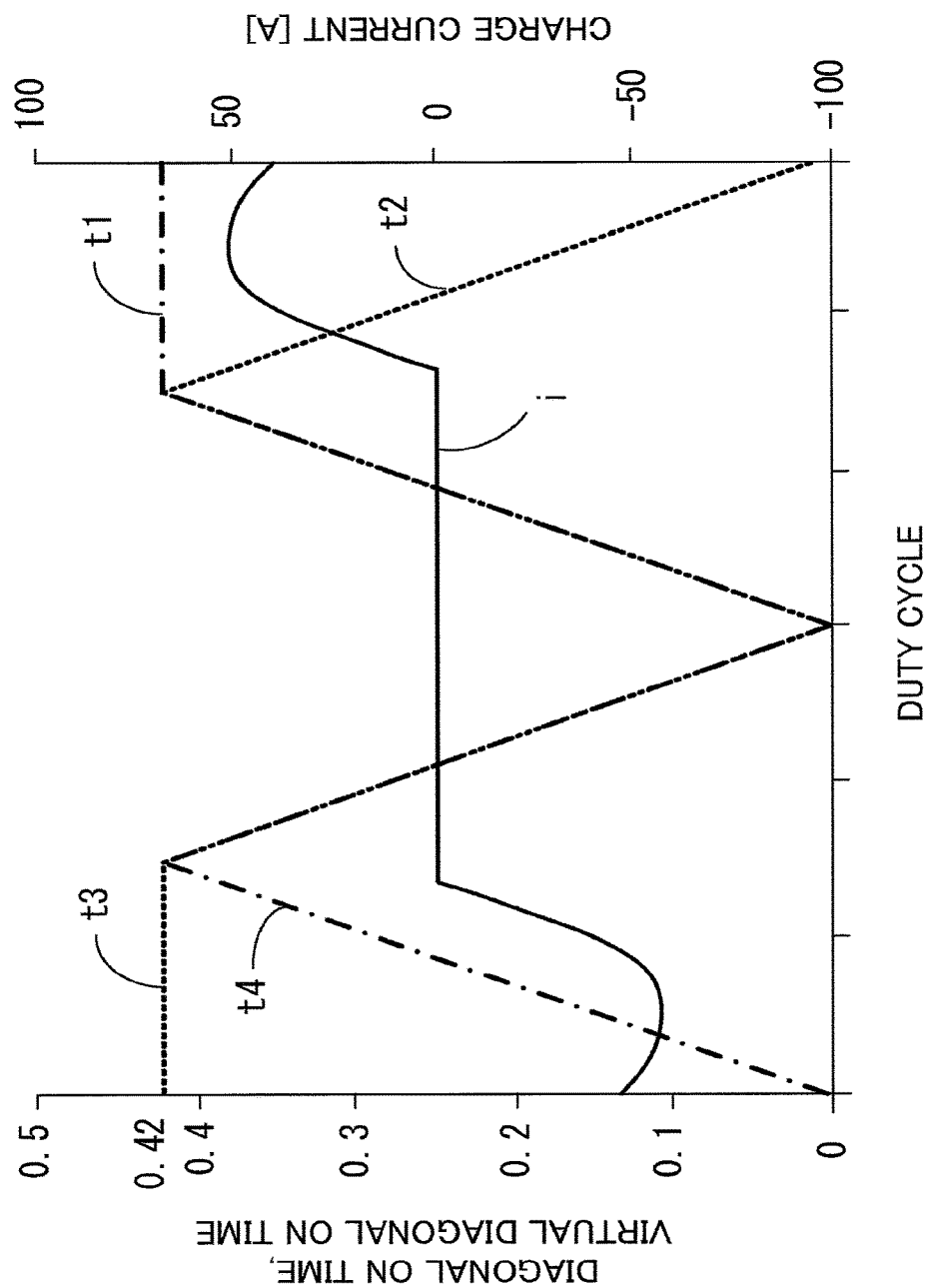
FIG. 29 is a waveform diagram illustrating charge current in the battery charge/discharge device according to embodiment 1 of the present invention.

FIG. 29 shows an example of transition of the charge current i when the diagonal ON times t1, t3 and the virtual diagonal ON times t2, t4 are changed, and shows the state before adjustment is performed by correction of the phase shift amounts θ1 to θ4 as described later. In this case, voltage of the DC power supply 1 and voltage of the battery 2 are set to be equal to each other, the turns ratio between the first winding 3a and the second winding 3b of the transformer 3 is set at 1:1, and the short-circuit prevention time td is set at 4% of the switching cycle. The short-circuit prevention time td is set appropriately on the basis of the switching speed of the semiconductor switching elements Q, so as to prevent short-circuit of the semiconductor switching elements Q and achieve zero voltage switching thereof. In general, the switching speed is written on a data sheet disclosed by a semiconductor manufacturer.

In FIG. 29, the diagonal ON times t1, t3 and the virtual diagonal ON times t2, t4 are normalized with the switching cycle of the semiconductor switching elements Q set at 1. The maximum value (maximum ON time tmax) of the diagonal ON times t1, t3 and the virtual diagonal ON times t2, t4 is 0.42, which is obtained by subtracting twice the short-circuit prevention time td from the half cycle.

As shown in FIG. 29, there is a period during which the charge current i does not change even though the diagonal ON times t1, t3 and the virtual diagonal ON times t2, t4 are changed. Specifically, such a period is the step-down charging period during which the diagonal ON time t1 and the virtual diagonal ON time t2 are controlled at an equal amount, and the step-down discharging period during which the diagonal ON time t3 and the virtual diagonal ON time t4 are controlled at an equal amount. In the case of performing step-down charging from the DC power supply 1 to the battery 2, voltage generated at the second winding 3b needs to be higher than voltage of the battery 2. In the case of performing step-down discharging from the battery 2 to the DC power supply 1, voltage generated at the first winding 3a needs to be higher than voltage of the DC power supply 1. In the example shown in FIG. 29, the voltage values of the DC power supply 1 and the battery 2 are set to be equal to each other and the turns ratio of the transformer 3 is set at 1:1. Therefore, in step-down charging, voltage generated at the second winding 3b and voltage of the battery 2 are equal to each other, and in step-down discharging, voltage generated at the first winding 3a and voltage of the DC power supply 1 are equal to each other. Thus, a period during which the charge current i does not change, arises.

Using the turns ratio NL:NB between the first winding 3a and the second winding 3b of the transformer 3, a condition that causes the period during which the charge current i does not change is generalized as follows: if voltage VB of the battery 2 is greater than VL×NB/NL, the period during which the charge current i does not change arises in step-down charging, and if voltage VL of the DC power supply 1 is greater than VB×NL/NB, the period during which the charge current i does not change arises in step-down discharging.

Figure 30:
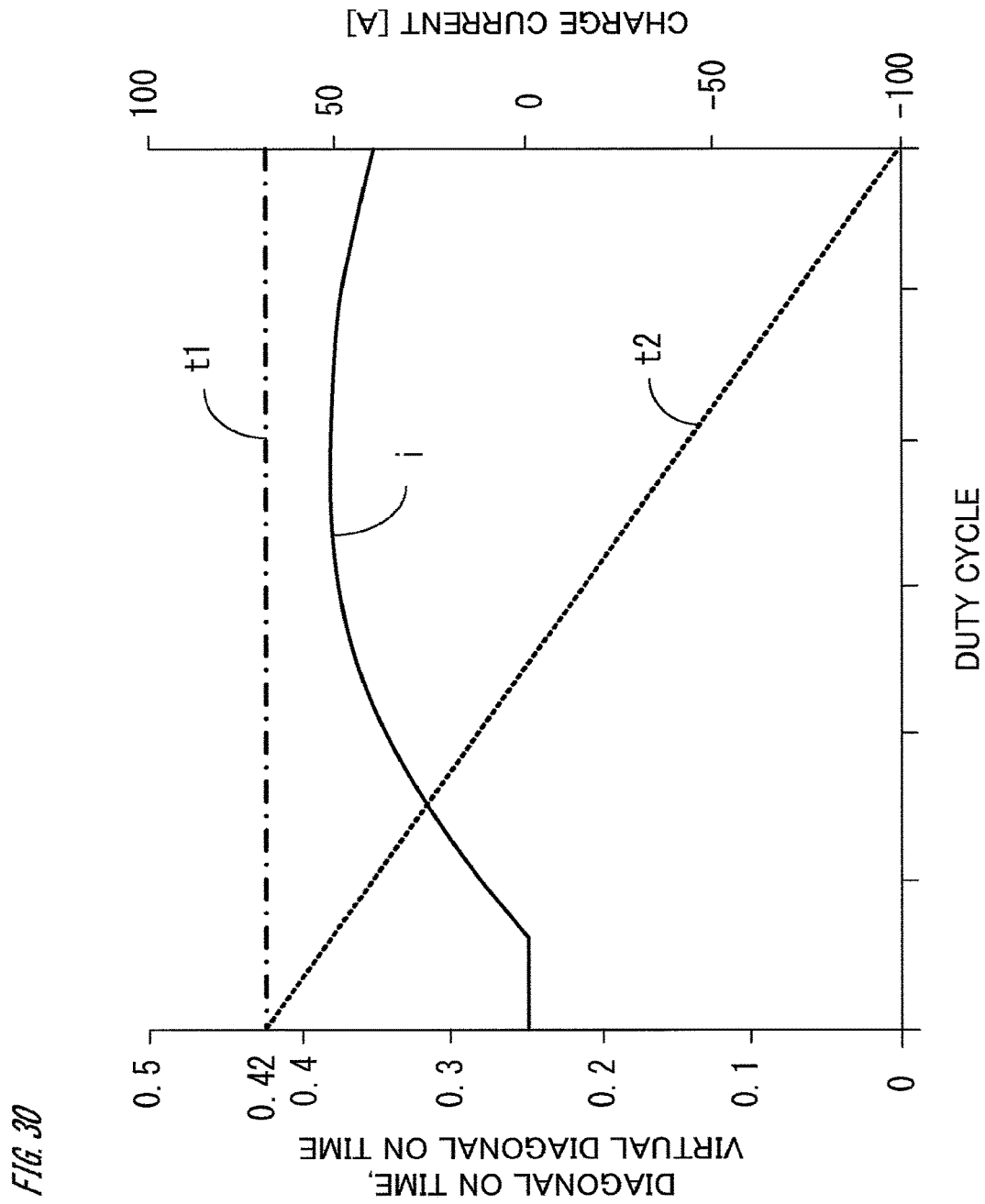
FIG. 30 is a partial enlarged view in FIG. 29.
Figure 31:
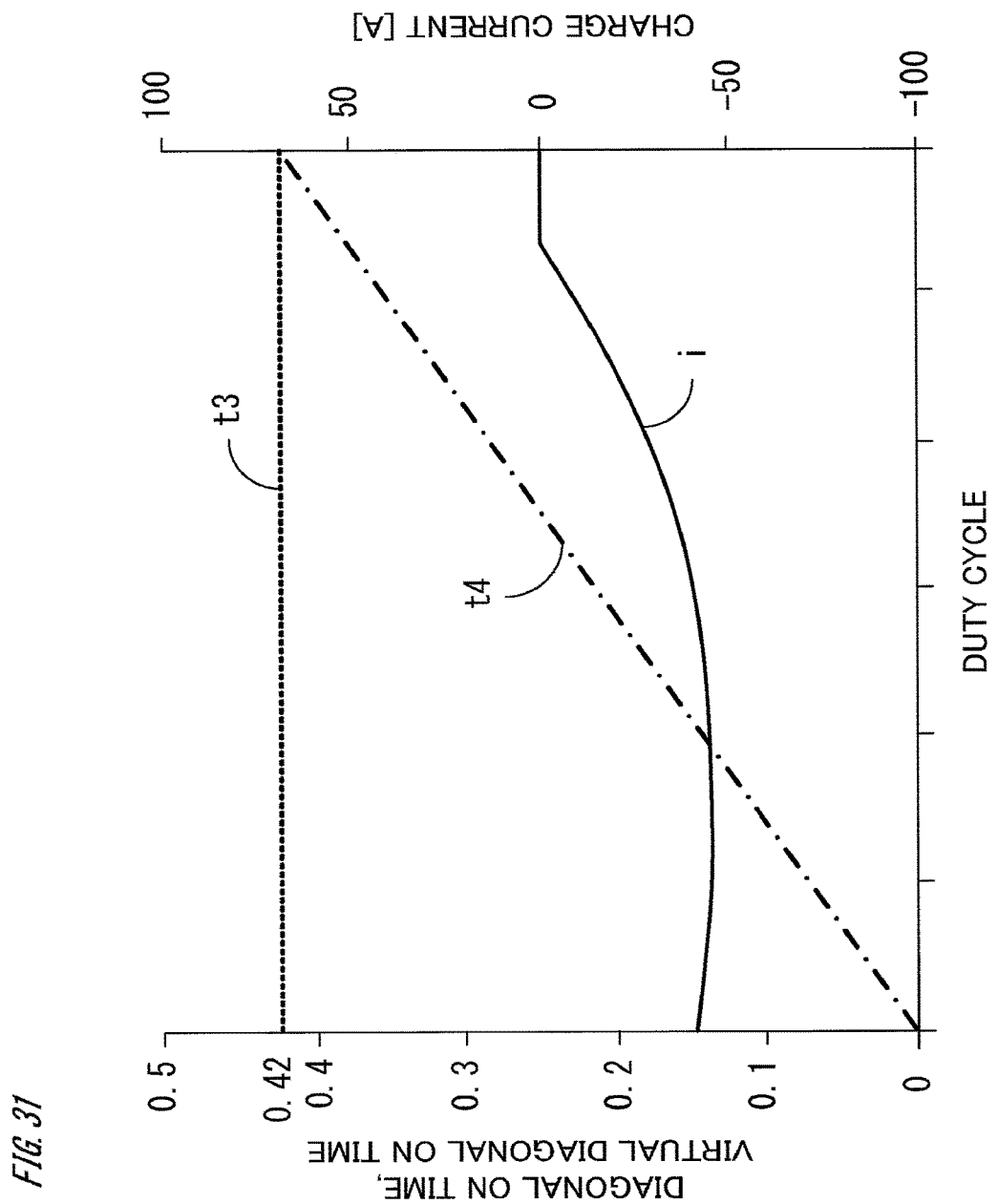
FIG. 31 is a partial enlarged view in FIG. 29.

FIG. 30 is a partial enlarged diagram obtained by enlarging the step-up charging period in FIG. 29. In step-up charging, although the virtual diagonal ON time t2 is changed while the diagonal ON time t1 is kept maximum, there is a period during which the charge current i does not change. FIG. 31 is a partial enlarged diagram obtained by enlarging the step-up discharging period in FIG. 29. In step-up discharging, although the virtual diagonal ON time t4 is changed while the diagonal ON time t3 is maximized, also in this case, there is a period during which the charge current i does not change. In step-up charging and step-up discharging, in the region where the difference between the diagonal ON time t1, t3 and the virtual diagonal ON time t2, t4 is small, a period during which the charge current i does not change arises due to the short-circuit prevention time td.

As described above, the battery charge/discharge device 100 has a region in which the charge current i does not change even though the phase shift amounts θ1 to θ4 are changed, that is, the diagonal ON times t1, t3 and the virtual diagonal ON times t2, t4 are changed. The control circuit 20 in the present embodiment adjusts the phase shift amounts θ1 to θ4 by correction so as to improve response of the charge current i to the charge current command value i*, when determining the phase shift amounts θ1 to θ4 on the basis of the duty cycle D.

Figure 32:
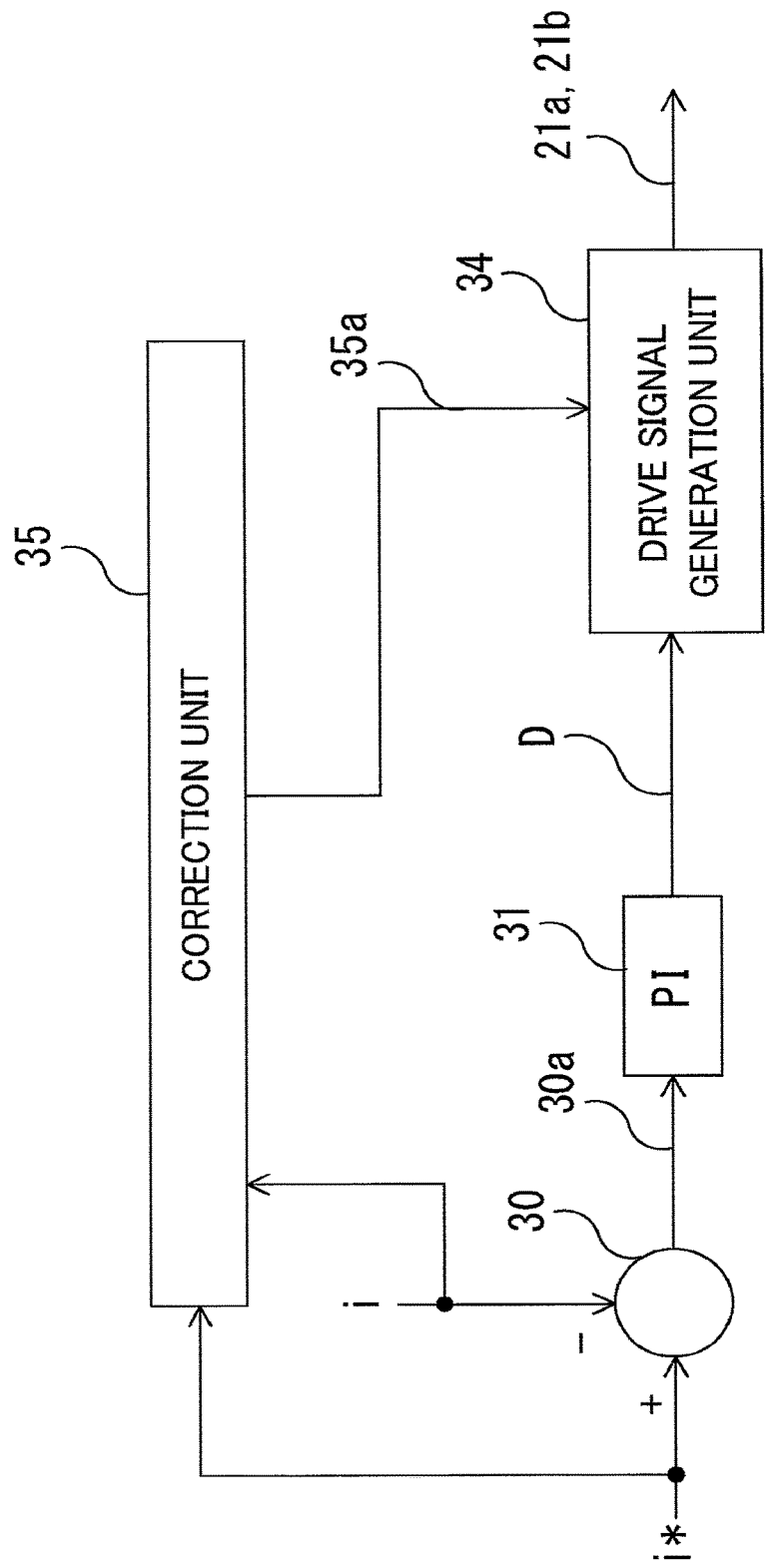
FIG. 32 is a control block diagram of the battery charge/discharge device according to embodiment 1 of the present invention.

FIG. 32 is a control block diagram of the control circuit 20. The control circuit 20 includes the subtractor 30, the PI controller 31, a drive signal generation unit 34, and a correction unit 35 as a second circuit for correcting output of the PI controller 31 which is the first circuit. As described with reference to FIG. 2 and FIG. 25, the subtractor 30 calculates the difference current value 30a between the charge current i and the charge current command value i*, and the PI controller 31 performs feedback control so that the difference current value 30a approaches zero, thereby calculating the duty cycle D for the first switching circuit 5 and the second switching circuit 8. The correction unit 35 determines a correction amount 35a on the basis of the charge current i and the charge current command value i*. In determining the phase shift amounts θ1 to θ4 on the basis of the duty cycle D, the drive signal generation unit 34 performs correction by the correction amount 35a, thereby generating the drive signals 21a, 21b for the semiconductor switching elements Q.

The correction amount 35a calculated by the correction unit 35 may be for correcting the phase shift amounts θ1 to θ4 or may be for correcting the duty cycle D, and in any case, a control result outputted from the PI controller 31 is consequently corrected, whereby the phase shift amounts θ1 to θ4 are adjusted.

Figure 33:
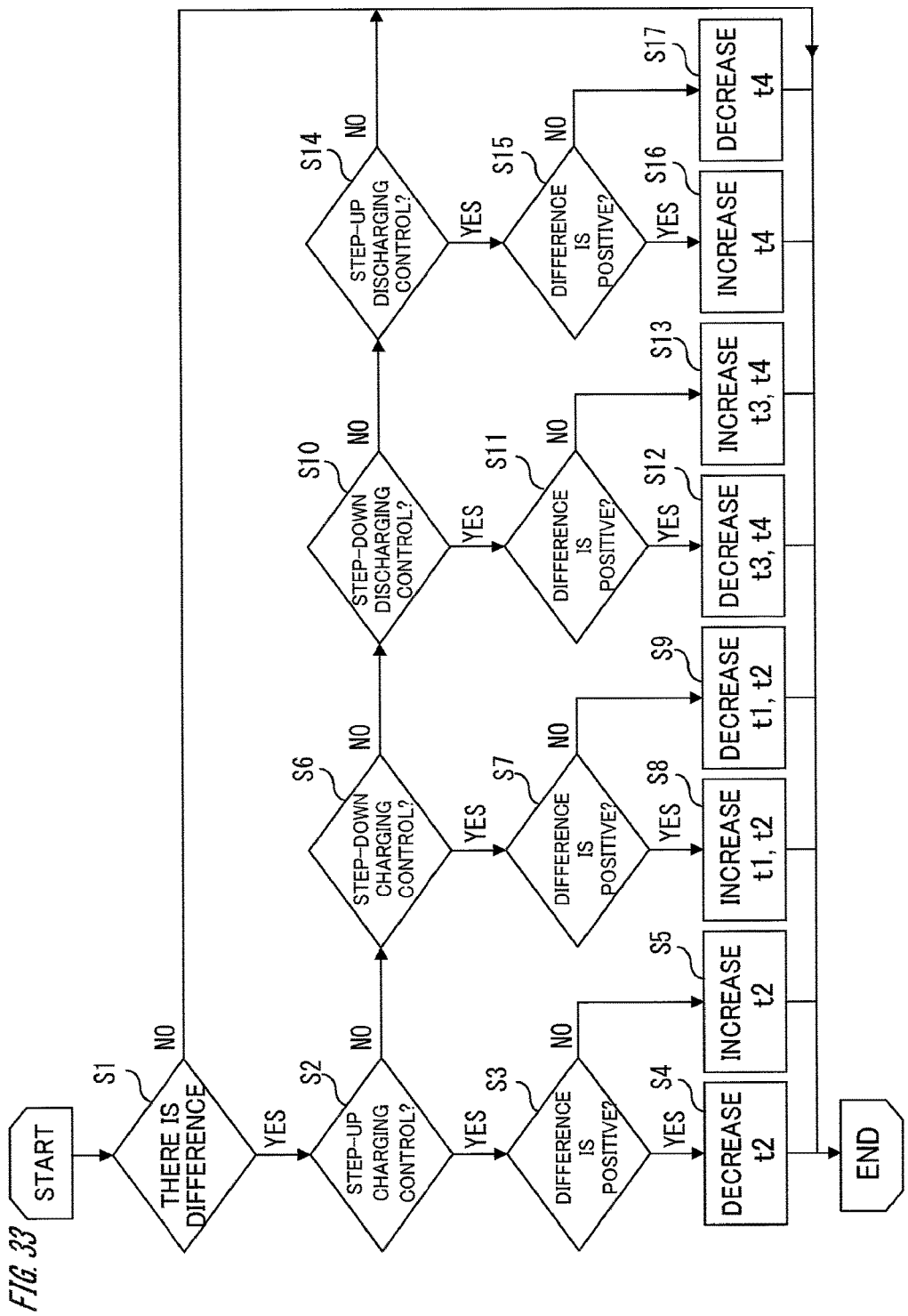
FIG. 33 is a flowchart showing correction control in the battery charge/discharge device according to embodiment 1 of the present invention.

In adjustment of the phase shift amounts θ1 to θ4, i.e., adjustment of the diagonal ON times t1, t3 and the virtual diagonal ON times t2, t4, a target to be adjusted and the adjustment direction are determined in accordance with the four control modes of step-up charging, step-down charging, step-down discharging, and step-up discharging, and this will be described below with reference to the flowchart shown in FIG. 33.

First, from the state in which the charge current i is follow-up controlled so as to become equal to the charge current command value i*, if the magnitude of the difference current value 30a increases to be greater than a predetermined value or the magnitude of the difference current value 30a has not been decreased for longer than a predetermined period, that is, if delay of response of the charge current i to the charge current command value i* is detected, it is determined that there is a difference (step S1), to shift to correction control.

In the case where the control mode is step-up charging (step S2), if the difference current value 30a is positive, i.e., the charge current i is smaller than the charge current command value i* (step S3), the virtual diagonal ON time t2 is adjusted to be decreased (step S4). In step S3, if the difference current value 30a is negative, i.e., the charge current i is greater than the charge current command value i*, the virtual diagonal ON time t2 is adjusted to be increased (step S5).

In the case where the control mode is step-down charging (step S6), if the difference current value 30a is positive, i.e., the charge current i is smaller than the charge current command value i* (step S7), the diagonal ON time t1 and the virtual diagonal ON time t2 are adjusted to be increased by an equal amount (step S8). In step S7, if the difference current value 30a is negative, i.e., the charge current i is greater than the charge current command value i*, the diagonal ON time t1 and the virtual diagonal ON time t2 are adjusted to be decreased by an equal amount (step S9).

In the case where the control mode is step-down discharging (step S10), if the difference current value 30a is positive, i.e., the charge current i is smaller than the charge current command value i* (step S11), the diagonal ON time t3 and the virtual diagonal ON time t4 are adjusted to be decreased by an equal amount (step S12). In step S11, if the difference current value 30a is negative, i.e., the charge current i is greater than the charge current command value i*, the diagonal ON time t3 and the virtual diagonal ON time t4 are adjusted to be increased by an equal amount (step S13).

In the case where the control mode is step-up discharging (step S14), if the difference current value 30a is positive, i.e., the charge current i is smaller than the charge current command value i* (step S15), the virtual diagonal ON time t4 is adjusted to be increased (step S16). In step S15, the difference current value 30a is negative, i.e., the charge current i is greater than the charge current command value i*, the virtual diagonal ON time t4 is adjusted to be decreased (step S17).

As described above, in the present embodiment, the control circuit 20 includes the correction unit 35 to perform correction control by detecting response delay of control for causing the charge current i to follow the charge current command value i*. Therefore, even if the control of the battery charge/discharge device 100 enters the region in which the charge current i does not change even though the phase shift amounts θ1 to θ4 are changed, the control can swiftly shift to the outside of the region and thereby can follow the charge current command value i*. In addition, the correction unit 35 operates also in cases other than the region in which the charge current i does not change. Therefore, in any case such as rapid load change or change in the charge current command value i*, quick-response performance is improved and the charge current i is swiftly caused to follow the charge current command value i*.

Therefore, when switching between charge operation and discharge operation occurs at the time of rapid load change or the like, the charge-discharge switching can be swiftly performed, whereby bus voltages of the first and second switching circuits 5 and 8 can be stabilized. Thus, it is possible to stably operate the battery charge/discharge device 100 with high reliability.

The first circuit which performs feedback control so that the difference current value 30a approaches zero may use a control configuration other than the PI controller 31.

In the above embodiment, the battery 2 is used for one DC power supply (second DC power supply), but the present invention is not limited thereto. Both of the first and second DC power supplies may be configured from batteries.

Embodiment 2

Next, embodiment 2 of the present invention will be described.

In the above embodiment 1, the control circuit 20 performs correction control by detecting response delay on the basis of the difference current value 30a between the charge current i and the charge current command value i*. In the present embodiment 2, correction control is performed using a target mathematical model 38 which is a model of the battery charge/discharge device 100.

Figure 34:
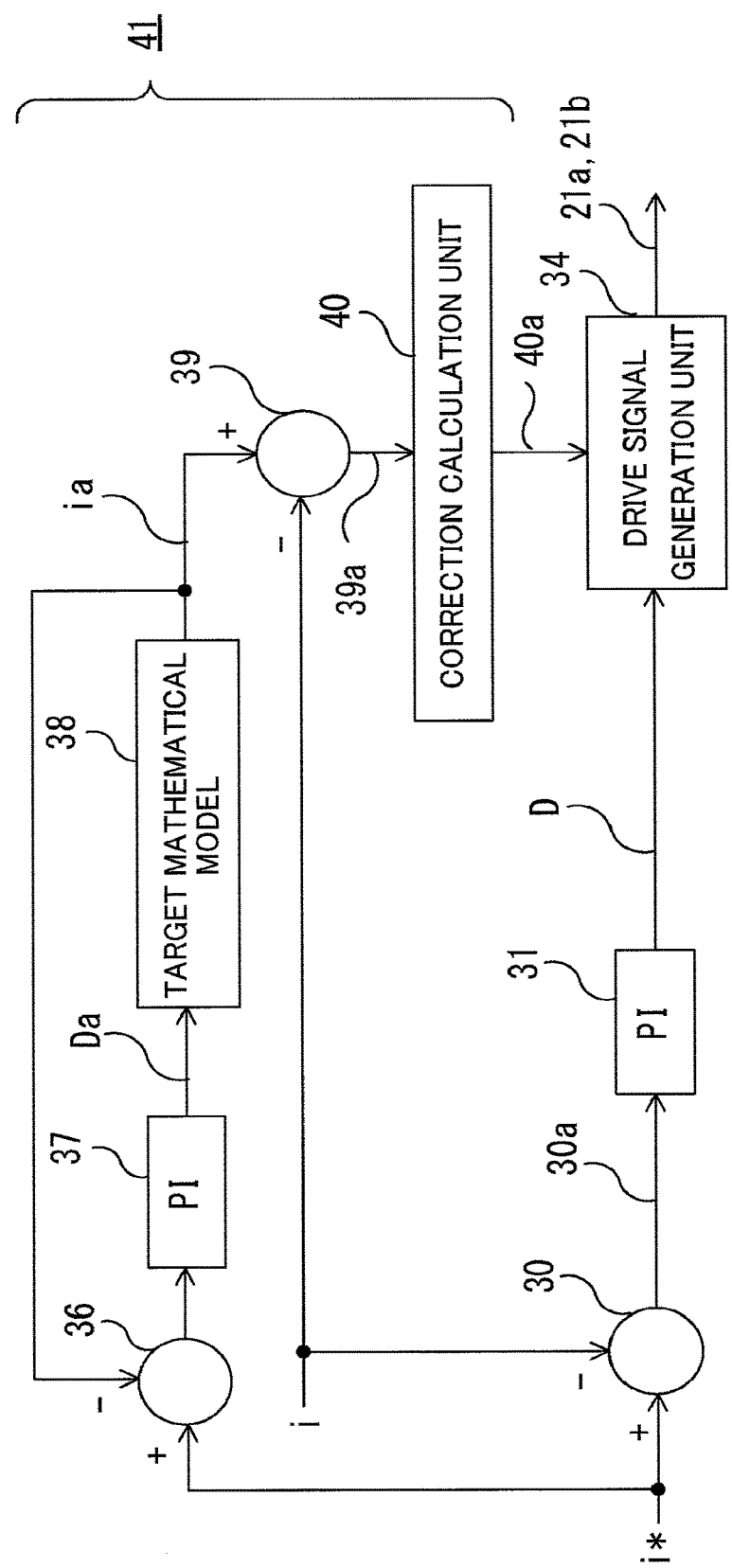
FIG. 34 is a control block diagram of a battery charge/discharge device according to embodiment 2 of the present invention.

FIG. 34 is a control block diagram of the control circuit 20 according to the present embodiment 2. The control circuit 20 includes the subtractor 30, the PI controller 31, the drive signal generation unit 34, and a correction circuit 41 as a second circuit for correcting output of the PI controller 31 which is the first circuit.

The device and control configuration other than the correction control using the correction circuit 41 is the same as in the above embodiment 1.

The correction circuit 41 includes subtractors 36, 39, a PI controller 37, the target mathematical model 38, and a correction calculation unit 40, and determines a correction amount 40a on the basis of the charge current i and the charge current command value i*. The target mathematical model 38 is a model obtained by representing, as a mathematical model, an ideal operation in which current (charge current i) monotonously increases with respect to the duty cycle in the battery charge/discharge device 100, i.e., the operation targets of the first and second switching circuits 5 and 8. The target mathematical model 38 calculates an estimated current value ia by estimating target charge current i on the basis of a duty cycle Da inputted thereto.

In the correction circuit 41, the subtractor 36 subtracts the estimated current value ia calculated by the target mathematical model 38, from the charge current command value i*, to calculate a difference therebetween, and the PI controller 37 performs feedback control so that the difference approaches zero, thereby calculating the duty cycle Da. The calculated duty cycle Da is inputted to the target mathematical model 38, and the target mathematical model 38 calculates the estimated current value ia. The estimated current value ia is inputted to the two subtractors 36 and 39, and the subtractor 39 subtracts the charge current i from the estimated current value ia, to calculate an estimated deviation 39a which is a difference therebetween. Then, the correction calculation unit 40 determines a correction amount 40a on the basis of the estimated deviation 39a.

The subtractor 30 calculates the difference current value 30a between the charge current i and the charge current command value i*, and the PI controller 31 performs feedback control so that the difference current value 30a approaches zero, thereby calculating the duty cycle D for the first switching circuit 5 and the second switching circuit 8. In determining the phase shift amounts θ1 to θ4 on the basis of the duty cycle D, the drive signal generation unit 34 adjusts the phase shift amounts θ1 to θ4 by correction using the correction amount 40a, thereby generating the drive signals 21a, 21b for the semiconductor switching elements Q.

In the present embodiment, the correction circuit 41 calculates the estimated current value ia on the basis of the charge current command value i* by using the target mathematical model 38, and adjusts the phase shift amounts θ1 to θ4 by the correction amount 40a determined from the difference (estimated deviation 39a) between the charge current i and the estimated current value ia. Therefore, the control of the battery charge/discharge device 100 can swiftly shift to the outside from the region in which the charge current i does not change even though the phase shift amounts θ1 to θ4 are changed, and thereby can follow the charge current command value i*. In addition, in any case such as rapid load change or change in the charge current command value i*, quick-response performance is improved and the charge current i is swiftly caused to follow the charge current command value i*. Thus, the same effect as in the above embodiment 1 can be obtained.

In the above embodiment 1, since correction control is performed on the basis of the difference current value 30a, the same control is performed no matter which of the charge current i or the charge current command value i* is changed, as long as the difference current value 30a is the same. On the other hand, in the present embodiment, the estimated current value ia is changed in accordance with only the charge current command value i*. Thus, control appropriate for each case is achieved.

Embodiment 3

Next, embodiment 3 of the present invention will be described.

In the above embodiments 1 and 2, the second circuit (correction unit 35, correction circuit 41) corrects a control result of the first circuit (PI controller 31). In the present embodiment 3, the second circuit corrects input to the PI controller 31.

Figure 35:
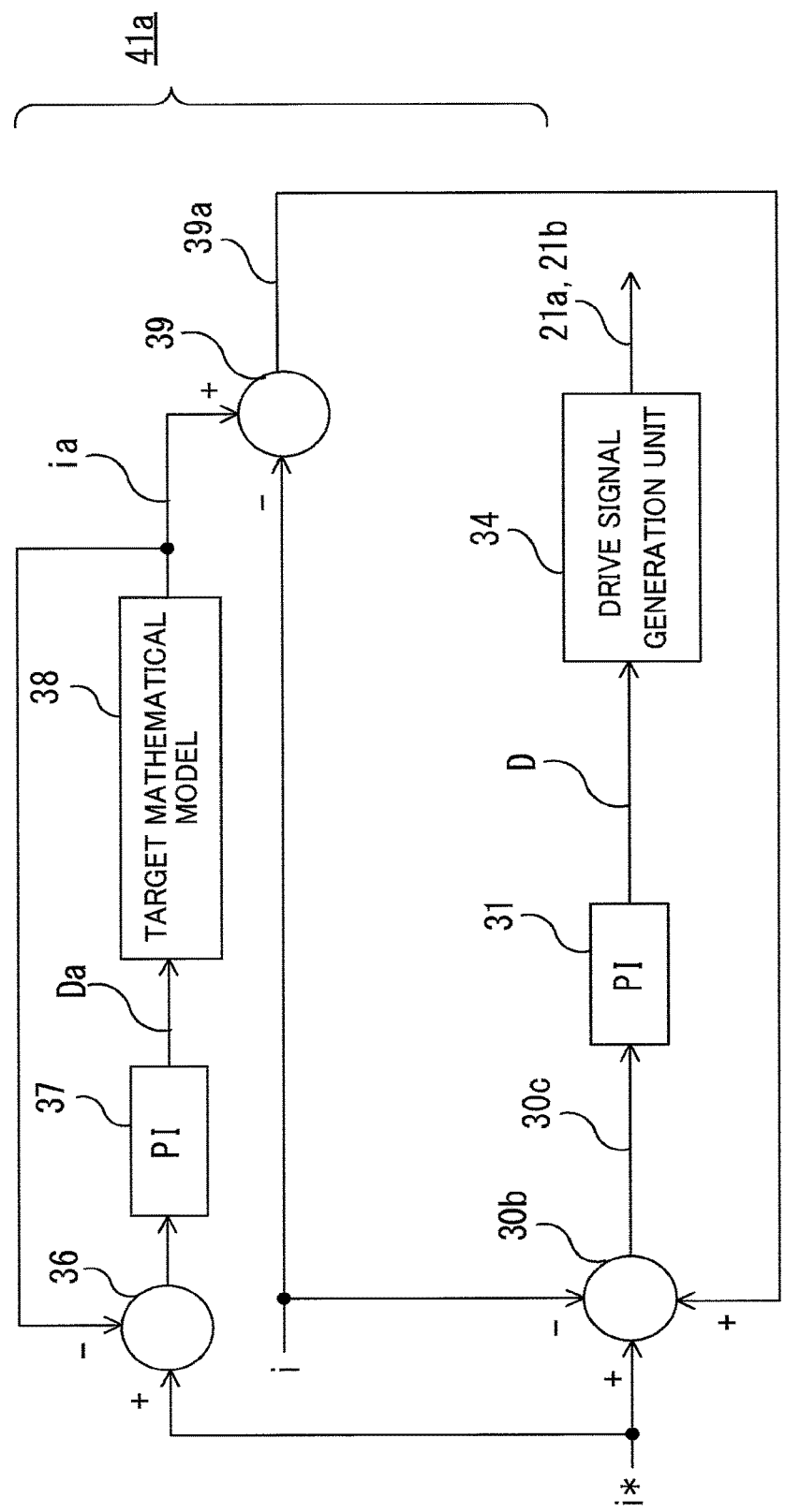
FIG. 35 is a control block diagram of a battery charge/discharge device according to embodiment 3 of the present invention.

FIG. 35 is a control block diagram of the control circuit 20 according to the present embodiment 3. The control circuit 20 includes an adder/subtractor 30b, the PI controller 31, the drive signal generation unit 34, and a correction circuit 41a as the second circuit for correcting input to the PI controller 31.

The device and control configuration other than correction control using the correction circuit 41a is the same as in the above embodiment 1.

The correction circuit 41a includes the subtractors 36, 39, the PI controller 37, and the target mathematical model 38, and as in the above embodiment 2, calculates the estimated current value ia on the basis of the charge current command value i* by using the target mathematical model 38, and determines the estimated deviation 39a which is a difference between the charge current i and the estimated current value ia.

The adder/subtractor 30b adds the charge current command value i* and the estimated deviation 39a, and subtracts the charge current i therefrom, to calculate a difference current value 30c, and the PI controller 31 performs feedback control so that the difference current value 30c approaches zero, thereby calculating the duty cycle D for the first switching circuit 5 and the second switching circuit 8. The drive signal generation unit 34 determines the phase shift amounts θ1 to θ4 on the basis of the duty cycle D, and generates the drive signals 21a, 21b for the semiconductor switching elements Q.

In the present embodiment, the correction circuit 41a calculates the estimated current value ia on the basis of the charge current command value i* by using the target mathematical model 38, and corrects a difference current value to be inputted to the PI controller 31, using, as a correction amount, the estimated deviation 39a which is a difference between the charge current i and the estimated current value ia. That is, the estimated deviation 39a is added to the difference current value 30a between the charge current i and the charge current command value i*, to derive the corrected difference current value 30c. Then, the corrected difference current value 30c is subjected to feedback control to determine the phase shift amounts θ1 to θ4. Thus, the phase shift amounts θ1 to θ4 become values having been adjusted by correction control.

Therefore, the control of the battery charge/discharge device 100 can swiftly shift to the outside from the region in which the charge current i does not change even though the phase shift amounts θ1 to θ4 are changed, and thereby can follow the charge current command value i*. In addition, in any case such as rapid load change or change in the charge current command value i*, quick-response performance is improved and the charge current i is swiftly caused to follow the charge current command value i*. Thus, the same effect as in the above embodiment 2 can be obtained.

In addition, since the estimated deviation 39a is a current value, the difference current value 30c can be calculated through simple correction calculation, whereby the phase shift amounts θ1 to θ4 can be adjusted.

Figure 36:
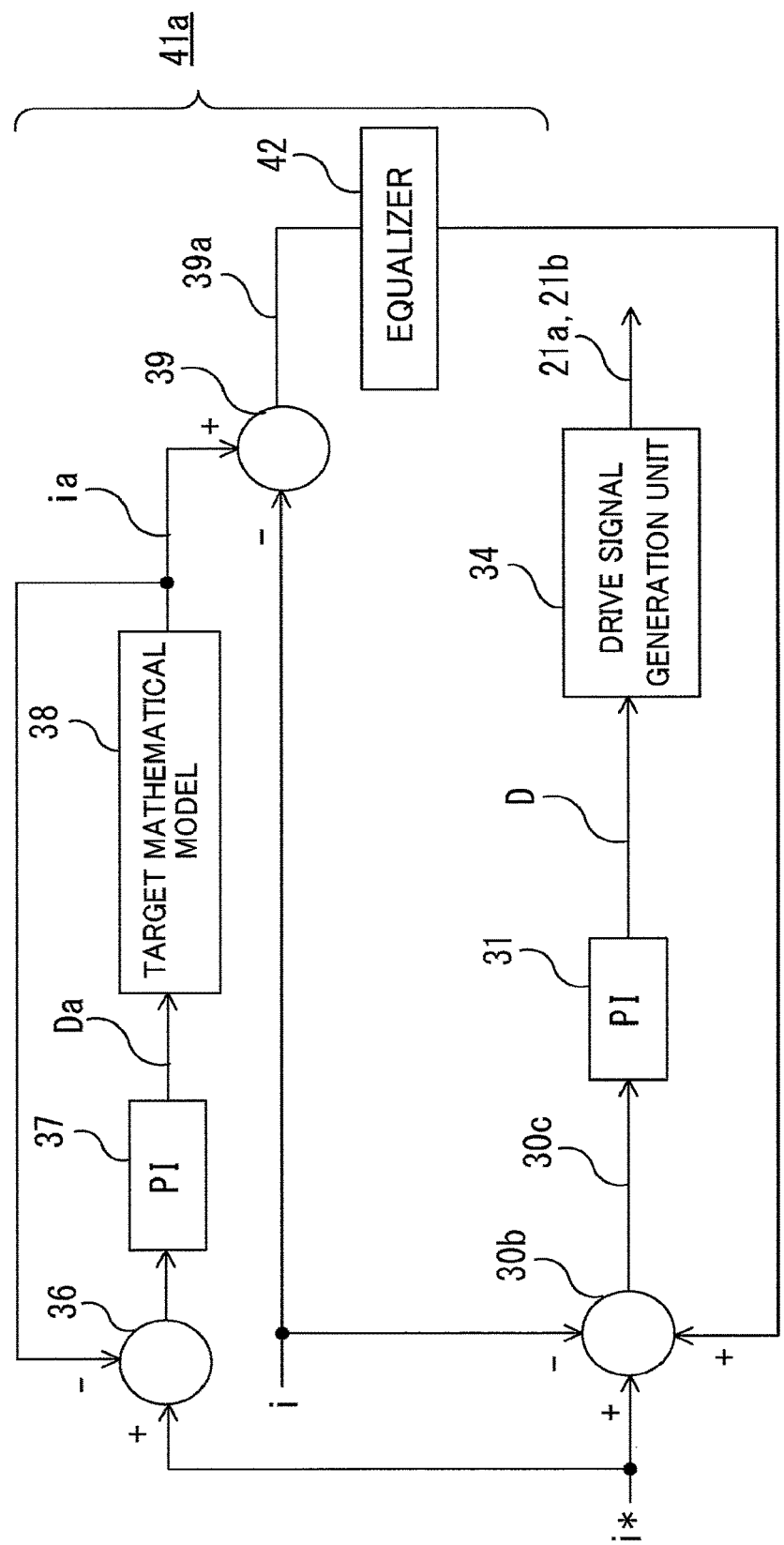
FIG. 36 is a control block diagram of a battery charge/discharge device in another example of embodiment 3 of the present invention.

As shown in FIG. 36, the estimated deviation 39a may be inputted to the adder/subtractor 30b via an equalizer 42. If there is some margin in terms of stability of the feedback system of the control circuit 20, the gain characteristics of the equalizer 42 is set to be greater than one time, and if there is no margin in terms of stability of the feedback system, the phase characteristics of the equalizer 42 is set to a leading phase. Thus, the controllability of the correction control can be improved.

Embodiment 4

Next, embodiment 4 of the present invention will be described.

Figure 37:
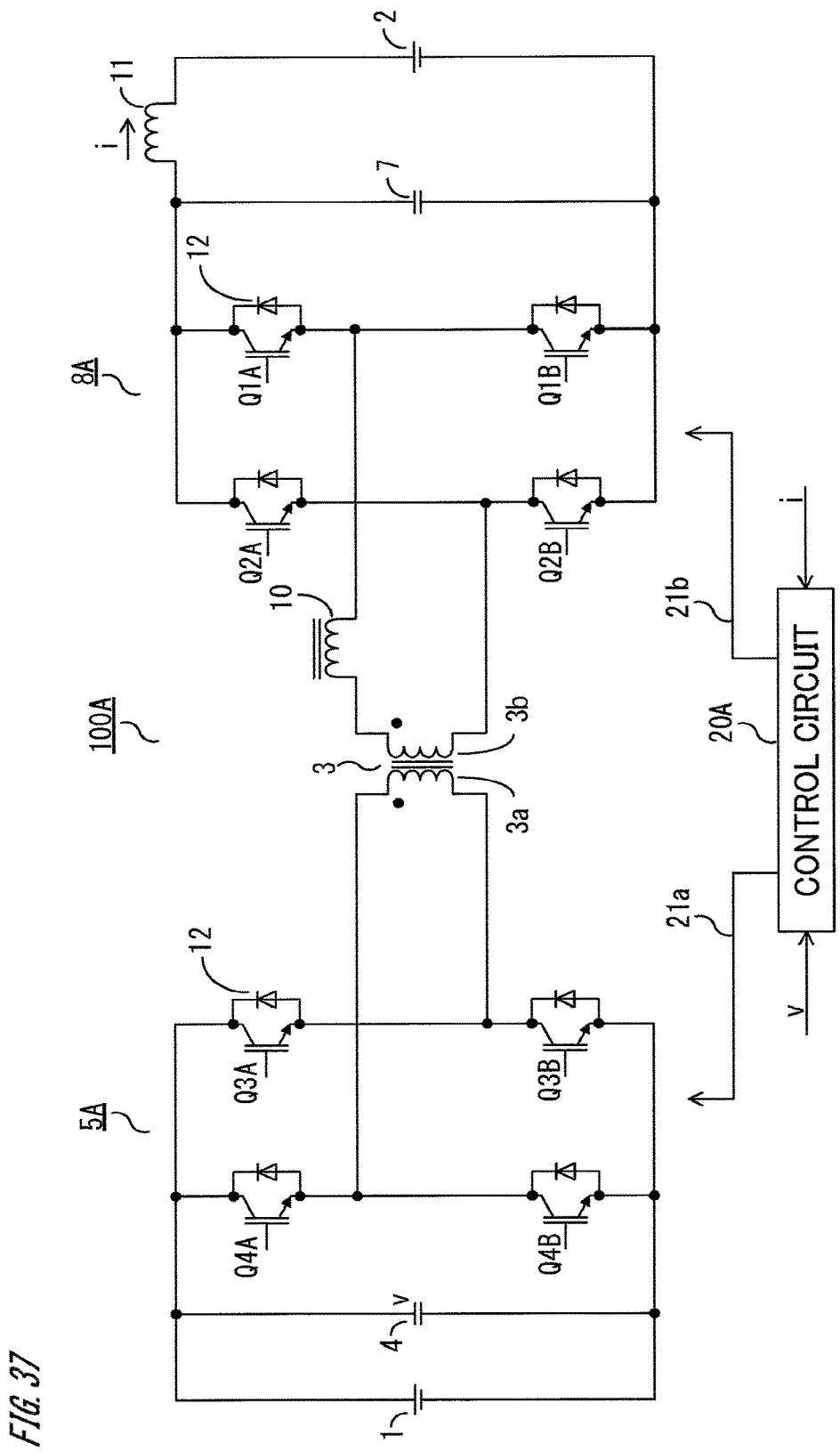
FIG. 37 is a circuit configuration diagram of a battery charge device according to embodiment 4 of the present invention.

FIG. 37 is a diagram showing the circuit configuration of a battery charge device 100A as a DC/DC converter according to embodiment 4 of the present invention. As shown in FIG. 37, the battery charge device 100A charges the battery 2 from the DC power supply 1 through power conversion involving step-up operation and step-down operation.

The battery charge device 100A includes: a high-frequency transformer 3 (hereinafter, simply referred to as a transformer 3) as an isolation transformer; a first smoothing capacitor 4 connected in parallel to the DC power supply 1; a first switching circuit 5A as a first converter unit; a second smoothing capacitor 7 connected in parallel to the battery 2; a second switching circuit 8A as a second converter unit; and a second reactor 10 connected on an AC input/output line of the second switching circuit 8A. The battery charge device 100A further includes a control circuit 20A for controlling the first switching circuit 5A and the second switching circuit 8A.

The first switching circuit 5A is a full-bridge circuit having a plurality of semiconductor switching elements Q4A, Q4B, Q3A, Q3B (hereinafter, simply referred to as Q4A, Q4B, Q3A, Q3B or semiconductor switching elements Q) such as IGBT or MOSFET, to which diodes 12 are respectively connected in antiparallel, and has a DC side connected to the first smoothing capacitor 4 and an AC side connected to a first winding 3a of the transformer 3, to perform power conversion between DC and AC.

The second switching circuit 8A is a full-bridge circuit having a plurality of semiconductor switching elements Q2A, Q2B, Q1A, Q1B (hereinafter, simply referred to as Q2A, Q2B, Q1A, Q1B or semiconductor switching elements Q) such as IGBT or MOSFET, to which diodes 12 are respectively connected in antiparallel, and has a DC side connected to the second smoothing capacitor 7 and an AC side connected to a second winding 3b of the transformer 3, to perform power conversion between DC and AC.

For the second switching circuit 8A, the second reactor 10 is connected on the AC input/output line between the semiconductor switching elements Q and the transformer 3, and the second reactor 10 and the second winding 3b are connected in series. Further, a reactor 11 is connected to the DC side of the second switching circuit 8A.

A current sensor (not shown) for detecting current flowing through the reactor 11 as charge current i (the arrow indicates the positive direction) of the battery 2 is provided between the second smoothing capacitor 7 and the battery 2, and the sensing output is inputted to the control circuit 20A. A voltage sensor (not shown) for detecting voltage v of the first smoothing capacitor 4 is provided, and the sensing output is inputted to the control circuit 20A. The control circuit 20A generates drive signals 21a, 21b for performing switching control of the semiconductor switching elements Q of the first switching circuit 5A and the second switching circuit 8A, on the basis of the values of charge current i and voltage v that are inputted, thereby performing drive control of the first switching circuit 5A and the second switching circuit 8A.

The current sensor for detecting charge current i of the battery 2 may be provided on the second switching circuit 8A side with respect to the second smoothing capacitor 7.

The control and operation in step-up charging and step-down charging of the battery charge device 100A are performed by the same phase shift method as in the above embodiment 1. The control block diagram of the control circuit 20A is also the same as that shown in FIG. 32 used in the above embodiment 1. However, although bidirectional power transmission is performed in the above embodiment 1, unidirectional power transmission by only charging is performed in the present embodiment 4.

In addition, in the present embodiment 4, capacitors are not provided in parallel to the semiconductor switching elements Q, and the first reactor is not connected on the AC input/output line of the first switching circuit 5A. Therefore, switching of the first and second switching circuits 5A and 8A is not zero voltage switching.

As described above, the battery charge device 100A according to the present embodiment has two control modes of step-up charging and step-down charging, to perform power transmission from the DC power supply 1 to the battery 2. As in the above embodiment 1, in accordance with the duty cycle (≥0), the control circuit 20A controls the phase shift amount θ1 of the drive signal for the first diagonal element Q3B and the phase shift amount θ2 of the drive signal for the second diagonal element Q2B relative to the phase of the drive signal for the first reference element Q4A. The control circuit 20A has the correction unit 35, and in determining the phase shift amounts θ1, θ2 on the basis of the calculated duty cycle D, adjusts the phase shift amounts θ1, θ2 by correction so that response of the charge current i to the charge current command value i* is improved. In this case, transition of the charge current i during charge control is the same as in the charge control in the above embodiment 1.

Therefore, even if the control of the battery charge device 100A enters the region in which the charge current i does not change even though the phase shift amounts θ1, θ2 are changed, the control can swiftly shift to the outside of the region and thereby can follow the charge current command value i*. In addition, the correction unit 35 operates also in cases other than the region in which the charge current i does not change. Therefore, in any case such as rapid load change or change in the charge current command value i*, quick-response performance is improved and the charge current i is swiftly caused to follow the charge current command value i*. Therefore, bus voltages of the first and second switching circuits 5 and 8 can be stabilized, and the battery charge device 100A can be stably operated with high reliability.

In the present embodiment, the bidirectional control described in the above embodiment 1 is applied to the unidirectional control. However, the bidirectional control in the above embodiments 2, 3 is also applicable in the same manner.

Embodiment 5

In the above embodiment 4, the first and second switching circuits 5A and 8A are not configured to perform zero voltage switching. However, only the first switching circuit on the power supplying side may be configured to perform zero voltage switching.

Figure 38:
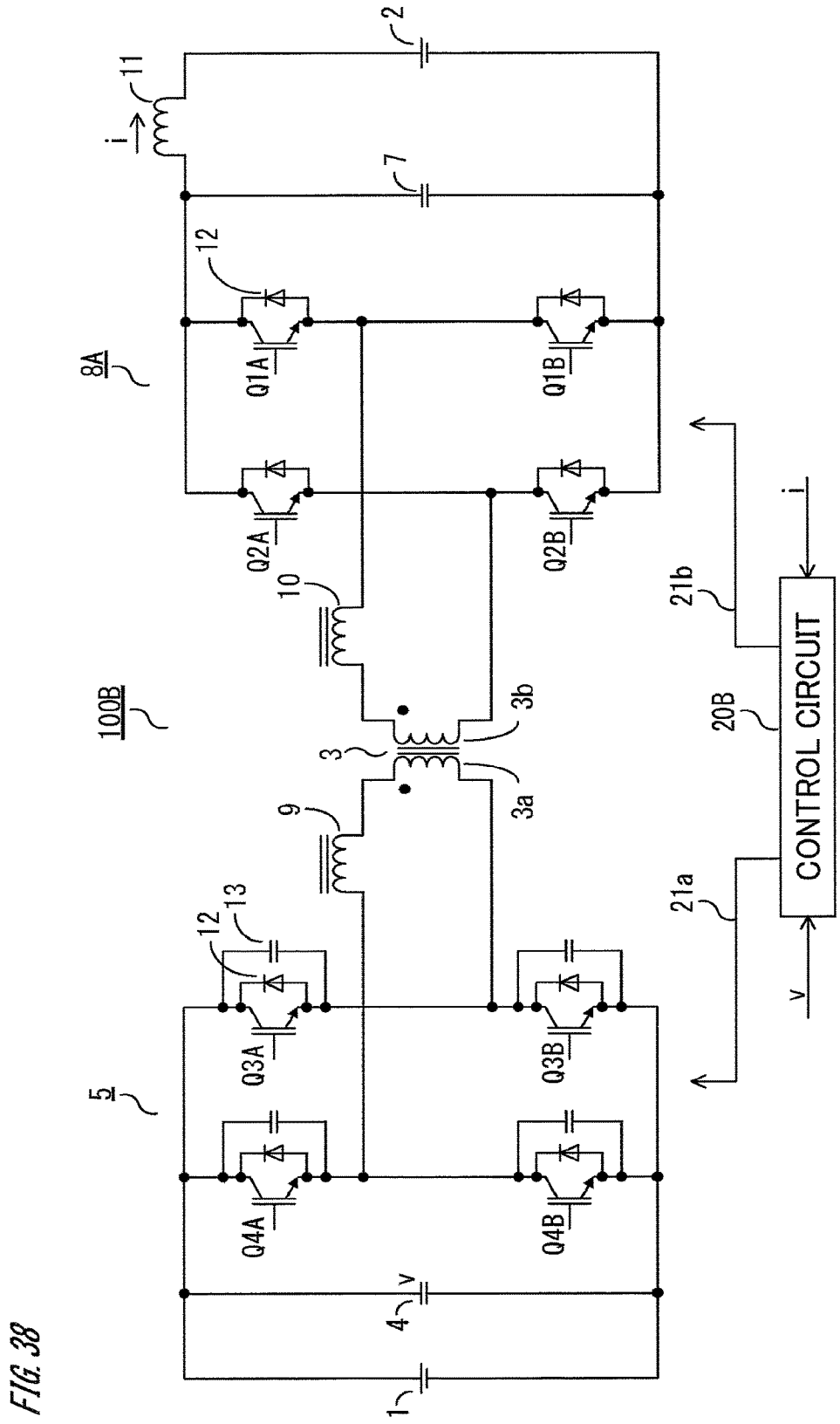
FIG. 38 is a circuit configuration diagram of a battery charge device according to embodiment 5 of the present invention.

FIG. 38 is a diagram showing the circuit configuration of a battery charge device 100B as a DC/DC converter according to embodiment 5 of the present invention.

As shown in FIG. 38, the capacitors 13 are connected in parallel to the respective semiconductor switching elements Q of the first switching circuit 5, and the first reactor 9 is connected on the AC input/output line of the first switching circuit 5. A control circuit 20B controls the first and second phase shift amounts θ1, θ2 in accordance with the duty cycle (≥0), thereby performing control so that each semiconductor switching element Q in the first switching circuit 5 performs zero voltage switching, using the capacitors 13 and the first reactor 9 in the first switching circuit 5.

The other configuration and control are the same as in the above embodiment 4.

In the present embodiment 5, the same effect as in the above embodiment 4 is obtained, and in addition, switching loss can be reduced by zero voltage switching of the first switching circuit 5.

It is noted that, within the scope of the present invention, the above embodiments may be freely combined with each other, or each of the above embodiments may be modified or simplified as appropriate.

The invention claimed is:

1. A DC/DC converter which performs power transmission between a first DC power supply and a second DC power supply, the DC/DC converter comprising:
 a transformer;

a first converter unit formed by a full-bridge circuit including two bridge circuits each having a plurality of semiconductor switching elements to which antiparallel diodes are respectively connected, the first converter unit being connected between the first DC power supply and a first winding of the transformer;

a second converter unit formed by a full-bridge circuit including two bridge circuits each having a plurality of semiconductor switching elements to which antiparallel diodes are respectively connected, the second converter unit being connected between the second DC power supply and a second winding of the transformer;

a second reactor connected on an AC input/output line of the second converter unit; and a control circuit which calculates an output duty cycle on the basis of a difference current value between a current detection value and a current command value of current inputted to or outputted from the second DC power supply, and performs drive control of the semiconductor switching elements in the first converter unit and the second converter unit, wherein the control circuit includes a first circuit for performing feedback control so as to reduce the difference current value, and a second circuit for correcting one of control input and output of the first circuit on the basis of the current detection value and the current command value, and in first power transmission from the first DC power supply to the second DC power supply, using, as a first reference element, one of the semiconductor switching elements on a positive side and a negative side of a first bridge circuit which is one of the bridge circuits in the first converter unit, and using, as a second reference element, one of the semiconductor switching elements on a positive side and a negative side of a second bridge circuit which is one of the bridge circuits in the second converter unit, the control circuit turns off all the semiconductor switching elements of the second bridge circuit among the four bridge circuits in the first and second converter units, and controls, at the same ON time ratio, the semiconductor switching elements on a positive side and the semiconductor switching elements on a negative side in the other three bridge circuits, the control circuit controls a first phase shift amount which is a phase shift amount between a drive signal for the first reference element and a drive signal for the semiconductor switching element as a first diagonal element which is diagonal to the first reference element, and a second phase shift amount which is a phase shift amount between a drive signal for the first reference element and a drive signal for the semiconductor switching element as a second diagonal element which is diagonal to the second reference element, and the second circuit adjusts the first and second phase shift amounts by the correction, to cause the current detection value to follow the current command value the DC/DC converter further comprising a first reactor connected on an AC input/output line of the first converter unit, wherein in second power transmission from the second DC power supply to the first DC power supply, the control circuit turns off all the semiconductor switching elements of the first bridge circuit among the four bridge circuits in the first and second converter units, and controls, at the same ON time ratio, the semiconductor switching elements on a positive side and the semiconductor switching elements on a negative side in the other three bridge circuits, the control circuit controls a third phase shift amount which is a phase shift amount between a drive signal for the second reference element and a drive signal for the second diagonal element, and a fourth phase shift amount which is a phase shift amount between a drive signal for the second reference element and a drive signal for the first diagonal element, and the second circuit adjusts the third and fourth phase shift amounts by the correction, to cause the current detection value to follow the current command value.

2. The DC/DC converter according to claim 1, wherein parallel capacitors are respectively connected to the plurality of semiconductor switching elements of the first converter unit and the second converter unit, and in the first power transmission, the control circuit, by controlling the first and second phase shift amounts, performs control so that the semiconductor switching elements in the first converter unit perform zero voltage switching, using the first reactor and the parallel capacitors in the first converter unit, and in the second power transmission, the control circuit, by controlling the third and fourth phase shift amounts, performs control so that the semiconductor switching elements in the second converter unit perform zero voltage switching, using the second reactor and the parallel capacitors in the second converter unit.

3. The DC/DC converter according to claim 2, wherein in the first power transmission, using, as a first reference point, a point at which the first phase shift amount and the second phase shift amount are both minimum, during a first period during which first transmission power from the first DC power supply to the second DC power supply is equal to or smaller than the first reference point, the control circuit controls the first and second phase shift amounts at an equal amount, and when the first transmission power increases, decreases the first and second phase shift amounts, and during a second period during which the first transmission power is greater than the first reference point, when the first transmission power increases, the control circuit keeps the first phase shift amount minimum and increases the second phase shift amount, in the second power transmission, using, as a second reference point, a point at which the third phase shift amount and the fourth phase shift amount are both minimum, during a third period during which second transmission power from the second DC power supply to the first DC power supply is equal to or smaller than the second reference point, the control circuit controls the third and fourth phase shift amounts at an equal amount, and when the second transmission power increases, decreases the third and fourth phase shift amounts, and during a fourth period during which the second transmission power is greater than the second reference point, when the second transmission power increases, the control circuit keeps the third phase shift amount minimum and increases the fourth phase shift amount, and the control circuit switches between the first power transmission and the second power transmission, when the first and second phase shift amounts are maximum in the first period in the first power transmission, and when the third and fourth phase shift amount are maximum in the third period in the second power transmission.

4. The DC/DC converter according to claim 3, wherein in the control circuit,
the first circuit calculates the output duty cycle so as to decrease the difference current value, and calculates the first to fourth phase shift amounts on the basis of the output duty cycle, and
by the correction by the second circuit, in the first power transmission, the first and second phase shift amounts are both adjusted in the first period and only the second phase shift amount is adjusted in the second period, and in the second power transmission, the third and fourth phase shift amounts are both adjusted in the third period and only the fourth phase shift amount is adjusted in the fourth period.

5. The DC/DC converter according to claim 1, wherein using a model representing operation targets of the first and second converter units in which current monotonously increases with respect to a duty cycle, the second circuit calculates an estimated current value which is an estimated value of the current on the basis of the current command value, and performs correction using an estimated deviation which is a difference between the estimated current value and the current detection value.

6. The DC/DC converter according to claim 5, wherein the second circuit operates the model by calculating the duty cycle so that the estimated current value follows the current command value.

7. The DC/DC converter according to claim 1, wherein the second circuit corrects the output duty cycle that is the control output of the first circuit, thereby adjusting the first to fourth phase shift amounts.

8. The DC/DC converter according to claim 5, wherein the second circuit adds the estimated deviation to the difference current value that is the control input of the first circuit, to correct the difference current value, thereby adjusting the first to fourth phase shift amounts.

9. The DC/DC converter according to claim 1, wherein in the first power transmission, assuming, for the second reference element, a virtual drive signal equal to the drive signal for the first reference element, the control circuit controls the second phase shift amount, thereby controlling a virtual diagonal ON time during which a virtual ON period of the second reference element overlaps an ON period of the second diagonal element, and controls the first phase shift amount, thereby controlling a diagonal ON time during which the first reference element and the first diagonal element are both ON, and
in the second power transmission, assuming, for the first reference element, a virtual drive signal equal to the drive signal for the second reference element, the control circuit controls the fourth phase shift amount, thereby controlling a virtual diagonal ON time during which a virtual ON period of the first reference element overlaps an ON period of the first diagonal element, and controls the third phase shift amount, thereby controlling a diagonal ON time during which the second reference element and the second diagonal element are both ON.

10. The DC/DC converter according to claim 3, wherein using a model representing operation targets of the first and second converter units in which current monotonously increases with respect to a duty cycle, the second circuit calculates an estimated current value which is an estimated value of the current on the basis of the current command value, and performs correction using an estimated deviation which is a difference between the estimated current value and the current detection value.

11. The DC/DC converter according to claim 3, wherein the second circuit corrects the output duty cycle that is the control output of the first circuit, thereby adjusting the first to fourth phase shift amounts.

12. The DC/DC converter according to claim 5, wherein the second circuit corrects the output duty cycle that is the control output of the first circuit, thereby adjusting the first to fourth phase shift amounts.

13. The DC/DC converter according to claim 3, wherein in the first power transmission, assuming, for the second reference element, a virtual drive signal equal to the drive signal for the first reference element, the control circuit controls the second phase shift amount, thereby controlling a virtual diagonal ON time during which a virtual ON period of the second reference element overlaps an ON period of the second diagonal element, and controls the first phase shift amount, thereby controlling a diagonal ON time during which the first reference element and the first diagonal element are both ON, and
in the second power transmission, assuming, for the first reference element, a virtual drive signal equal to the drive signal for the second reference element, the control circuit controls the fourth phase shift amount, thereby controlling a virtual diagonal ON time during which a virtual ON period of the first reference element overlaps an ON period of the first diagonal element, and controls the third phase shift amount, thereby controlling a diagonal ON time during which the second reference element and the second diagonal element are both ON.

14. The DC/DC converter according to claim 5, wherein in the first power transmission, assuming, for the second reference element, a virtual drive signal equal to the drive signal for the first reference element, the control circuit controls the second phase shift amount, thereby controlling a virtual diagonal ON time during which a virtual ON period of the second reference element overlaps an ON period of the second diagonal element, and controls the first phase shift amount, thereby controlling a diagonal ON time during which the first reference element and the first diagonal element are both ON, and
in the second power transmission, assuming, for the first reference element, a virtual drive signal equal to the drive signal for the second reference element, the control circuit controls the fourth phase shift amount, thereby controlling a virtual diagonal ON time during which a virtual ON period of the first reference element overlaps an ON period of the first diagonal element, and controls the third phase shift amount, thereby controlling a diagonal ON time during which the second reference element and the second diagonal element are both ON.

15. The DC/DC converter according to claim 7, wherein in the first power transmission, assuming, for the second reference element, a virtual drive signal equal to the drive signal for the first reference element, the control circuit controls the second phase shift amount, thereby controlling a virtual diagonal ON time during which a virtual ON period of the second reference element overlaps an ON period of the second diagonal element, and controls the first phase shift amount, thereby controlling a diagonal ON time during which the first reference element and the first diagonal element are both ON, and in the second power transmission, assuming, for the first reference element, a virtual drive signal equal to the drive signal for the second reference element, the control circuit controls the fourth phase shift amount, thereby controlling a virtual diagonal ON time during which a virtual ON period of the first reference element overlaps an ON period of the first diagonal element, and controls the third phase shift amount, thereby controlling a diagonal ON time during which the second reference element and the second diagonal element are both ON.

16. The DC/DC converter according to claim 8, wherein
in the first power transmission, assuming, for the second reference element, a virtual drive signal equal to the drive signal for the first reference element, the control circuit controls the second phase shift amount, thereby controlling a virtual diagonal ON time during which a virtual ON period of the second reference element overlaps an ON period of the second diagonal element, and controls the first phase shift amount, thereby controlling a diagonal ON time during which the first reference element and the first diagonal element are both ON, and in the second power transmission, assuming, for the first reference element, a virtual drive signal equal to the drive signal for the second reference element, the control circuit controls the fourth phase shift amount, thereby controlling a virtual diagonal ON time during which a virtual ON period of the first reference element overlaps an ON period of the first diagonal element, and controls the third phase shift amount, thereby controlling a diagonal ON time during which the second reference element and the second diagonal element are both ON.

\* \* \* \* \*